United States Patent [19]

McGowan et al.

[11] Patent Number: 4,481,589

[45] Date of Patent: Nov. 6, 1984

[54] MATERIAL FORMING MACHINE CONTROLLER

[75] Inventors: Michael J. McGowan, Lombard; William H. Slavik, Palos Hills; Carson D. Cash, III, Brookfield, all of Ill.

[73] Assignee: Nuvatec, Inc., Lombard, Ill.

[21] Appl. No.: 337,901

[22] Filed: Jan. 8, 1982

[51] Int. Cl.³ .............. G06F 15/46

[52] U.S. Cl. .............. 364/474; 318/563; 364/179; 364/154; 364/184; 364/552

[58] Field of Search .............. 364/474, 475, 468, 469, 364/472, 178, 179, 153, 154, 184–187, 552, 554, 550, 551, 511; 340/679, 680; 72/19, 31; 83/72, 73; 318/561, 563, 565; 100/99

[56] References Cited

U.S. PATENT DOCUMENTS

| | | | |
|---|---|---|---|
| 3,666,621 | 5/1972 | Adams | 364/153 X |
| 3,875,383 | 4/1975 | Somerville et al. | 364/552 X |
| 3,881,651 | 5/1975 | Wilhelm, Jr. | 364/552 X |
| 3,930,248 | 12/1975 | Keller | 364/552 X |
| 3,946,212 | 3/1976 | Nakao et al. | 364/552 |
| 4,296,474 | 10/1981 | Hurt | 364/474 X |

OTHER PUBLICATIONS

Brankamp et al.–"In-Process Control Enables Ghost--Shift Production In European Fastener Industry"–Offprint From Technical Journal *Wire* 29 (1980).

Brankamp Process Automation, Inc. Pamphlet–"Process A-Observe-Recognize-React"—Brankamp Process Automation, Inc.—Lexington, Mass.–02173.

*Primary Examiner*—Joseph F. Ruggiero

*Attorney, Agent, or Firm*—Willian Brinks Olds Hofer Gilson & Lione Ltd.

[57] ABSTRACT

A control method and apparatus for a metal-forming machine such as a cold heading machine are described. The described method and apparatus monitor machine operation during production and permit relatively large deviations from a prescribed norm over a short term without shutting down the machine, while ensuring longer term compliance to relatively small tolerances from the norm. The described controller first determines an average of a measured parameter such as the hit energy applied to a group of workpieces resulting in acceptable metal-forming during a training mode and then stores this average as a target value. The controller then establishes a set of tolerance windows to be used to control forming operations in a production mode.

In production, the controller repeatedly measures the machine parameter and then compares selected averages of the measured parameter with the target value and the respective tolerance window, and indicates out-of-tolerance condition whenever one of the selected average falls outside the respective window. The tolerance windows are selected such that short term averages or single values of the measured parameter must deviate from the target values by larger amounts than long term averages before the controller signals an out-of-tolerance condition. For example, the described controller operates to interrupt machine operation when a single measured value of hit energy deviates by more than 16% from the learned target value, when a group of 4 measured values of hit energy deviates by more than 8%, when a group of 16 measured values of hit energy deviates by more than 4%, or when a group of 64 measured values of hit energy deviates by more than 1%.

The disclosed controller also signals when the measured parameter is nearing an out-of-tolerance condition, and it acts to change the target value gradually during a warmup period of machine operation in order to reduce the number of unnecessary interruptions of machine operation.

37 Claims, 21 Drawing Figures

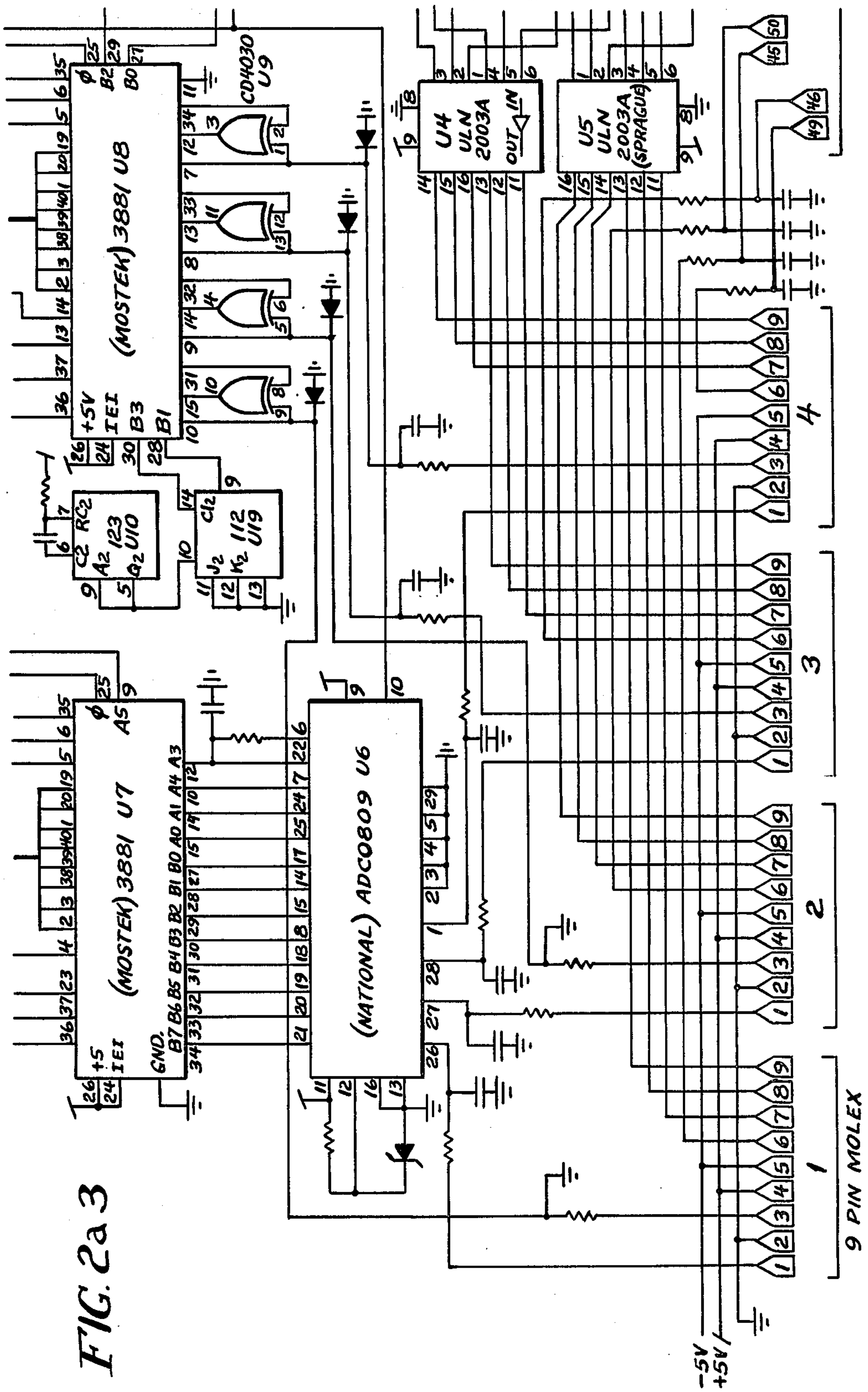
FIG. 2a3

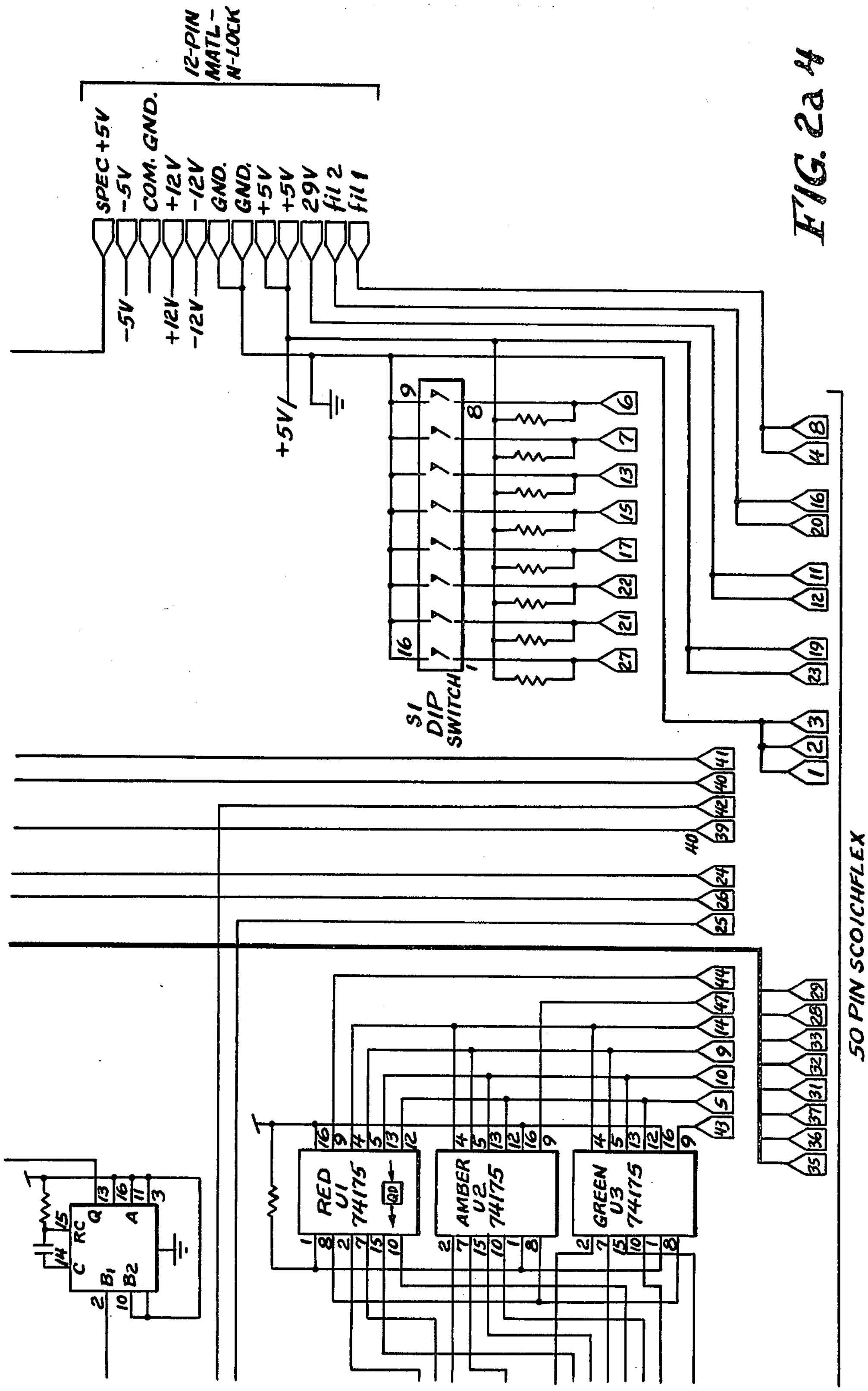
FIG. 2a4

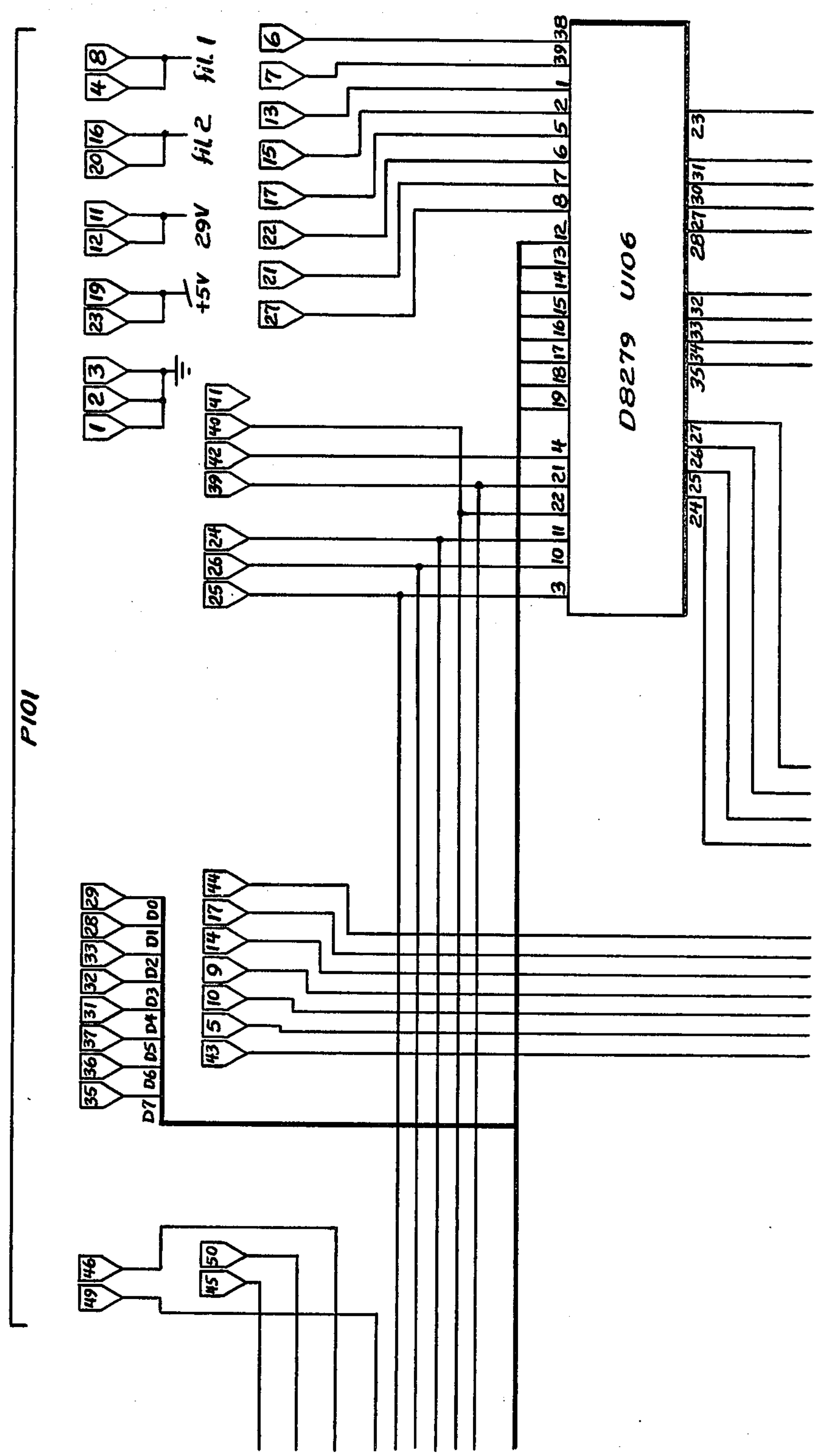
FIG. 2b2

FIG. 2b3
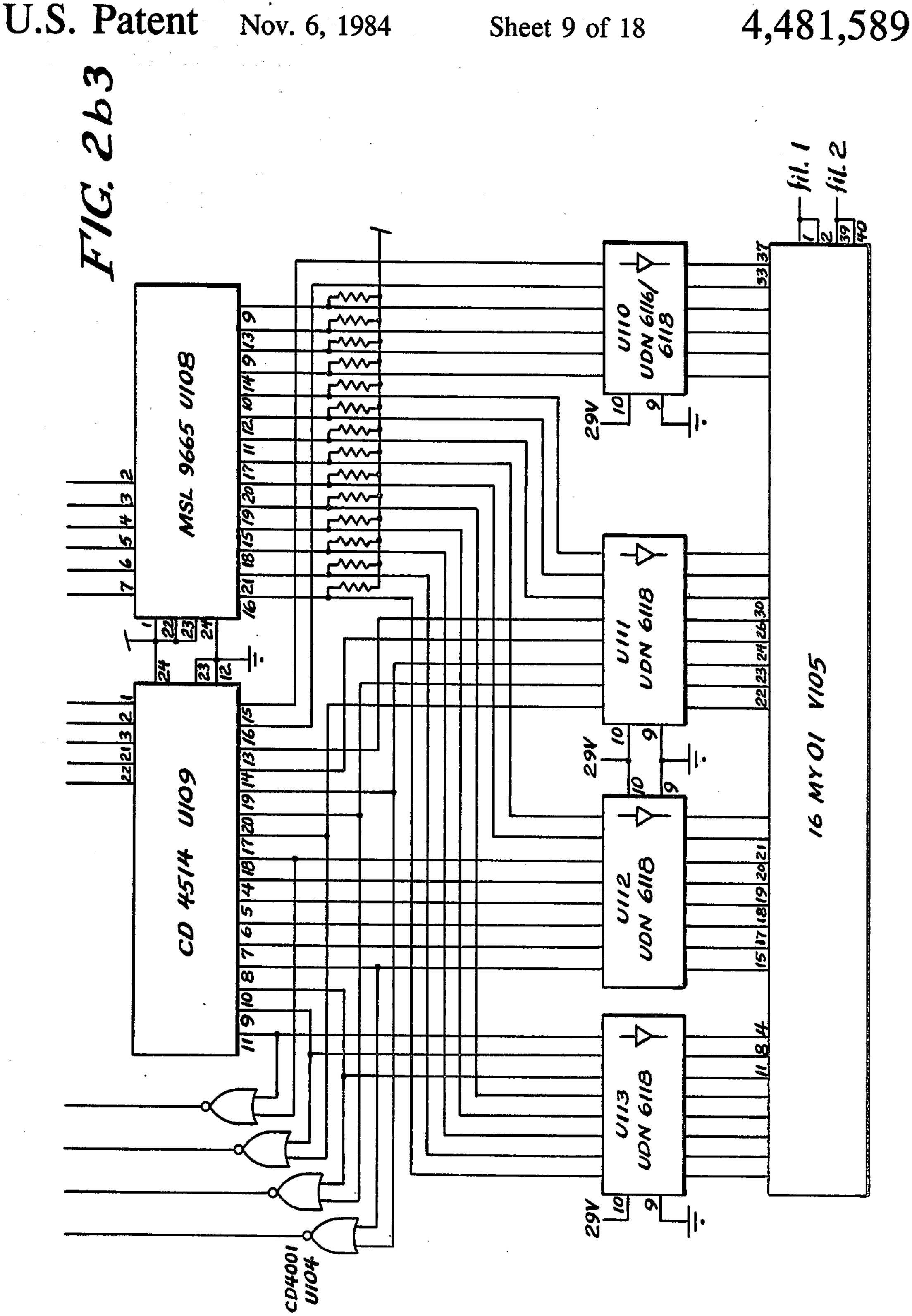

HIT FORCE INPUT

MATERIAL FORMING MACHINE CONTROLLER

BACKGROUND OF THE INVENTION

The present invention relates to a controller for material forming machines such as metal forming machines. The illustrated embodiment relates particularly to a controller for cold heading machines.

In the fastener industry, steel wire is often pressed, rather than cut, as an initial step in making workpieces such as screws, for example. In this pressing, known as cold forming or cold heading, a cold heading machine is used in which a moving die hits a wire slug in a stationary die, typically at a rate of 100 to 450 workpieces per minute.

Cold heading machines have often in the past required operators to determine whether the machine should be stopped due to any one of a variety of causes, such as inadequate quality of the incoming wire, blockage of the feeding mechanism, depletion of the wire supply, blockage of a die by misfed parts, tool breakage, excessive tool wear, or completion of the batch.

Recently, at least one attempt has been made to automate the control of cold heading machines. One known controller uses a microprocessor to determine, it is believed, whether a prescribed tolerance has been exceeded in the force applied to the wire by the cold heading machine. If this tolerance is exceeded, the controller shuts off the machine. An important problem with this known controller is that it is prone to shut down a machine unnecessarily if the tolerance is reasonably set when a "hard spot" is encountered in the wire. Such a "hard spot" can for example, correspond to a localized increase in wire size at a point where two reels of wire have been joined, and can result in a single workpiece or only a small member of workpieces being beyond tolerance. In the present commercial context, hard spots are often quite widely spaced, and it is often commercially acceptable to provide a certain number of parts beyond tolerance in a given run, so long as a minimum number of parts within tolerance are produced. As a result, an operator using this machine controller will: (1) suffer an unnecessary interruption of machine operation each time a hard spot in the wire is encountered; or (2) manually adjust the tolerance to wide margins and run an excess number of parts, resulting in excessive scrap; or (3) use wide tolerances without an excess number of parts, thereby risking failure to produce the prescribed minimum number of parts within tolerance. Each of these options brings with it commercial disadvantages.

One object, therefore, of the present invention is to overcome the very many problems with such known controller and to provide an improved controller which will permit a hard spot in the wire to be processed unless it results in an excessive number of out-of-tolerance pieces. A further object is to provide a less expensive controller: currently the cost of the known microprocessor-based controller is $10,000–$15,000 per cold heading machine. One object of the present invention is to reduce this cost significantly.

Another object is to simplify the operation of the controller for the machine operator, and to provide means for effective communication between the machine operator and the controller.

SUMMARY OF THE INVENTION

According to the illustrated embodiment of the present invention, a detector is placed on a material forming machine such as a cold heading machine. This detector cooperates with circuitry associated with the machine to develop a sequence of measured signals representing a machine parameter such as the energy delivered by the machine to each workpiece during a forming operation. The sequence of measured signals is supplied as an input to a control unit which performs various calculations relating to tolerance and controls the operation of several machines.

The illustrated controller first is put through a setup mode of operation in which an operator sets up a cold heading machine and commences running. After determining that the machine is properly running and producing good parts, he instructs the controller to enter a training mode in which a target value representative of the average of the measured signals during a selected period is calculated. This target value is retained in a memory in the controller, and the controller then advances to a production mode.

In the production mode, the controller of this invention allows for relatively large intermittent deviations of the measured signal from the target value, but still permits the machine to continue operating provided that the long term deviations of the measured signal from the target value are within acceptable limits. It will be appreciated that such long term deviations, if excessive, would result in a substantial number of workpieces being formed which must be scrapped due to excessive deviations from the desired target value.

Accordingly, the invented system makes not one but an entire set of tolerance comparisons between the measured signals obtained in the production mode and the target value developed in the training mode. Illustratively, the system works with the following signals:

(a) individual measured signals;

(b) the average of four consecutive measured signals;

(c) the average of 16 consecutive measured signals; and (d) the average of 64 consecutive measured signals.

In other words, the illustrated system uses groups having sample spaces of 1, 4, 16, and 64. In the following specification and claims, the term "summary signal" will be used in a broad sense to cover the four types of signals enumerated above, as well as other signals indicative of the value of groups of one or more measured signals.

Illustratively, the invented controller will permit a relatively wide deviation of ±16% tolerance from the target value for a single measured signal. For the average of four consecutive measured signals, the controller allows a smaller tolerance only of ±8%. For the average of 16 consecutive measured signals, the system allows a still smaller tolerance of ±4%, and for the average of 64 consecutive measured signals, the invented system allows the smallest tolerance of only 2% of the target value developed in the training mode.

These tolerances can be adjusted by an operator through the use of a keyboard or other types of input devices on the controller. Preferably, adjustable scalers permit the entire set of tolerances to be multiplicatively adjusted.

According to another aspect of this invention, the controller is provided with means for indicating when the measured signals are nearing an out-of-tolerance condition. If, in response to this indication, an operator can adjust the respective machine while it is running, unnecessary interruptions in machine operation may be avoided.

The preferred embodiment of this invention further includes means for automatically and gradually modifying the target value to track changes in the measured signal automatically during an initial warm-up period of machine operation, thereby further reducing the incidence of unnecessary interruptions.

The present invention has applications not only in controllers for cold heading machines, but also in the arts of forging, metal stamping, extruding, and injection molding for example. The beneficial effects of this control system will be to decrease overruns, increase tool life, decrease maintenance costs, reduce operator workloads, and reduce production of scrap parts, i.e., those parts which exceed desired tolerances.

BRIEF DESCRIPTION OF THE DRAWINGS

In describing the illustrated control system, reference is made to the appended drawings wherein:

FIGS. 2*a*1–2*a*4 and 2*b*1–2*b*4 together make up a schematic diagram of the circuitry of the control unit of FIG. 2;

FIG. 4 is a schematic diagram of the circuitry of the machine box of FIG. 1;

DETAILED DESCRIPTION OF THE PRESENTLY PREFERRED EMBODIMENTS

Figure 1:
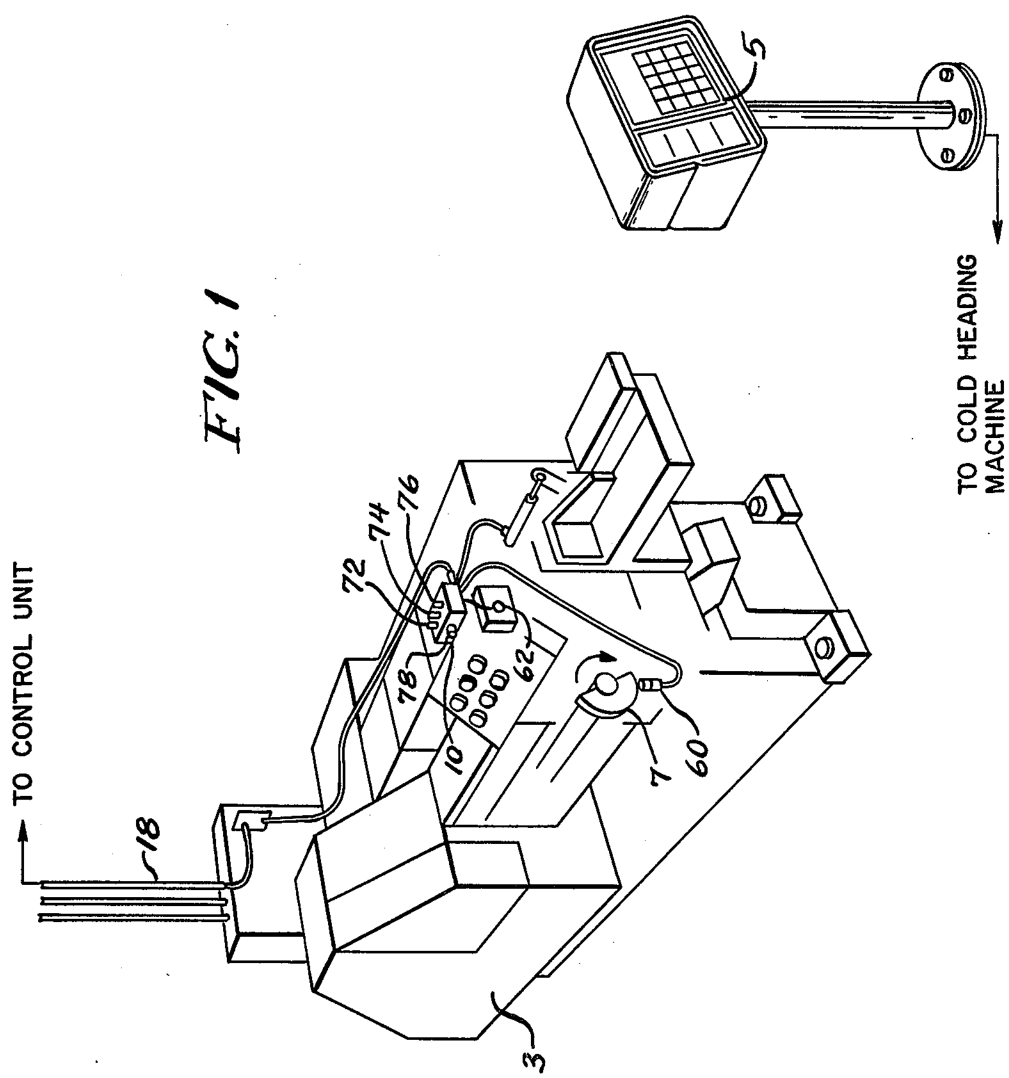
FIG. 1 is a sketch showing a cold heading machine, which includes a machine box, and a control unit.

FIG. 1 shows a cold heading machine 3 which includes a "machine box" 10 which is coupled to a control unit 5. In this preferred embodiment, the control unit 5 also monitors and controls three further cold heading machines (not illustrated in FIG. 1).

As will be explained in detail below, the machine box 10 includes a red status lamp 72, an amber status lamp 74, a green status lamp 76 and a reset button 78. The lamps 72,74,76 are controlled by the control unit 5 to indicate the status of the machine 3, and the button 78 is used by an operator to change the status of the machine 3. Furthermore, the machine box 10 can be controlled by the control unit 5 to terminate operation of the machine 3.

Figure 2:
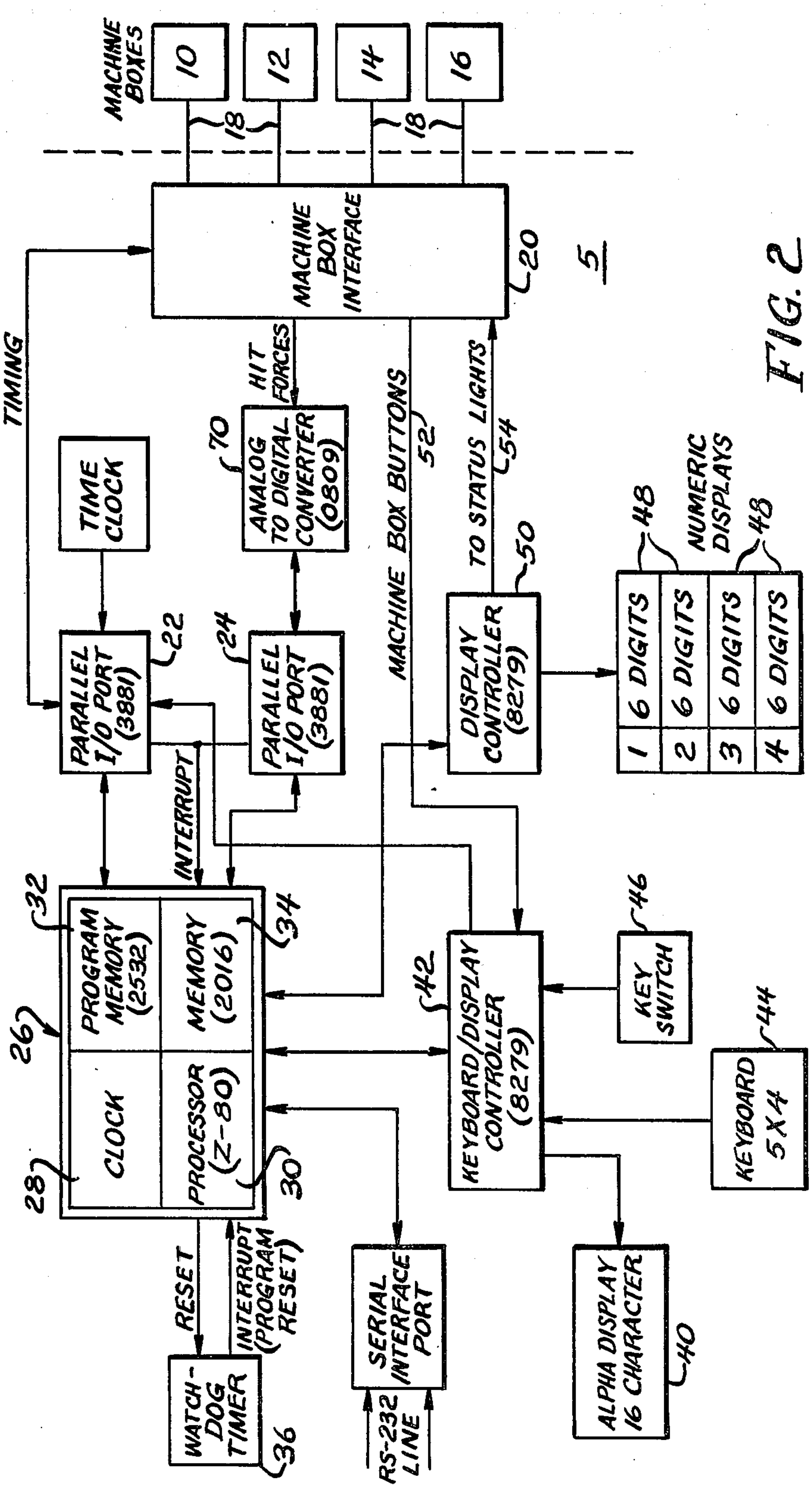
FIG. 2 is a block diagram of the control unit of FIG. 1.

FIG. 2 is a block diagram showing the basic elements of the illustrated control system. Four distinct machine boxes 10,12,14 and 16 are shown on the right hand side of FIG. 2, although it will be understood that provisions can be made for any number of machine boxes by appropriate selection of components. Each of the machine boxes 10,12,14,16 corresponds to a respective cold heading machine and is connected by cables 18 to the control unit contained in the dotted box 5 corresponding to the unit 5 in FIG. 1.

Each machine box 10,12,14,16 supplies two separate signals to the control unit 5. One is a measured signal related to the force imparted by the machine 3 to the workpiece. In the preferred embodiment, this signal is representative of the total energy imparted to the workpiece in a single forming operation, or "hit." It should be noted that another microprocessor based control system uses a signal representative of the peak force only, and not the total energy, upon belief, and this feature is believed to be novel with the embodiment described herein.

The other signal is an identification signal which identifies to which portion of the total forming cycle the present measured signal corresponds. In this embodiment, the cold heading machine 3 forms each individual workpiece in a two part cycle, in which the workpiece is struck twice in two consecutive hits. The desired value of the measured signal for the first hit (corresponding to the first part of the cycle) will in general differ from the desired value of the measured signal for the second hit (corresponding to the second part of the cycle). The identification signal is a twostate digital signal which identifies each value of the measured signal as corresponding either to the first hit or the second hit. Further details for the machine boxes will be discussed below with reference to FIGS. 3 4 and 4*a*.

Still referring to FIG. 2, the control unit 5 includes a microcomputer circuit 26, which includes a clock 28, a microprocessor 30, a program memory 32 and a further memory 34. Associated with the computer circuit 26 is a watchdog timer 36 which operates to reset and restart the microprocessor 30 in the event it fails to supply periodic pulses to the timer 36.

Control unit 5 also contains two I/O ports 22,24 and an interface circuit 20 which serve to transmit signals between the machine boxes 10,12,14,16 and the microcomputer circuit 26, as well as various displays and input devices. Specifically, an alphabetic display 40 is controlled by a keyboard/display controller 42 which communicates with the microcomputer circuit 26 by a data bus or other coupling. A keyboard 44 and key switch 46 each provide further inputs to the keyboard display controller 42. Further, four separate six-digit numeric displays 48 are coupled to the keyboard display controller 42 by a display controller 50.

As previously mentioned, each of the machine boxes 10,12,14 and 16 has associated therewith a respective set of status lamps 72,74,76 and a button 78. The inputs to the system from the machine box buttons 78 pass from the interface circuit 20 to the keyboard display controller 42 via a line 52. The signals which control operation of the status lamps 72–76 pass via line 54 from the display controller 50 to the interface circuit 20. The interface circuit 20, it will be understood, communicates with all of the machine box buttons 78 and status lamps 72–76 via the cables 18.

Figure 2A:
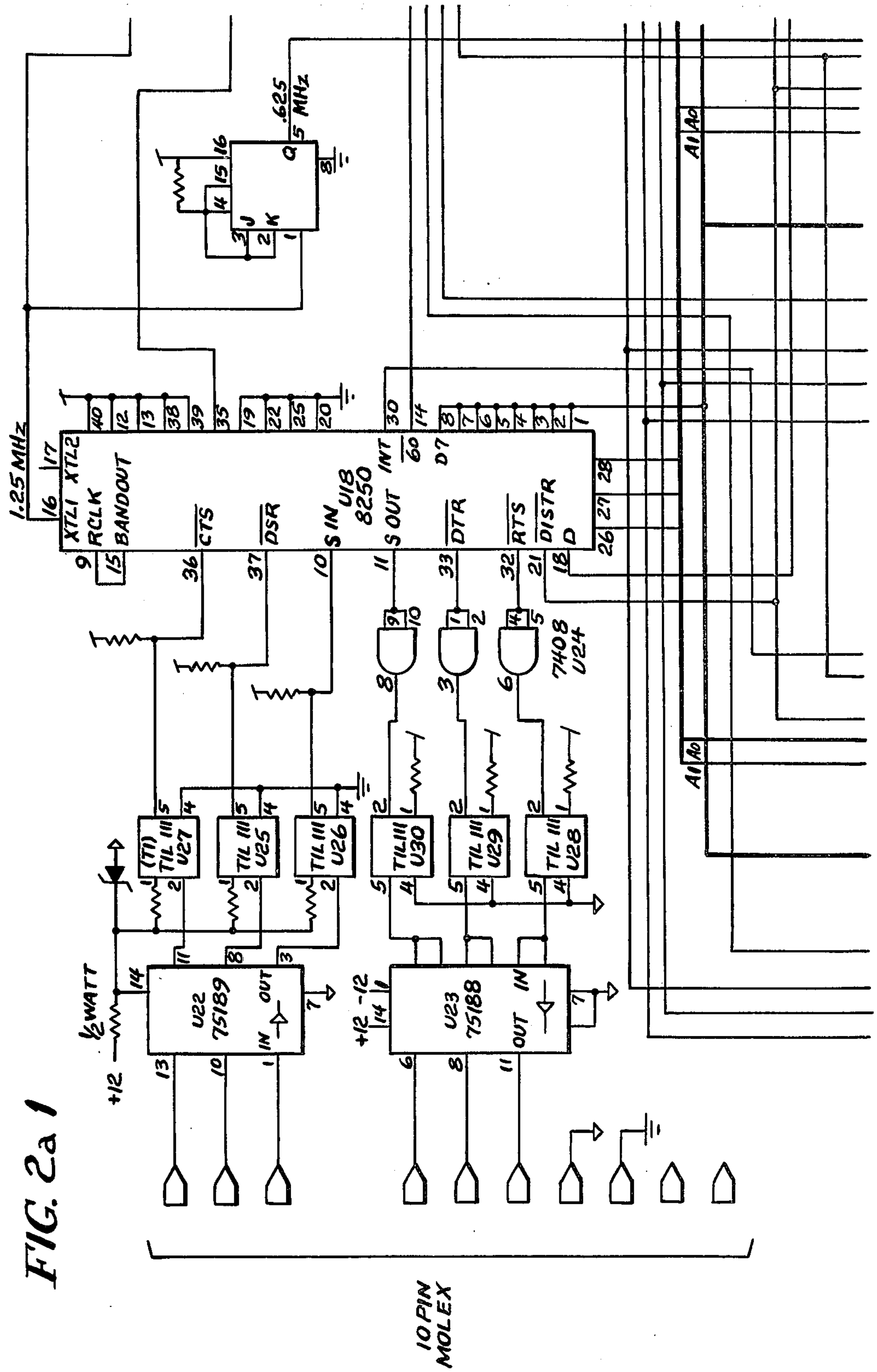
Figure 2A:
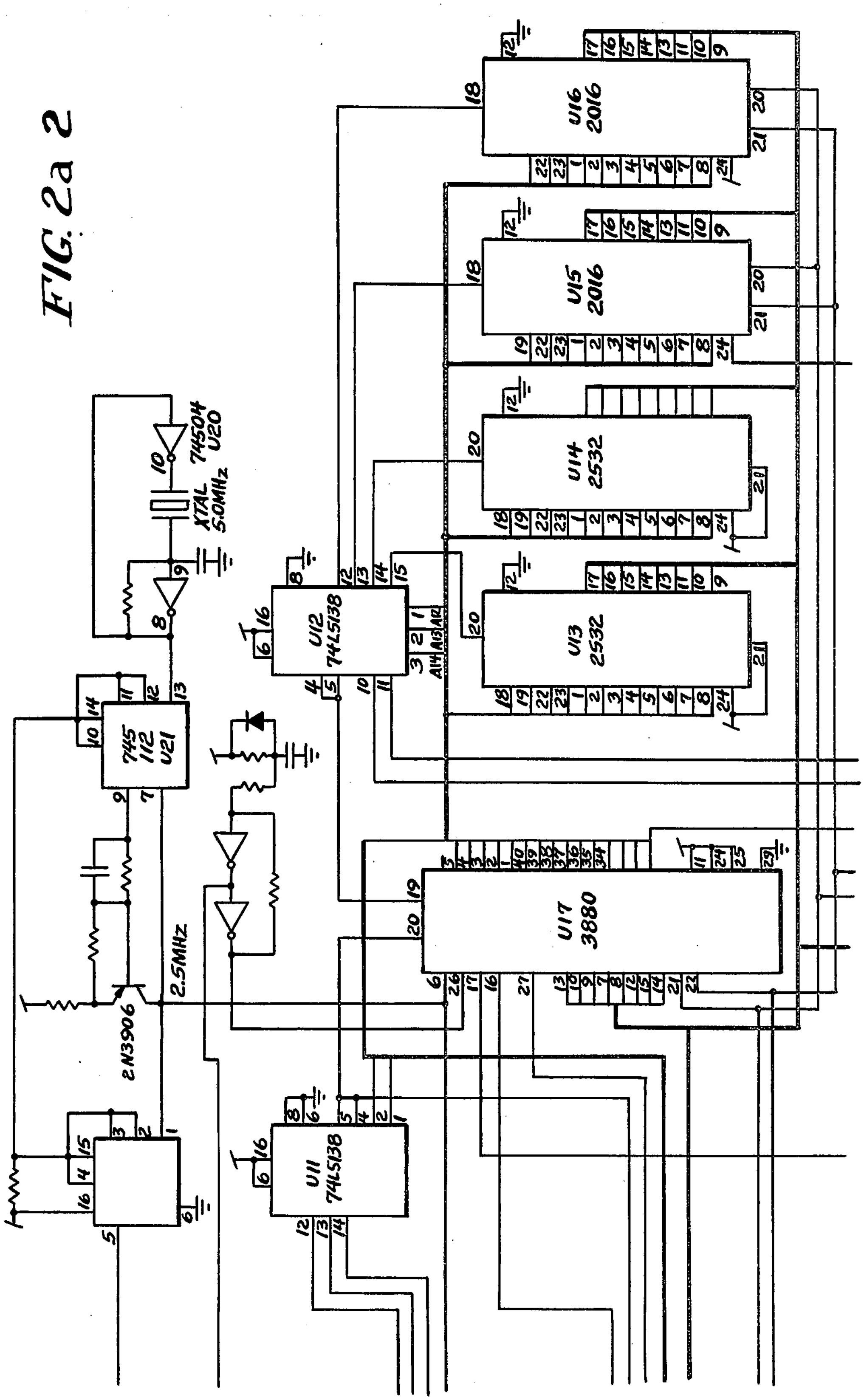
Figure 2B:
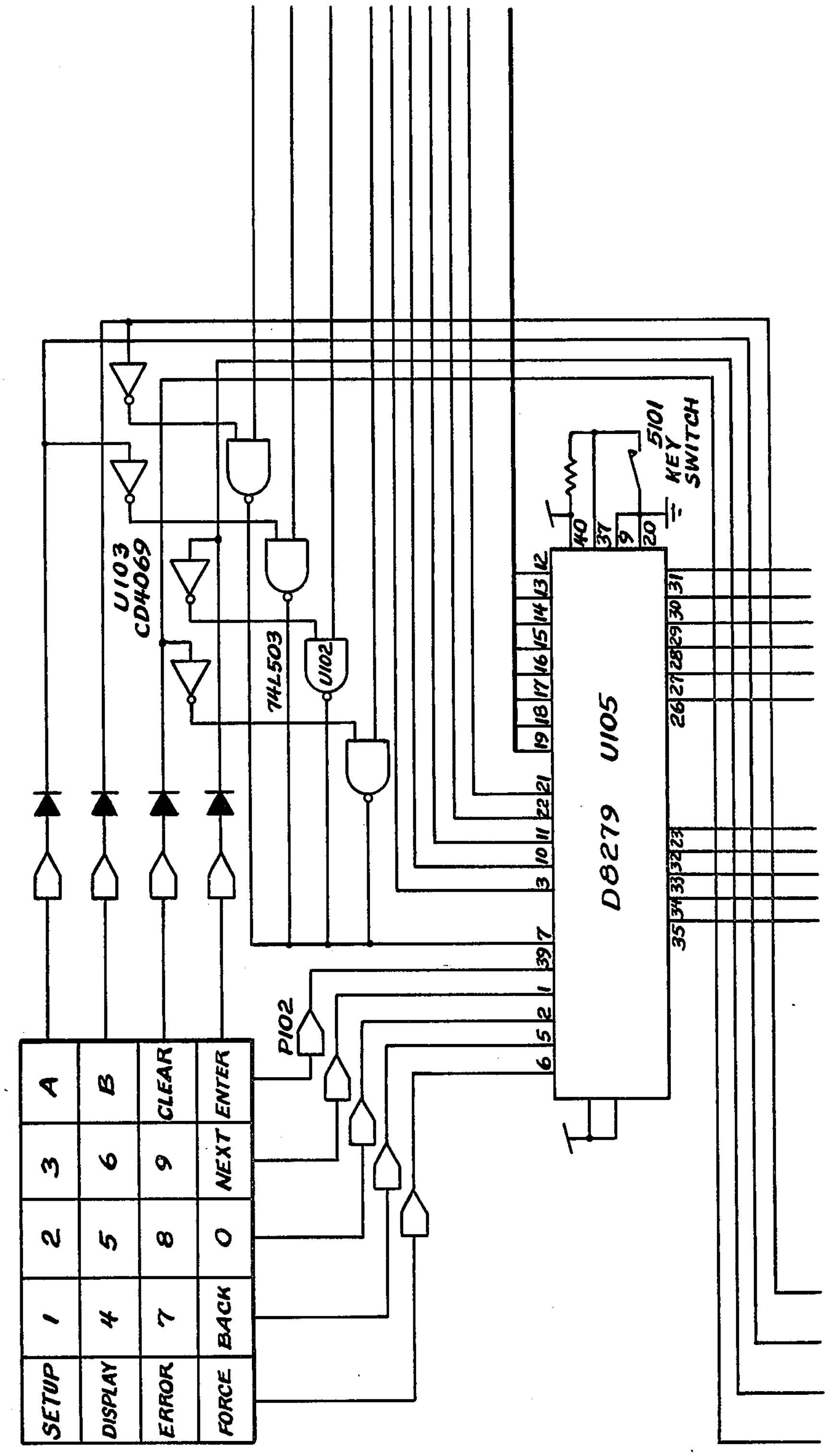
Figure 2B:
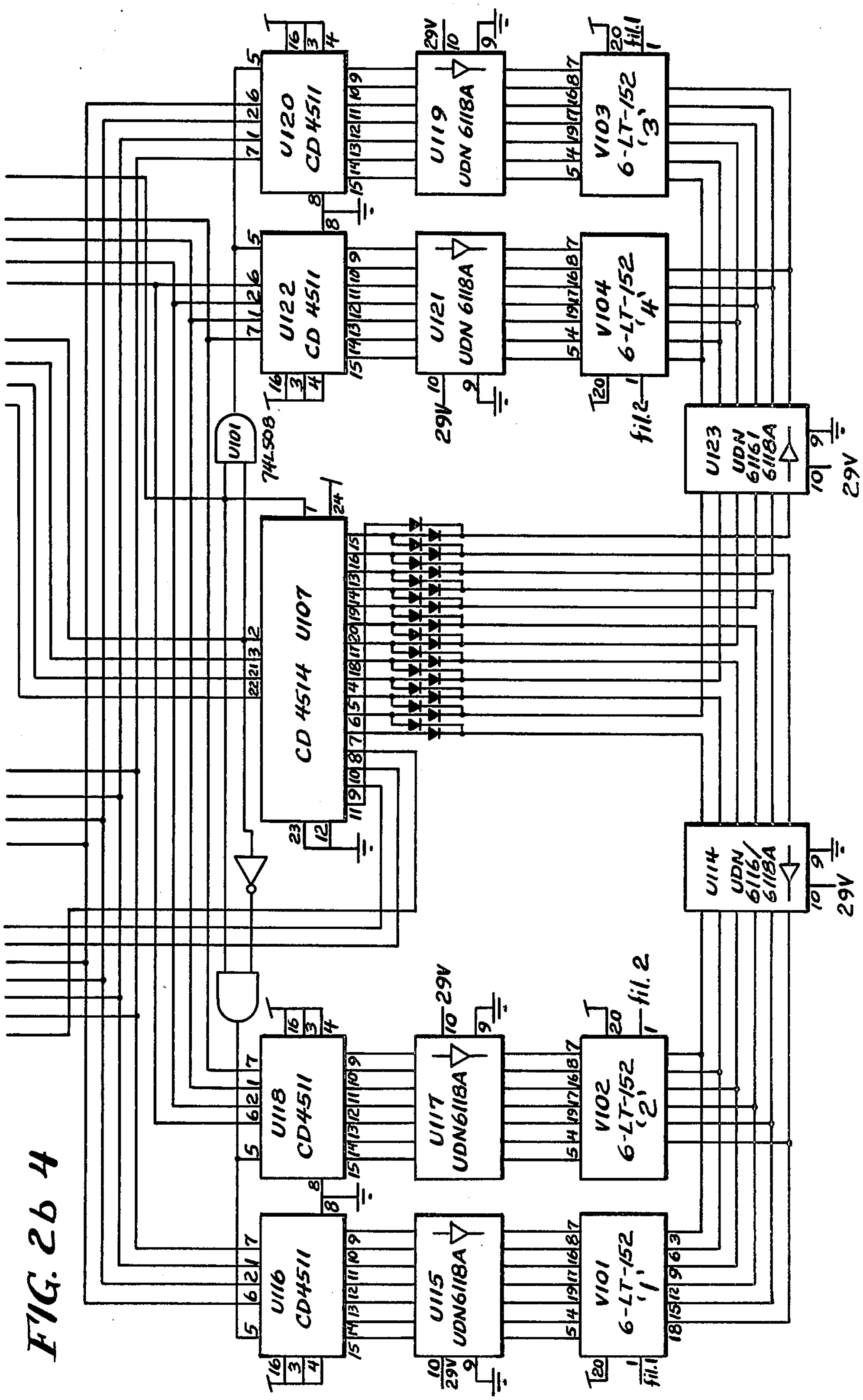

The circuitry of the control unit 5 is shown in greater detail in FIGS. 2*a*–2*b*, which should be referenced for a more detailed understanding of the structure of the control unit 5. With respect to the computer circuit 26, the clock 28 generates a clock signal having a preferred frequency of two and a half megahertz. The microprocessor 30 is preferably a Mostek Z80 CPU, although substitutes can be used. FIGS. 2*a*–2*b* are provided merely to illustrate the preferred embodiment, and it should be understood that details such as the type of microprocessor, the type and number of the displays, and the like can readily be changed in alternative embodiments.

Figure 3:
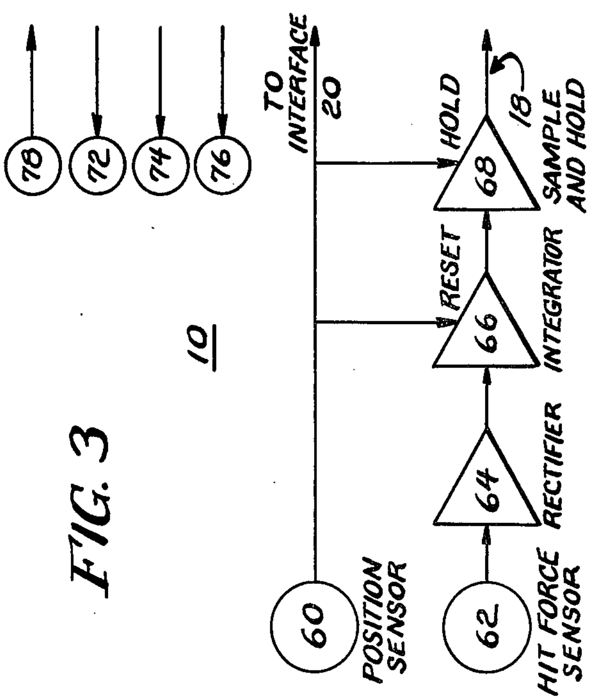
FIG. 3 is a block diagram of the machine box of FIG. 1.

FIG. 3 is a block diagram of one of the machine boxes 10,12,14,16. As can be seen from FIG. 3, each machine box includes a position sensor 60 such as a non-invasive metal detector type FYCC8E1-2 manufactured by Microswitch Division of Honewell. As explained above, the cold heading machine 3 operates in a two-stage cycle made up of first and second hits. The sensor 60 senses the position of a camshaft 7 (as shown in FIG. 1) which rotates once with each complete cycle. The camshaft is semicircular in cross section, and thus the sensor 60 senses whether the machine 3 is in the first or second stage of the full cycle and generates a twostate signal which is in one binary state during the first hit of each cycle and in the other binary state during the second hit of each cycle.

A hit force sensor 62 is also included, and may consist of a low-cost brass disc having a piezoelectric ceramic on one side, for example, a type 2KBS 27DA-5A manufactured by Kyocera International, Inc. Preferably, the sensor 62 is mounted on the back face of the stationary die of the cold heading machine, near the center of impact, to measure deformation of the die. The output from the sensor 62 is applied to a full wave rectifier 64 which provides a rectified output which is applied to an integrator 66 which illustratively uses operational amplifiers to integrate the rectified output. The integrator 66 is clocked by a signal from the position sensor 60 such that the integrator 66 is reset prior to each hit and operates to integrate the output of the rectifier 64 for the duration of each hit. The integrator output is aplied to a sample and hold circuit 68 which also receives an input from the position sensor 60. The output of the circuit 68 is applied to an analog-to-digital converter 70 (included in the control unit 5) such as a National Semiconductor ADC 0809 converter.

FIG. 3 also shows the status lamps 72,74,76 and the reset button 78, described above. The outputs of the position sensor 60, the sample and hold circuit 68, the button 78, and the inputs to the lamps 72,74 and 76 are all connected to the control unit 5 by cables 18.

Figure 4A:
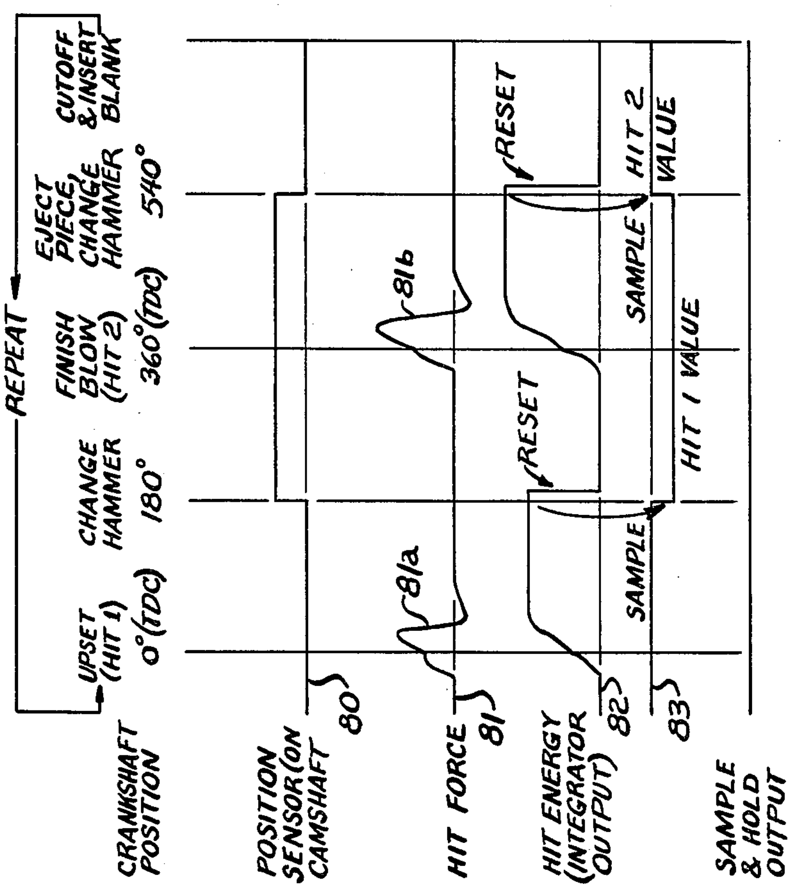
FIG. 4*a* is a waveform diagram illustrating the operation of the circuitry of FIG. 4.

FIG. 4*a* illustrates the operation of the circuit of FIG. 3. Waveform 80 is the output of the position sensor 60 as a function of time, and is a binary signal which is low throughout the first hit of each cycle and high throughout the second hit of each cycle of the machine 3. Waveform 81 is the output of the hit force sensor 62 as a function of time, showing the forces applied in the first hit and the second hit of a selected cycle at 81*a*, 81*b* respectively. Waveform 82 is the output of the integrator 66 as a function of time, showing the manner in which it builds from zero to a positive value related to the time integral of the rectified waveform 81 with each hit. Waveform 83 is the output of the sample and hold circuit 68 which is the measured signal supplied to the converter 70. As shown in FIG. 4*a*, when the output of the position sensor 60 changes state, the sample and hold circuit 68 is loaded with the current value of the integrator 66, and the integrator 66 is then reset in preparation for the next hit.

Figure 4:
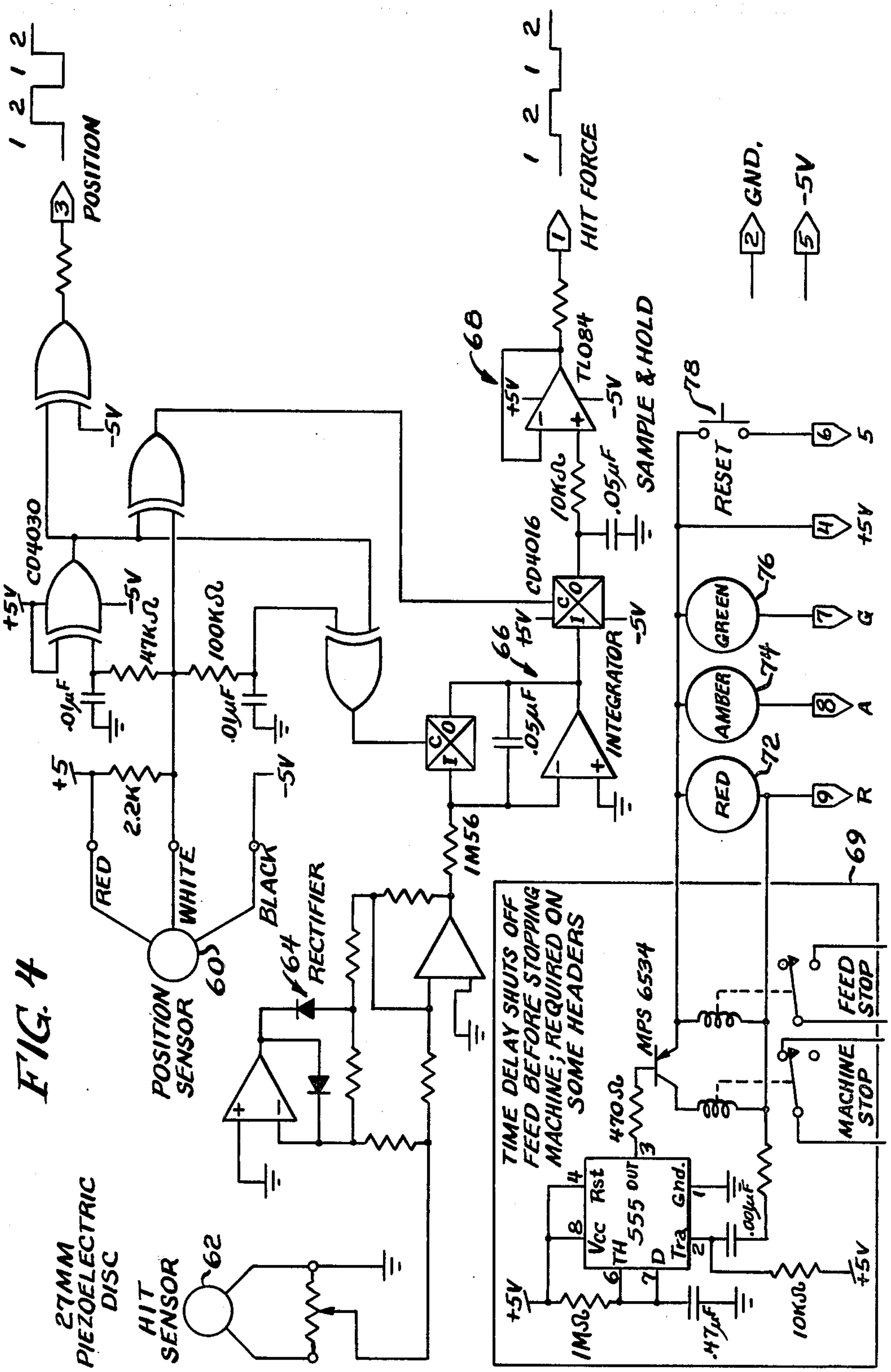

FIG. 4 shows a schematic diagram of the presently preferred embodiment of the circuit of FIG. 3. The circuitry 69 operates first to shut off machine feed and then to shut off the machine 3 whenever the red lamp 72 is illuminated by the control unit 5.

Figure 5:
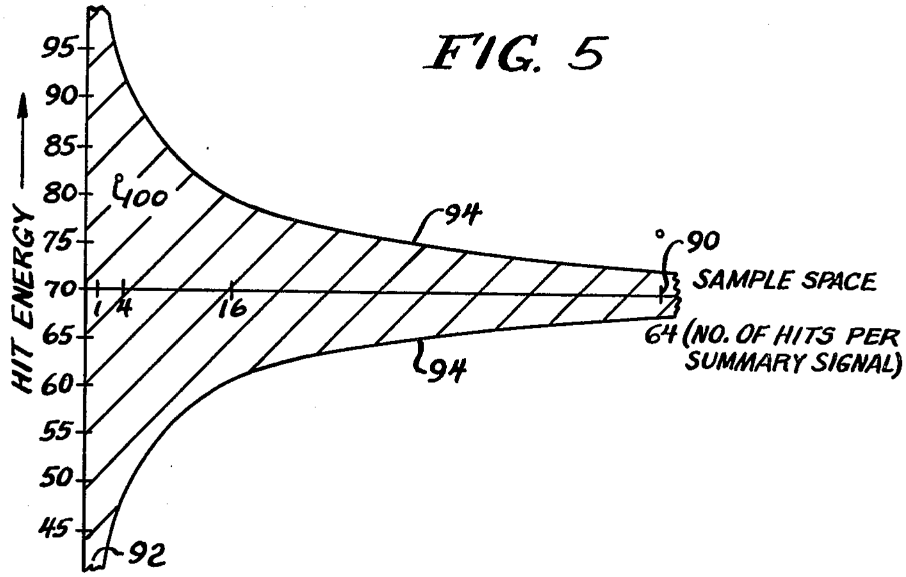
FIG. 5 is a graphical sketch relating allowable tolerance to the number of separate measured signals included in an average, and is useful in comprehending the operation of the invented system.

The method practiced by the above described apparatus, when suitably programmed by the software described in detail below, can be understood with reference to FIG. 5. FIG. 5 is a sketch relating the permissible tolerance during a production run to the size of a sample space. Specifically, the abscissa (x-axis) 90 represents the size of the sample space (the number of consecutive values of the measured signal included in the summary signal being evaluated). The ordinate (y-axis) 92 represents the measured value of hit energy. Curves 94 relate the permissible tolerance to the size of the sample space. Briefly, measured values or averages of measured values of hit energy within the shaded area are within tolerance, but those outside the shaded area are out-of-tolerance.

For example, consider the information represented by point 100. Referring to the abscissa 90, it will be seen that point 100 represents an average of four measured values of hit energy, that is, a sample space of four. During the training mode of machine operation it was established that the desired or target value of the hit energy for forming a certain type of workpiece was seventy, and it will be seen that abscissa 90 crosses ordinate 92 at seventy. The curves 94 have been drawn only illustratively and can be varied in the manner explained below. However, it will be observed that point 100 is within the shaded area defined by curves 94, meaning that point 100 is within tolerance. More specifically, point 100 shows that the average of four measured values of hit energy in a production run was approximately eighty-two units of hit energy. However, the operator has set the machine controller to permit a tolerance window (for a sample space of four) of approximately fifty units to ninety units of hit energy. Consequently, point 100 is within tolerance and will not cause the controller to stop operation based on tolerance monitoring.

However, a second point 102 is outside the shaded area defined by curves 94 and is therefore out of tolerance. Such values of the measured signal will cause the controller to stop operation of the machine yielding this data. Specifically, point 102 corresponds to a sample space of 64 consecutive measured values of hit energy in a production run. The averaged measured hit energy, it will be seen, is approximately seventy-eight units of hit energy. However, the operator has set the machine to accept a maximum averge hit energy of approximately seventy-three units of hit energy for 64 consecutive hits. Plainly, point 102 is therefore out of tolerance.

It will be seen from FIG. 5 that a wide tolerance is permitted for a very small sample space, such as a single hit, but a much smaller tolerance is permitted for sample spaces of increasing size. In FIG. 5, the tolerances are increasingly smaller for sample groups which have increasingly larger sample spaces, i.e., tolerance and sample spaces are monotonically and inversely related. It will be understood that other relationships can be used than the one illustrated in FIG. 5. Further, it will be appreciated that because the sample space inherently is digital and nonfractional in the present embodiment, curve 94 will often be discontinuous.

FIG. 5 therefore is representative of one aspect of operation of the invented system and method. During the training mode, the system determines an average of hit energy applied to a group of workpieces, which average is stored as a target value. Next, the system operator establishes a set of tolerances for production operations corresponding to permissible deviations from the target value. This set of tolerances is defined by the position of curves 94. Circuits are provided whereby the positions of curves 94 can be adjusted or scaled. During a production run, the averages of selected numbers of measured values of hit energy are calulated by control unit 5. In FIG. 5, points such as point 100 and 102 are permitted to have an x-axis value of one, four, sixteen and sixty-four only. Any sample space can be defined by appropriate programming of the microprocessor, but the preferred mode is as has been set forth herein. It will be understood also that the sample groups can be varied considerably, by skipping every other value of the measured signal, for instance.

Next, in the production mode, the system automatically and electronically determines whether any of the averages, such as points 100 and 102, exceed the established tolerance corresponding to the respective sample space. In other words, the system decides whether each average is within the shaded area of FIG. 5.

Finally, if any average is outside the shaded area, the system will indicate a deviation in a prescribed manner. Preferably, this is one by shutting down the machine which yielded the out-of-tolerance average, together with displaying a message indicative of the reason for the shut down to the machine operator.

It should be noted that this method is applied concurrently and independently to each of the several consecutive forming operations (in this embodiment, two) which together comprise the forming of each finished workpiece. If a deviation from an established tolerance in any (either) of these operations is determined, stopping of the machine or other prescribed action occurs. The following program listing, which is the definitive disclosure of this system, operates in this manner.

Attached hereto is a listing of an assembly language program used to program the computer circuit 26 in this preferred embodiment. FIGS. 6 through 11 are flowcharts which illustrate the operation of the attached program. Table I is a cross index between the attached listing and the flowcharts of FIGS. 6–11. The listing is provided as the definite disclosure of the function of the computer circuit 26, and the flowcharts and associated discussion are provided merely to facilitate understanding of the listing.

TABLE I

| FIG. NO. | LINE NUMBERS OF ATTACHED LISTING (LEFTMOST COLUMN) |
|---|---|
| 6 | 1–5294 |
| 7 | 318–1085 |
| 7a | 716–865 |
| 8 | 1086–1768 |
| 9 | 1769–4538 |
| 10 and 11 | 4539–5294 |

Figure 6:
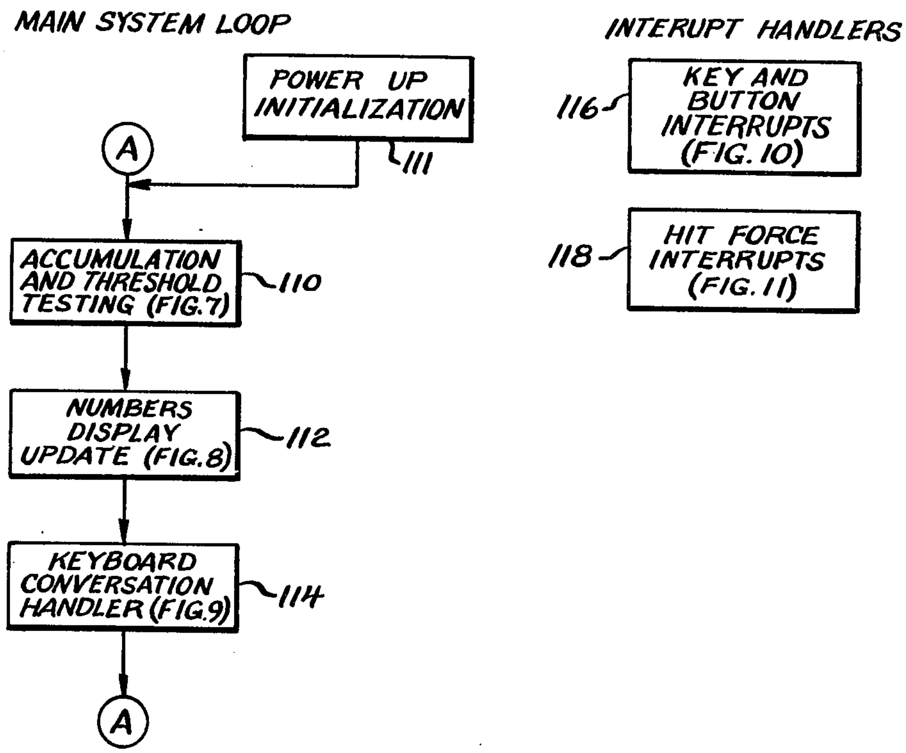
FIG. 6 is a flowchart of the main system loop and interrupt routines.

FIG. 6 illustrates the main system loop and various interrupt routines. The main system loop consists of an accumulation and threshold testing routine 110 (shown more specifically in FIGS. 7 and *7a*), a numeric display update routine 112 (shown more specifically in FIG. 8), and a keyboard conversation handler routine 114 (shown more specifically in FIG. 9). The interrupt routines include a key and button interrupt routine 116 (shown more specifically in FIG. 10) and a measured signal interrupt routine 118 (shown more specifically in FIG. 11). It is understood that reference in the flowcharts to "hit force" is generic to the output of the machine box related to the force or energy with which the workpiece is struck, and that in the preferred embodiment, a signal related to the hit energy is employed.

From FIG. 6 it will be seen that in the main system loop, the system accumulates data and tests it, updates the numeric display and carries out "conversations" with the operator via the keyboard. This main loop is subject to interrupts 116 and 118 corresponding, respectively, to key and button interrupts and measured signal interrupts.

Figure 7:
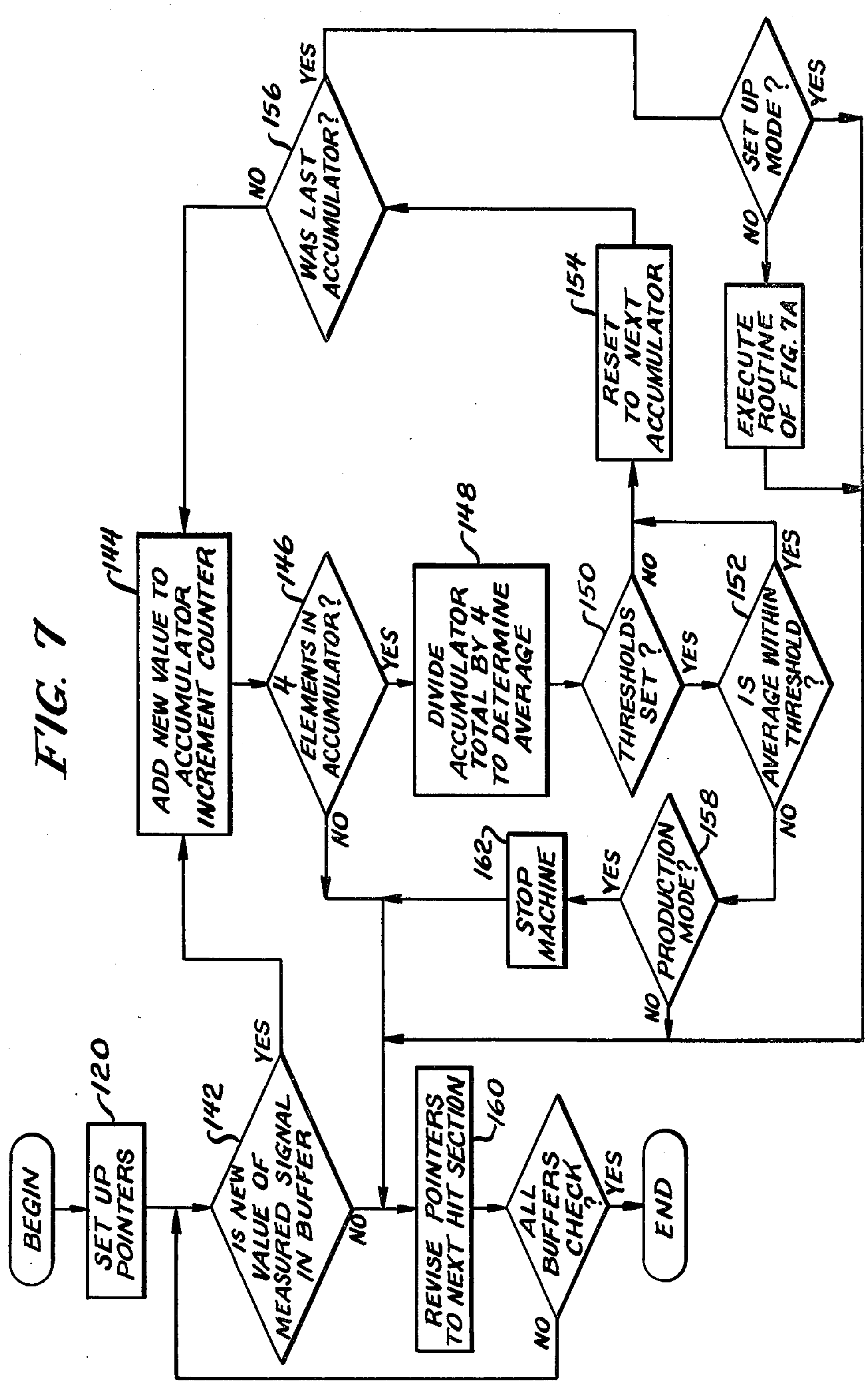
FIG. 7 is a flowchart of the accumulation and threshold testing routines.
Figure 7A:
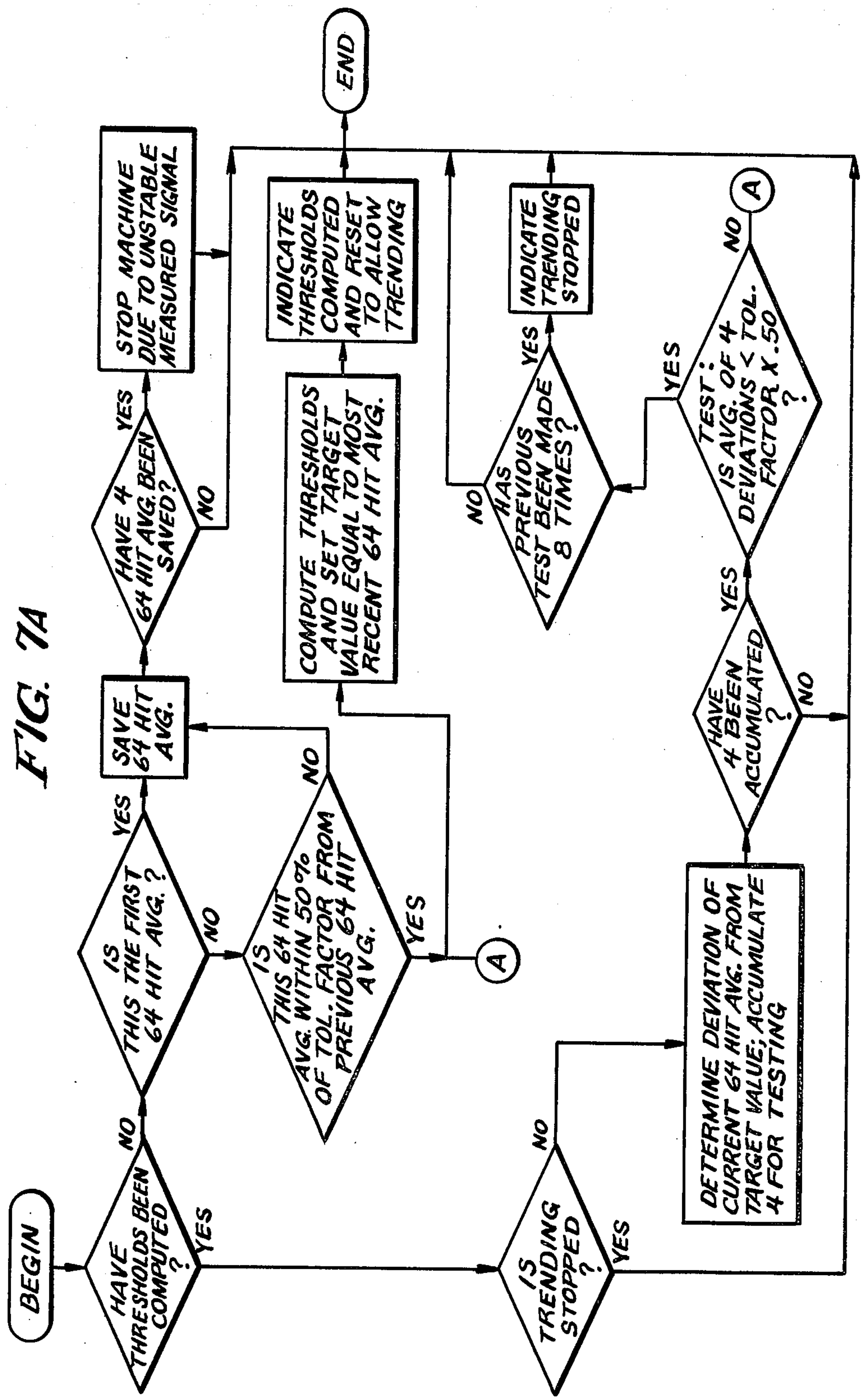
FIG. 7*a* is a flowchart of a portion of the routine of FIG. 7.

FIG. 7 illustrates the accumulation and threshold testing routine 110 of the main system loop. Preliminarily, it should be noted that in this preferred embodiment, the program sets up three counters and three respective accumulators, explained infra. This is achieved in the microprocessor, but it will be understood that discrete components can be used for this purpose. The microprocessor dedicates two bytes for each accumulator.

In FIG. 7, block 120 represents the step of setting up pointers which are appropriate for the particular machine being controlled. These pointers address information such as the appropriate thresholds, the prior measured values of hit energy, and other pertinent information. Prior to discussing the rest of this flowchart, the measured signal interrupt routine 118 should be discussed.

Figure 11:
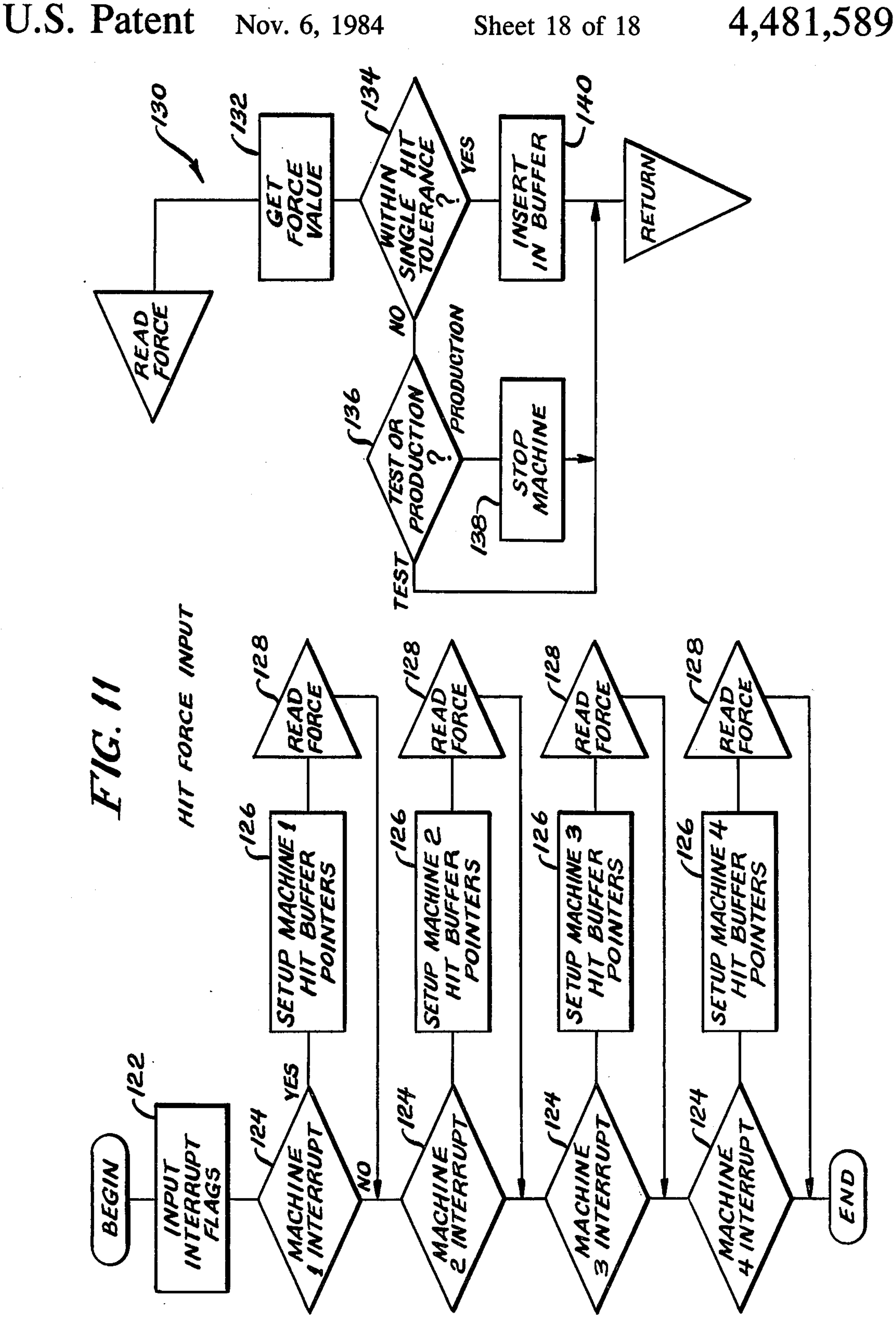
FIG. 11 is a flowchart of the measured signal interrupt routine.

After a measured value of hit energy is received, it is processed according to the interrupt routine 118 of FIG. 6, which is shown more fully in FIG. 11, where it will be seen that provision is made for four cold heading machines. After interrupt flags are fetched at block 122, a decision is made as to where the interrupt originated. Thus, a set of decision diamonds 124 identifies the machine which generated the interrupt. Blocks 126 set up buffer pointers for the respective machines, and triangles 128 represent the READ FORCE subroutine. Each of the triangles 128 calls a subroutine 130 in which a measured value of hit energy, which corresponds to the signal supplied to the analogue to digital converter 70 in FIG. 3, is obtained in block 132. A decision diamond 134 determines whether each individual measured value is within the single hit tolerance. If it is not, a decision diamond 136 questions whether the system is in a training mode or a production mode. If the machine is in the training mode, then that measured value is preserved for determining the average of the hit energy for use in determining a target value. If the system is in the production mode, however, the out-of-tolerance measured value will cause the control unit 5 to stop the machine as shown by block 138. Referring again to diamond 134, if the measured value is within tolerance, it is inserted into a buffer set up by the program as represented by block 140, and the READ FORCE subroutine then returns.

Returning now to FIG. 7, after the pointers are set up at block 120, a decision diamond 142 determines whether a new measured value of hit energy is in the buffer. It will be recalled that when the system is in the production mode, a measured value is not placed in the buffer unless it is within the single sample tolerance. A single measured value, it will be understood, corresponds to a sample space of size "1". If the measured value is in the buffer, a number representative of the measured value is added to an accumulator and a corresponding counter is incremented, as shown in a block 144 of FIG. 7.

Much of the flowcharts of FIGS. 7 and *7a* relates to the selection of data of various sizes of sample space and the testing thereof to determine whether such data is within prescribed tolerances. It will be remembered that three accumulators and three counters are maintained. Whenever a hit occurs in the production mode, the respective measured value of hit energy is first tested to see whether it, individually, is within tolerance. If so, that measured value then becomes one element in the next sample group as shown at block 144. In the preferred embodiment, the next sample group has four elements (a sample space of four). Decision diamond 146 determines whether four accumulators have occurred, and if not, it returns the system to await the next hit. If four accumulations have occurred, then the accumulator total is divided by four at block 148 to find the average of its four elements. Assuming the thresholds have been set, as interrogated at diamond 150, the system then determines whether the average for the most recently accumulated group of four elements is within the prescribed tolerance. This occurs at decision diamond 152. Assuming that the average for this group of four elements is within tolerance, the system then resets at block 154 to the next accumulator.

In this manner, the average of the first four measured values becomes one element in the next sample group, which itself has four elements, each consisting of an average of four prior sample groups. It will therefore be understood that this counting geometrically increases the sample space of the sample groups which are tested. Thus, the first accumulator is used to determine the average of the measured signal for four hits. The second accumulator is used to determine the average of the measured signal for 16 hits. The third accumulator is used to determine the average of the measured signal for 64 hits. Decision diamond 156 determines whether the last accumulation has occurred.

Referring back to decision diamond 152, after an average is determined for a sample having four elements, if such average is not within tolerance, the system determines at decision diamond 158 whether it is in the production mode. If the system is not in the production mode, then it returns to await the next hit from the machine as shown in block 160. If the system, however, is in the production mode, then the out-of-tolerance average will cause the control unit 5 to cause the respective machine box 10 to interrupt operation of the machine 3 as indicated at block 162.

FIG. *7a* shows a detailed flowchart of a routine which is called by the routine of FIG. 7 in order to set and adjust the target values and thresholds used by the control unit 5 to determine whether individual measured values of the hit energy as well as averages of the measured values are within tolerance. This routine is called after every new 64 hit average of the measured signal is obtained, unless the control unit is in the setup mode.

As shown in FIG. *7a*, this routine first checks to see whether thresholds have yet been computed. If not, the routine compares the most recent 64 hit average with the previous 64 hit average and determines whether the new average is within 50% of the tolerance factor, a parameter indicative of the allowed deviation of the 64 hit average from a target value in the production mode. If not, the routine returns. If four 64 hit averages fail to meet this test, the routine causes the control unit to stop operation of the machine due to unstable averages of the measured values of hit energy.

Once two consecutive 64 hit averages are equal to within 50% of the tolerance factor, the routine then sets a target value, which is indicative of the desired long term average of the measured value of hit energy during the production mode, equal to the most recent 64 hit average. The routine then generates four separate thresholds, or ranges of acceptable values, for the various averages of the measured signal. The thresholds for the 64,16,4 and 1 hit averages are set at the target value plus or minus 1,2,4 and 8 times the tolerance factor, respectively. It is these thresholds which are used as described above in evaluating the measured values and averages of the measured values of the hit energy.

If thresholds have been computed and stored prior to entry to the routine of FIG. *7a*, the routine checks to see if revision and adjustment of the thresholds is still allowed. In this embodiment, if 8 consecutive 256 hit averages, each made up of 4 separate 64 hit averages, deviate from the target value by less than 50% of the tolerance factor, a flag is set to prevent further adjustment of the target value. However, prior to this time, the routine checks each 256 hit average to determine whether the difference between the 256 hit average and the target value is greater than 50% of the tolerance factor. If so, the routine recomputes the target value and the thresholds based on the most recent 64 hit average.

Thus, the routine of FIG. 7 will interrupt machine operation if a 1,4,16 or 64 hit average falls outside the respective threshold, and the routine of FIG. *7a* will gradually adjust the thresholds during an initial period corresponding to machine warm-up when measured values of the hit energy will often change gradually. In this way, the control unit monitors and controls machine operation during machine warm-up, but unnecessary machine shut downs are avoided.

Figure 8:
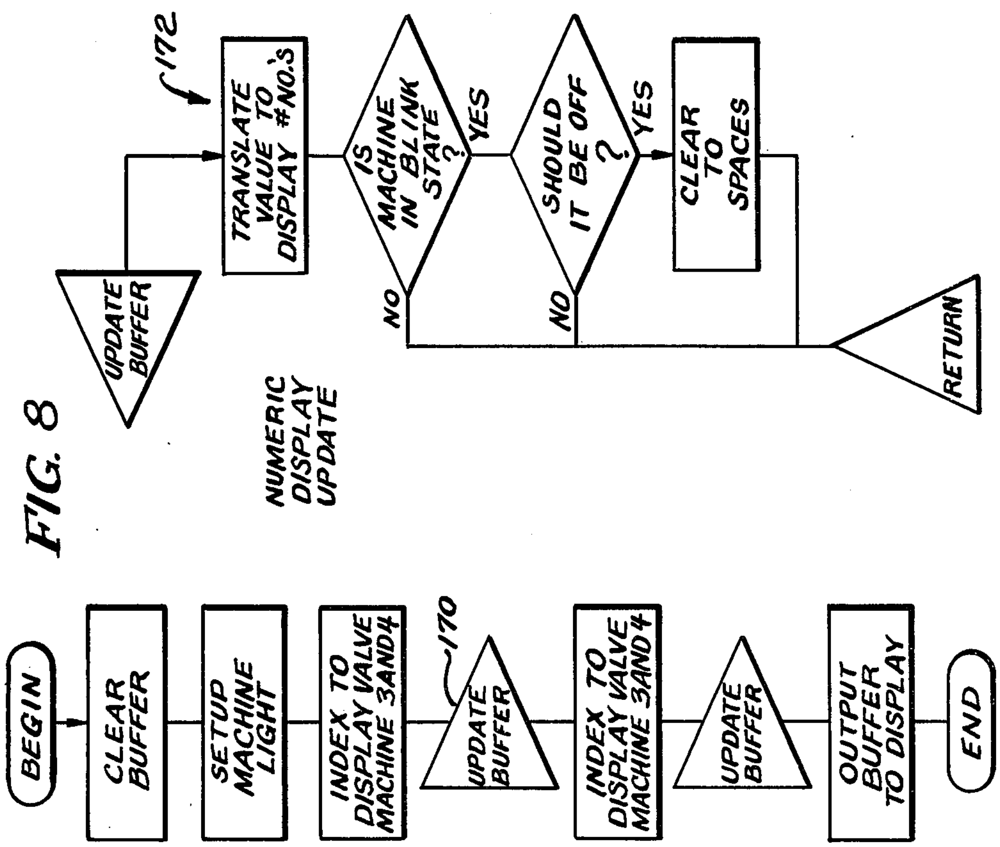
FIG. 8 is a flowchart of the numeric display update routine.

FIG. 8 represents the numeric display update routine 112 in the main system loop of FIG. 6. It will be understood that the function of this routine is to display numeric data on the displays 48. Data are stored in a buffer for display, as shown at triangle 170, which calls an UPDATE BUFFER subroutine 172.

Figure 9:
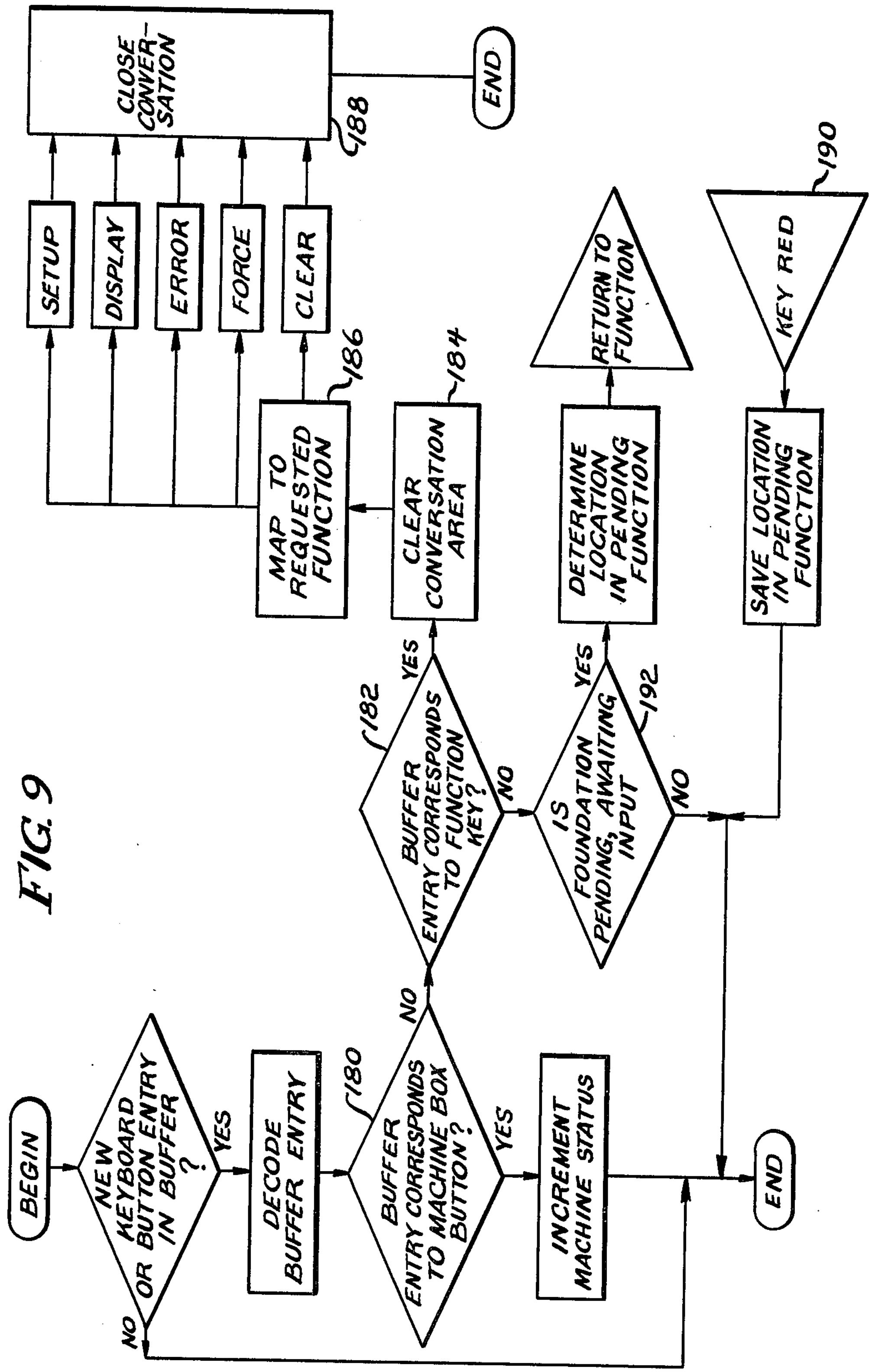
FIG. 9 is a flowchart of the keyboard and conversation handler routine.

FIG. 9 illustrates the organization of the keyboard conversation handling routine 114 of the main system loop shown in FIG. 6. As shown in FIG. 9, the routine decodes a new entry in the input buffer and determines whether this entry corresponds to the machine box button 78 from one of the machine boxes 10,12,14,16. If so, the routine advances the status of the respective machine, as described below. If not, the routine then determines whether the entry is a keyboard entry requesting one of several programmed functions, and if so initiates the requested function. If the entry corresponds to neither of these alternatives, the routine then determines if a function is in progress and passes control back to the function if so. Otherwise, the routine returns.

In this embodiment, five separate functions have been programmed, and an operator can call up any one of these five functions from the keyboard to enter information into and obtain information from the system. The five functions which are presently incorporated in the illustrated embodiment are SET UP, DISPLAY, ERROR, FORCE, and CLEAR. Briefly, the SET UP function allows an operator to set production quantities and parameters and allows the operator to clear previously entered values from the system. The DISPLAY function allows the operator to select the information which is displayed by the control unit 5. The ERROR function allows the operator to learn the reasons which caused the control unit to shut down a machine. The FORCE function allows the operator to obtain the single and average values of the measured values of hit energy during the machine operation. The CLEAR function allows the operator to clear the alphanumeric display 40 of any messages so that other indications may be made.

The SET UP function operates in two different modes, depending on whether the key switch 46 is in the locked or unlocked position. When the switch 46 is in the unlocked position, the SET UP function allows the operator to enter the following values required to define a production run on a selected machine:

(1) Production count—count of total workpieces to be made;

(2) Bread count—count of workpieces after which machine will be stopped for workpiece inspection;

(3) Tolerance—the tolerance factor.

The conversation with the system begins with the control unit 5 requesting an identification of the machine for which values are to be entered. The system, via a display, then prompts the operator for the information enumerated above. When all of these prompted items have been entered, the identified machine is then ready for the system to enter the training and production modes.

When the key switch 46 on the control unit 5 is in the locked position, the system allows the operator to alter only items (2) and (3) listed in the previous paragraph. The system will display a prompt of a particular value of indication, and the operator presses an ENTER key to clear it or a NEXT key to go on to a subsequent value to be prompted.

The DISPLAY function allows the operator to select the parameter to be displayed on the numeric displays 48 of the system. The system will put a prompt message of a selectable parameter on the display, and the operator uses the ENTER key to select that specific parameter for display or the NEXT key to go on to a subsequent parameter. The parameters available for display include the total production run to be made, the total production run made so far, the break count parameter, and the break count so far.

The ERROR function allows the operator to determine why a machine has been stopped and to clear the error indication. After selecting the desired machine, the controller displays a simple message to inform the operator of the error which occurred. By pressing the ENTER key, the operator can clear an error indication, and by using the NEXT key, the operator can cause the indication to be left intact and the next error message to be displayed.

The FORCE function allows the operator to observe the incoming or average values of the measured signal of the hit energy for a particular machine. The operator selects the machine and the parameter to be displayed by entering a code. For example, entry of the number "0" will cause individual values of the measured signal of hit energy to be displayed. Entry of the number "1" selects display of the four hit average of the measured signal. Entry of the number "2" selects display of the 16 hit average, and entry of the number "3" designates display of the 64 hit average.

Each of the keyboard keys for the SET UP, DISPLAY, ERROR, FORCE, and CLEAR functions is a function key as that term is used in decision diamond 182 of FIG. 9. If a function key has been activated, the program maps to be selected function, permits the controller to conduct the conversation, and then closes the conversation as shown in boxes 184, 186, and 188 respectively.

In order not to delay unduely response to new values of the measured signal, each of the function routines has been designed to return control to the main program loop of FIG. 6 via the KEYRED routine whenever the function is awaiting an operator response. The KEYRED routine saves the relevant addresses and sets a flag indicating that one of the functions is pending, awaiting a keyboard input. Then, when the operator provides the awaited keyboard input, the decision diamond 192 causes control to be returned to the appropriate point in the pending function. In this way, lengthy interaction between the operator and the controller does not interfere with timely response by the control unit 5 to changing values of the measured signal.

Figure 10:
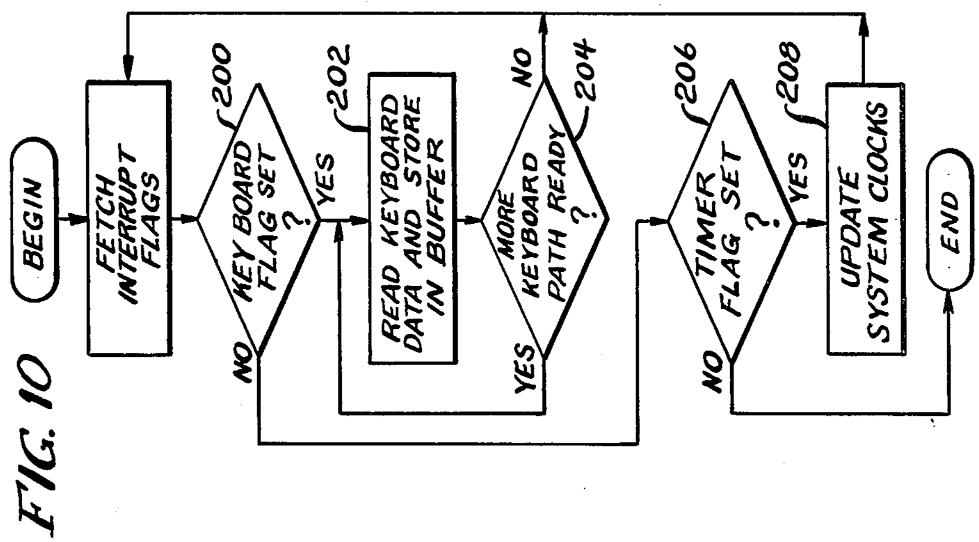
FIG. 10 is a flowchart of the key and button interrupt routine.

FIG. 10 illustrates the flowchart for the key and button interrupt routine represented by block 116 of FIG. 6. This is a straightforward routine wherein if a keyboard flag is set, as determined at decision diamond 200, the control unit reads the key from the appropriate I/O port and stores the key identification in a buffer, as represented at block 202. Diamond 204 insures that all keys intended to be read are in fact read. The routine of FIG. 10 also includes a clock update routine. If a timer sets a flag, as determined at diamond 206, the control unit updates the system clocks at block 208.

The operation of the control unit 5 and machine box 10 is briefly described as follows. The system operator presses the machine box button 78 for the specific machine he wishes to set up. This causes the control unit 5 to change the status of the respective machine from the stopped mode (red lamp 72 illuminated) to the setup mode (amber light 74 illuminated). This allows the machine to run while the operator adjusts the machine for production. A supervisor or the machine operator next turns the key switch 46 on control box 5 to the unlocked position and enters the desired production parameters.

When the machine has been properly adjusted for satisfactory operation and the production values have been entered, the operator then presses the machine box button again. This causes the control unit 5 to illuminate both the amber lamp 74 and the green lamp 76 (FIG. 3) on the respective machine box 10,12,14 or 16 to indicate that the unit 5 is in the training mode and is operating to determine the target value of the measured hit energy that will be used as a standard against which measured values of the hit energy will be compared in the production mode. When the measured values have remained consistent for at least 128 workpieces, the control unit 5 turns off the amber lamp 74, showing that the tolerance windows have been computed for the run and that the control unit 5 is in the production mode. The control unit 5 then monitors the incoming measured values of the hit energy for the operating machine, ensuring that they remain within the computed tolerance windows as described above.

If a measured value or an average of measured values of hit energy falls beyond the respective computed tolerance window, the control unit 5 illuminates the red lamp 72 (FIG. 3) to shut down the respective machine and causes the corresponding numeric display 48 (FIG. 2) to blink about once a second. If the display 40 is not otherwise in use, the control unit 5 causes alphanumeric display 40 to display the message "ERROR" with the machine number following. The operator can then display the error or errors for that machine, correct the problem, and resume or restart the production run. When the control unit 5 has counted up to the total production run called for on that machine, the unit 5 will cause the machine to stop and the corresponding display to blink about once every four seconds.

The use of multiple tolerance windows as described above provides the dual advantages that long term averages of the measured signal can be held within close tolerances, yet short term averages can be allowed to vary widely. In this way, short term deviations of the measured signal (such as those associated with hard spots) result in fewer unnecessary interruptions in machine operation, yet large volume quality control is maintained.

During the initial warm-up period, the control unit 5 automatically adjusts the target value to track trends in the incoming measured signals. Throughout this warm-up period, which in this embodiment extends for at least 2048 hits, the control unit 5 checks the measured signal, as discussed above, and interrupts machine operation if any of the individual or average measured signals falls outside the respective tolerance window. In addition, the control unit 5 operates during the warm-up period to calculate 256 hit averages of the measured signal and to reset the target value to the most recent 64 hit average in the event that a 256 hit average deviates from the old target value by more than one-half the tolerance factor. Once the target value has not changed for 2048 hits, the control unit 5 is prevented from further automatic alteration of the target value without interrupting machine operation.

This feature of the invention saves operator time, in that the operator need not monitor machine operation during the warm-up period when the measured signal changes slowly. Rather, the control unit 5 operates simultaneously to monitor and control machine operation while revising the target value to track gradual trends in the measured signal. Of course, it should be understood that the particular criteria described above for determining how to revise the target value and when to prevent further revision of the target value are merely illustrative of the presently preferred embodiment, and are not to be construed as limiting; other criteria may be used in alternative embodiments.

Provision is made to impart a tolerance factor to adjust the sizes of the tolerance windows. These factors are identified by the numbers "1" through "9." This provision can best be explained through an example. Thus, if a factor of "1" is entered, each sixty-four hit average must be within 1/128 of the target value, each sixteen hit average must be within 2/128 of the target value, each four hit average must be within 4/128, and each single value of the measured signal must be 8/128 of the target value. However, if the tolerance factor were set at "2", then the tolerance windows would be twice as large. Further, if the factor were "3", then the tolerance windows would be three times as large, and so on. It will be appreciated that other forms of adjustment and window selection can easily be made.

In an alternative embodiment (not shown), the program for the control unit 5 may be modified to provide the operator with further information in order further to reduce unnecessary interruptions of machine operation in the production mode. In this embodiment the control unit 5 provides a warning indication to the operator whenever any of the measured signal averages or any of the individual values of the measured signal nears an extreme of the respective threshold window. For example, assuming the threshold window for the four-hit average is 80 to 120 units of hit energy, the control unit 5 can be programmed to provide the warning indication whenever the four-hit average is within the range 80–120 but outside the range 85–115, or even 90–110. The operator may then adjust machine operation to make the measured signal more nearly equal the target value, thereby avoiding an unnecessary interruption of machine operation. This feature can advantageously be combined with the features discussed above in connection with the figures.

The embodiments described above, although preferred, are to be taken as illustrative. It will be understood that many modifications to the described and illustrated embodiments can be made within the spirit of the present invention, which is defined by the following claims.

```
Nuvatec Z80 assembler   Release 1 92          Mon Dec 28 10:36:49 1981

pwrup2.s

Addr/     Object  File   Ass'y
Section   Code    Line#  Line# + S t a t e m e n t
-------   ------  -----  -----   ---------------------------------------------
                              1           list    "off"
0000/00                5    212           section "ROM"
                       6    213
                       7    214   ;-----------------------------------------------------------;
                       8    215   ;
                       9    216   ;  Name:           pwrup
                      10    217   ;
                      11    218   ;  Function:       performs initializations and starts main loop @ power-up
                      12    219   ;
                      13    220   ;  Needs:
                      14    221   ;
                      15    222   ;  Returns:
                      16    223   ;
                      17    224   ;  Destroys:
                      18    225   ;
                      19    226   ;  Other Comments:
                      20    227   ;
                      21    228   ;-----------------------------------------------------------;
                      22    229
002a                  23    230   SETUPclock      equu    0x2a          ; clock divisor
000a                  24    231   AD_SETUPmode    equ     0x0a     ; alpha display/kybd mode
000c                  25    232   ND_SETUPmode    equ     0x0c     ; numeric display/hit-input mode
                      26    233
                      27    234           ;-------------------------------; insert jump to pwrup @ location 0
0000                  28    235           aorg    0                       ;
0000      E3          29    236           di
0001      C30000      30    237           jp      pwrup                   ;
                      31    238
0004                  32    239           aorg    08h                     ;interupt vector for port A PIO
0008      0000        33    240           dw      hitint
000a                  34    241           aorg    10h                     ;interupt vector for port B PIO
0010      0000        35    242           dw      keyint
                      36    243
0000/00               37    244           section "ROM"
                      38    245
                      39    246           import  stacktop, clscon, machsta, machstb, ram1_begin
                      40    247           import  clocktick, upd_ndisps, errchk, keybrd, valid, hitint, keyint
                      41    248           import  tol
                      42    249           export  pwrup, mainloop
                      43    250
0000/00               44    251   pwrup:
0000/00   E3          45    252           di                              ;disable dinterupts
0001/00   310000      46    253           ld      sp,stacktop             ; init stack pointer
0004/00   ED5E        47    254           im      2                       ;set interupt mode 2 (vector from PIO)
0006/00   3E00        48    255           ld      a,0                     ;set up I register for interupts
0008/00   ED47        49    256           ld      i,a
                      50    257    ;now set up PIO with individual vectors for each port
                      51    258    ;at the present time, the PIO is map as a memory location
                      52    259    ; at a later time it should be set up as a port, so this
                      53    260    ; section of code will have to be changed
000a/00   3E08        54    261           ld      a,08h                   ;set interupt vector for port
000c/00   D30A        55    262           out     (0ah),a
000e/00   3ECF        56    263           ld      a,0cfh                  ;operation mode 3
0010/00   D30A        57    264           out     (0ah),a
0012/00   3EFF        58    265           ld      a,0ffh                  ;all lines are input
0014/00   D30A        59    266           out     (0ah),a
0016/00   3E37        60    267           ld      a,037h                  ;set mask (dis-int,or,high,mask follows)
0018/00   D30A        61    268           out     (0ah),a
001a/00   3EF0        62    269           ld      a,0f0h
001c/00   D30A        63    270           out     (0ah),a
001e/00   3E10        64    271           ld      a,10h                   ;set inerupt vector
0020/00   D30B        65    272           out     (0bh),a
0022/00   3ECF        66    273           ld      a,0cfh                  ;operation mode 3
0024/00   D30B        67    274           out     (0bh),a
0026/00   3E03        68    275           ld      a,003h                  ;only lines 1 & 0 are input
0028/00   D30B        69    276           out     (0bh),a
002a/00   3E37        70    277           ld      a,037h                  ;set mask (same as A)
```

```
002c/00 D30B       71    278          out     (Obh),a
002e/00 3EFC       72    279          ld      a,Ofch                      ;only watch lines 1 & O for interupt
0030/00 D30B       73    280          out     (Obh),a
0032/00 3ECF       74    281          ld      a,Ocfh                      ;operation mode 3
0034/00 D312       75    282          out     (12h),a
0036/00 3E10       76    283          ld      a,010h                      ;line 4 is input
0038/00 D312       77    284          out     (12h),a

Nuvatec Z80 assembler   Release 1.92        Mon Dec 28 10:36:49 1981

pwrup2.s

Addr/    Object   File    Ass'y
Section  Code     Line#   Line# + S t a t e m e n t
-------  -------  -----   -----   -------------------------------------------------------------
003a/00 3ECF       78    285          ld      a,Ocfh                      ;other one now
003c/00 D313       79    286          out     (13h),a
003e/00 3EFF       80    287          ld      a,Offh                      ;all input
0040/00 D313       81    288          out     (13h),a
                   82    289  ;test valid bytes to see if static ram area should be cleared
0042/00 3A0000     83    290          ld      a,(valid)                   ;get first
0045/00 FE55       84    291          cp      55h
0047/00 2007       85    292          jr      nz,zero                     ;not retained so kill ram
0049/00 3A0100     86    293          ld      a,(valid+1)
004c/00 FEAA       87    294          cp      Oaah                        ;how bout the second
004e/00 2817       88    295          jr      z,noclr
0050/00            89    296  zero:
                   90    297          ;--------------------------------; zero 1st section of ram
0050/00 210000     91    298          ld      hl,ram1_begin               ;
0053/00 110100     92    299          ld      de,ram1_begin+1             ;
0056/00 01FF03     93    300          ld      bc,03ffh                    ; count of ram to clear
0059/00 3600       94    301          ld      (hl),0                      ;
005b/00 EDB0       95    302          ldir                                ;
005d/00 3E55       96    303          ld      a,55h                       ;set valid byte locations
005f/00 320000     97    304          ld      (valid),a
0062/00 3EAA       98    305          ld      a,Oaah
0064/00 320100     99    306          ld      (valid+1),a
0067/00           100    307  noclr:
                  101    308   ;stop all machines
0067/00 210022    102    309          ld      hl,2200h
006a/00 114000    103    310          ld      de,40h
006d/00 0604      104    311          ld      b,4
006f/00           105    312  stplp:
006f/00 CBB6      106    313          res     0,(hl)
0071/00 CBBE      107    314          res     1,(hl)          ;reset machines
0073/00 19        108    315          add     hl,de
0074/00 10F9      109    316          djnz    stplp
0076/00 CD0000    110    317          call    clscon                      ;
                  111    318          ;--------------------------------; clear Displays
                  112    319          ; Note: the Clear All command to the displays can be used here, since
                  113    320          ;       we don't need to write to them for at least 180us.
0079/00 21013B    114    321          ld      hl,ND_CONTROL               ; First, Numeric display(s)
007c/00 36DF      115    322          ld      (hl),ND_CclrAll             ;
007e/00 362A      116    323          ld      (hl),SETUPclock             ;
0080/00 360C      117    324          ld      (hl),ND_SETUPmode           ;
0082/00 210130    118    325          ld      hl,AD_CONTROL               ; Then, Alphanumeric display
0085/00 36D3      119    326          ld      (hl),AD_CclrAll             ;
0087/00 362A      120    327          ld      (hl),SETUPclock             ;
0089/00 360A      121    328          ld      (hl),AD_SETUPmode           ;
                  122    329
                  123    330          ;--------------------------------; initialize machine section RAM
008b/00 FD210000  124    331          ld      iy,machsta                  ; init numeric display statuses
008f/00 210500    125    332          ld      hl,machsta+M_tcnt           ; by default, will display total count
0092/00 114000    126    333          ld      de,sizeof(mach_sect)        ;
0095/00 0604      127    334          ld      b,N_MACHINES                ;
0097/00           128    335  pu_nextmach:                                ;
0097/00 FD750E    129    336          ld      (iy+M_dptr),l               ;      so M_dptr pt's to total counter
009a/00 FD740F    130    337          ld      (iy+(M_dptr+1)),h           ;
009d/00 FD362400  131    338          ld      (iy+M_dfreq),DF_STEADY      ; set display blink frequency to 0
00a1/00 FD3623B0  132    339          ld      (iy+M_dstatus),DS_ON        ; set display blink status to ON
00a5/00 FD19      133    340          add     iy,de                       ; to next machine RAM block
00a7/00 19        134    341          add     hl,de                       ; pt hl to next machine's M_tcnt
00a8/00 10ED      135    342          djnz    pu_nextmach                 ;
                  136    343
                  137    344          ;--------------------------------; initialize hit section RAM
```

```
00aa/00 210000    138    345         ld     hl,machstb          ; zero it all first
00ad/00 110100    139    346         ld     de,machstb+1        ;
00b0/00 01FF03    140    347         ld     bc,3ffh             ;size of all machines storage B
00b3/00 3600      141    348         ld     (hl),0              ;
00b5/00 EDB0      142    349         ldir                       ;
00b7/00 3EFC      143    350         ld     a,0fch              ;reset timer before enabling
00b9/00 D309      144    351         out    (09h),a             ; interupts
00bb/00 AF        145    352         xor    a
00bc/00 D309      146    353         out    (09h),a             ;I don't know why
00be/00 CDE900    147    354         call   piores
00c1/00 CDE900    148    355         call   piores
00c4/00 CDE900    149    356         call   piores
00c7/00 CDE900    150    357         call   piores
00ca/00 3E83      151    358         ld     a,83h               ;enable interupts on port A & B

Nuvatec Z80 assembler   Release 1.92            Mon Dec 28 10:36:49 1981

pwrup2.s

Addr/      Object    File     Ass'y
Section    Code      Line#    Line#  + S t a t e m e n t
--------   -------   -----    -----  - ---------------------------------------------
00cc/00    D30A      152      359             out    (0ah),a
00ce/00    D30B      153      360             out    (0bh),a
00d0/00    FB        154      361             ei                         ; Enable interrupts now
                     155      362
00d1/00              156      363    mainloop:
00d1/00    F3        157      364             di
00d2/00    3E04      158      365             ld     a,04h               ;reset watch dog
00d4/00    D309      159      366             out    (09h),a
00d6/00    3E00      160      367             ld     a,00h
00d8/00    D309      161      368             out    (09h),a
00da/00    FB        162      369             ei
                     163      370                                        ;
00db/00    CD0000    164      371             call   upd_ndisps          ; update numeric displays
                     165      372                                        ;
00de/00    CD0000    166      373             call   errchk              ; check machine error flags
                     167      374                                        ;
00e1/00    CD0000    168      375             call   keybrd              ;keybrd translation and monitor
                     169      376                                        ;
00e4/00    CD0000    170      377             call   tol                 ;threshold testing.
00e7/00    18E8      171      378             jr     mainloop            ;
                     172      379    ;
                     173      380    ;
00e9/00              174      381    piores:
00e9/00    ED4D      175      382             reti

No errors in this assembly

Symbol table entries used:       91/ 571
Symbol name characters used:    823/7500

Nuvatec Z80 assembler   Release 1.92            Mon Dec 28 10:36:49 1981

pwrup2.s
Symbol Table / Cross-Reference Listing

value    type     defined    name of symbol
-----    ----     -------    --------------

3001       e        22       AD_CONTROL
00d3       e        34       AD_CclrAll
00e0       e        43       AD_Cendint
0040       e        40       AD_CreadKEY
0090       e        31       AD_Cwrite
3000       e        21       AD_DATA
000a       e       231       AD_SETUPmode
0003       e        11       BCD_NUMLEN
0010       e        13       CLOCKRATE
0008       e        58       DF_BLINK2
0020       e        57       DF_ERRBLINK
0000       e        55       DF_STEADY
0008       e        56       DS_BRKBLINK
0080       e        52       DS_ON
```

```
0005/--                184     H_acc16
0002/--                182     H_acc4
0008/--                186     H_acc64
000b/--                189     H_bbufp
000c/--                191     H_buf
0000/--                173     H_cflags
0004/--                183     H_cnt16
0001/--                181     H_cnt4
0007/--                185     H_cnt64
000a/--                188     H_fbufp
0015/--                193     H_hitclk
0016/--                194     H_hitclksv
0014/--                192     H_static
0018/--                196     H_trcnt
0017/--                195     H_trend
0008          e         66     KEY_BS
000a          e         65     KEY_ENTER
000d          e         67     KEY_NEXT
000b/--                131     M_bcnt
0024/--                159     M_dfreq
000e/--                133     M_dptr
0023/--                157     M_dstatus
0001/--                121     M_errflags
0025/--                163     M_fcdis
0000/--                102     M_flags
002d/--                164     M_hitclk
0008/--                130     M_setbcnt
0002/--                128     M_settcnt
0005/--                129     M_tcnt
0020/--                154     M_tcount
0010/--                137     M_tol1
0018/--                145     M_tol16
0014/--                141     M_tol4
001c/--                149     M_tol64
0022/--                155     M_tolfac
0010/--                136     M_tols
3801          e         25     ND_CONTROL
00df          e         35     ND_CclrAll
00c2          e         38     ND_CclrF
00e0          e         44     ND_Cendint
0040          e         41     ND_CreadHIT
0090          e         32     ND_Cwrite
3800          e         24     ND_DATA
000c          e        232     ND_SETUPmode
0006          e         10     NUMLEN
0002          e          8     N_HITS
0004          e          7     N_MACHINES
0003/--                208     RS_fw
0002/--                207     RS_maxfw
0001/--                206     RS_pos
0000/--                205     RS_startpos
002a          e        230     SETUPclock
00ff          e         15     WATCHDOG
0000/06 ?  I           ---     clocktick
0000/02 ?  I           ---     clscon
0000/08 ?  I           ---     errchk
0080/--     s          171     hit_sect
0000/0b ?  I           ---     hitint
0000/09 ?  I           ---     keybrd
0000/0c ?  I           ---     keyint
0040/--     s           99     mach_sect

Nuvatec Z80 assembler   Release 1.92          Mon Dec 28 10:36:49 1981

pwrup2.s
Symbol Table / Cross-Reference Listing

value      type       defined      name of symbol
-------    -------    -------      ----------------

0000/03 ?  I           ---     machsta
0000/04 ?  I           ---     machstb
00d1/00     E          363     mainloop
0067/00                307     noclr
00e9/00                381     piores
0097/00                335     pu_nextmach
```

```
0000/00   E         251         pwrup
00eb/00     s       244         pwrup2.s
0000/05 ?  I        ---         ram1_begin
0004/--     s       204         rsarg_sect
0000/01 ?  I        ---         stacktop
006f/00             312         stplp
0000/0d ?  I        ---         tol
0000/07 ?  I        ---         upd_ndisps
0000/0a ?  I        ---         valid
0050/00             296         zero

Nuvatec 780 assembler   Release 1.92          Tue Dec 29 11:10.17 1981

tol.s

Addr/     Object     File    Ass'y
Section   Code       Line#   Line# + S t a t e m e n t
-------   --------   -----   -----   ----------------------------------------------------------------
                          1            list    "off"
0000/00                   5    212     section "ROM"
                          6    213   ;
                          7    214   ;section A
                          8    215   ;
                          9    216   ;TOL: determine a need for hit force evaluation and do initial setup
                         10    217   ;     if evaluation is necessary
                         11    218   ;
                         12    219   ;------------------------------------------------------------------
                         13    220   ;EXTERNAL REFERENCES
                         14    221   ;
                         15    222   ;MACHSTA - start of machine strage area A
                         16    223   ;MACHSTB - start of machine storage are B
                         17    224   ;ACCUM - accumulation and tolerance subroutine
                         18    225   ;
                         19    226   ;------------------------------------------------------------------
                         20    227   ;needs - nothing
                         21    228   ;destroys and returns nothing of true need
                         22    229         entry   tol,stpmch
                         23    230         extrn   machsta,machstb,bcd3_incr,machref
                         24    231         global  accum
                         25    232   ;
0000/00                  26    233  tol:
0000/00   FD211400       27    234         ld      iy,machsta+M_tol4     ;load IY with address of storage area A
                         28    235                                       ; +20 to index to 4-hit force values
0004/00   210000         29    236         ld      hl,machsta
0007/00   DD210000       30    237         ld      ix,machstb            ; and IX with area B
000b/00   0608           31    238         ld      b,8                   ;8 buffers to test
000d/00                  32    239  tloop:
000d/00   DDE5           33    240         push    ix                    ;save pointers to storage locations
000f/00   FDE5           34    241         push    iy
0011/00   C5             35    242         push    bc
0012/00   E5             36    243         push    hl                    ;save flag address reference
0013/00   DDE5           37    244         push    ix                    ;set HL to buffer pointers
0015/00   E1             38    245         pop     hl
0016/00   1600           39    246         ld      d,0
0018/00   1E0A           40    247         ld      e,H_fbufp             ;set DE to pointer offset value
001a/00   19             41    248         add     hl,de
001b/00   7E             42    249         ld      a,(hl)                ;load A with front buffer pointer
001c/00   23             43    250         inc     hl                    ;set to back pointer
001d/00   5E             44    251         ld      e,(hl)                ;get back pointer into E
001e/00   BB             45    252         cp      e                     ;if back and front equal then buffer empty
001f/00   2833           46    253         jr      z,bufempty
0021/00   3E07           47    254         ld      a,07h                 ;put pointer mask value into A
0023/00   1C             48    255         inc     e                     ;update pointer
0024/00   A3             49    256         and     e                     ;&& against mask
0025/00   77             50    257         ld      (hl),a                ;restore updated pointer
0026/00   19             51    258         add     hl,de                 ;reference address or hit force
0027/00   7E             52    259         ld      a,(hl)                ;get hit force into A for evaluation
0028/00   E1             53    260         pop     hl                    ;set HL back to machine flags
0029/00   E5             54    261         push    hl
002a/00   CD0000         55    262         call    accum                 ;go do accumulation and evaluation
002d/00   E1             56    263         pop     hl                    ;get back flags and loop count
002e/00   C1             57    264         pop     bc
002f/00   C5             58    265         push    bc
0030/00   E5             59    266         push    hl
0031/00   CB40           60    267         bit     0,b                   ;add to count if in second hit test
```

```
0033/00 2B1F       61    268             jr      z,bufempty
0035/00 CB4E       62    269             bit     1,(hl)        ;if in production at all then add to counters
0037/00 2B12       63    270             jr      z,tbump
0039/00 110500     64    271             ld      de,M_tcnt     ;off set to total parts counter
003c/00 19         65    272             add     hl,de
003d/00 E5         66    273             push    hl
003e/00 110600     67    274             ld      de,6          ;offset to break counter
0041/00 19         68    275             add     hl,de
0042/00 CD0000     69    276             call    bcd3_incr
0045/00 E1         70    277             pop     hl
0046/00 CD0000     71    278             call    bcd3_incr
0049/00 1809       72    279             jr      bufempty
004b/00            73    280     tbump:
004b/00 CB46       74    281             bit     0,(hl)        ;if set then bump test counter
004d/00 2805       75    282             jr      z,bufempty
004f/00 112000     76    283             ld      de,M_tcount
0052/00 19         77    284             add     hl,de

Nuvatec Z80 assembler   Release 1.92          Tue Dec 29 11:10:17 1981

tol.s

Addr/    Object   File   Ass'y
Section  _Code_   Line#  Line# + S t a t e m e n t
-------  -------  -----  -----  - -----------------------------------------
0053/00 34         78    285             inc     (hl)
0054/00            79    286     bufempty:
0054/00 E1         80    287             pop     hl            ;reinstate pointers
0055/00 C1         81    288             pop     bc
0056/00 FDE1       82    289             pop     iy
0058/00 DDE1       83    290             pop     ix
005a/00 CB40       84    291             bit     0,b           ;test for 1 or 2 hit incrementation
005c/00 CADE00     85    292             jp      z,sechit
005f/00 FDE5       86    293             push    iy            ;save IY and HL for a bit
0061/00 E5         87    294             push    hl
0062/00 E5         88    295             push    hl            ;get start of that machines storage in HL
0063/00 FDE1       89    296             pop     iy            ; into the IY reg
0065/00 CB4E       90    297             bit     1,(hl)        ;test if in either production mode
0067/00 2857       91    298             jr      z,tmode
0069/00 DD7E00     92    299             ld      a,(ix+0)      ;test if thresholds are set for both hits 1 & 2
006c/00 DDA680     93    300             and     (ix-128)
006f/00 CB4F       94    301             bit     1,a           ;if both were set then set thresholds gotten
0071/00 2804       95    302             jr      z,trytrn
0073/00 CBDE       96    303             set     3,(hl)
0075/00 CB86       97    304             res     0,(hl)        ;place in just production
0077/00            98    305     trytrn:
0077/00 CB57       99    306             bit     2,a           ;trend steady?
0079/00 2802      100    307             jr      z,notyet
007b/00 CBEE      101    308             set     5,(hl)
007d/00           102    309     notyet:
007d/00 0E03      103    310             ld      c,3
007f/00 1E00      104    311             ld      e,0
0081/00 FDE5      105    312             push    iy            ;save it
0083/00 CDEC00    106    313             call    tbreak        ;test if machine should be stopped because
0086/00 FDE1      107    314             pop     iy            ;restore IY
0088/00 CB43      108    315             bit     0,e           ;if set then machine was stopped
008a/00 2804      109    316             jr      z,arol
008c/00 CBFE      110    317             set     7,(hl)        ;indicate that production done
008e/00 181D      111    318             jr      reins
0090/00           112    319     arol:
0090/00 110600    113    320             ld      de,06h
0093/00 FD19      114    321             add     iy,de
0095/00 FD7E02    115    322             ld      a,(iy+2)      ;test if break count is 0
0098/00 FDB603    116    323             or      (iy+3)        ; if so then forget break count test
009b/00 FDB604    117    324             or      (iy+4)
009e/00 282F      118    325             jr      z,reind
00a0/00 0E03      119    326             ld      c,3
00a2/00 1E00      120    327             ld      e,0
00a4/00 CDEC00    121    328             call    tbreak
00a7/00 CB43      122    329             bit     0,e                   ;if set then stop occured
00a9/00 2824      123    330             jr      z,reind
00ab/00 CBF6      124    331             set     6,(hl)                ;indicate break count stop
00ad/00           125    332     reins:
```

```
                          126   333    ;reset display pointer to show total parts produced
00ad/00 E5                127   334            push    hl                      ;set IY to start of area
00ae/00 110500            128   335            ld      de,M_tcnt
00b1/00 FDE1              129   336            pop     iy
00b3/00 19                130   337            add     hl,de
00b4/00 FD750E            131   338            ld      (iy+M_dptr),l
00b7/00 FD740F            132   339            ld      (iy+M_dptr+1),h
00ba/00 FD362408          133   340            ld      (iy+M_dfreq),DS_BRKBLINK        ;set slow blink
00be/00 180F              134   341            jr      reind
00c0/00                   135   342   tmode:
00c0/00 FD7E20            136   343            ld      a,(iy+M_tcount) ;test if counter up to 100
00c3/00 FE64              137   344            cp      100             ;allow 100 parts each shot
00c5/00 FACF00            138   345            jp      m,reind
00c8/00 CDFE00            139   346            call    stpmch
00cb/00 E1                140   347            pop     hl              ;indicate test run limit meant
00cc/00 E5                141   348            push    hl
00cd/00 CBEE              142   349            set     5,(hl)
00cf/00                   143   350   reind:
00cf/00 E1                144   351            pop     hl              ;reinstate indexes
00d0/00 FDE1              145   352            pop     iy
00d2/00 114000            146   353            ld      de,40h
00d5/00 19                147   354            add     hl,de
00d6/00 FD2B              148   355            dec     iy
00d8/00 FD2B              149   356            dec     iy
00da/00 FD19              150   357            add     iy,de
00dc/00 1804              151   358            jr      back

Nuvatec Z80 assembler   Release 1.92           Tue Dec 29 11:10:17 1981

tol.s


Addr/    Object  File   Ass'y
Section   Code   Line#  Line# + S t a t e m e n t

00de/00                   152   359   sechit:
00de/00 FD23              153   360            inc     iy
00e0/00 FD23              154   361            inc     iy
00e2/00                   155   362   back:
00e2/00 118000            156   363            ld      de,80h          ;set IX to next area
00e5/00 DD19              157   364            add     ix,de
00e7/00 05                158   365            dec     b               ;decrement loop count
00e8/00 C20D00            159   366            jp      nz,tloop
00eb/00 C9                160   367            ret
                          161   368    ;
                          162   369    ;TBREAK: test if production or break count of parts has been reached
00ec/00                   163   370   tbreak:
00ec/00 FD7E05            164   371            ld      a,(iy+5)        ;get high byte
00ef/00 FDBE02            165   372            cp      (iy+2)          ;compare
00f2/00 D8                166   373            ret     c
00f3/00 FD23              167   374            inc     iy
00f5/00 0D                168   375            dec     c
00f6/00 20F4              169   376            jr      nz,tbreak
00f8/00 CDFE00            170   377            call    stpmch          ;stop machine
00fb/00 1E01              171   378            ld      e,1
00fd/00 C9                172   379            ret
                          173   380    ;since count is equal then fall into subroutine to stop machine
                          174   381    ;
                          175   382    ;STPMCH: take loop count in B and call STOPMACH to stop machine
00fe/00                   176   383   stpmch:
00fe/00 C5                177   384            push    bc              ;save main loop count
00ff/00 05                178   385            dec     b
0100/00 CB28              179   386            sra     b               ;divide by 2
0102/00 3E04              180   387            ld      a,4             ;subtract B to determine machine number
0104/00 90                181   388            sub     b
0105/00 E5                182   389            push    hl
0106/00 D5                183   390            push    de
0107/00 CD0000            184   391            call    machref
010a/00 CB86              185   392            res     0,(hl)
010c/00 CB8E              186   393            res     1,(hl)          ;set to stop mode
010e/00 D1                187   394            pop     de
010f/00 E1                188   395            pop     hl
0110/00 C1                189   396            pop     bc              ;restore loop count
0111/00 C9                190   397            ret
                          191   398    ;
                          192   399    ;*********
```

```
0112/00          193   400          end

No errors in this assembly

Symbol table entries used:     87/ 571
Symbol name characters used:  758/7500

Nuvatec Z80 assembler   Release 1.92            Tue Dec 29 11:10:17 1981

tol.s
Symbol Table / Cross-Reference Listing

value     type        defined       name of symbol
-----     ----        -------       --------------

3001        e            22         AD_CONTROL
00d3        e            34         AD_CclrAll
00e0        e            43         AD_Cendint
0040        e            40         AD_CreadKEY
0090        e            31         AD_Cwrite
3000        e            21         AD_DATA
0003        e            11         BCD_NUMLEN
0010        e            13         CLOCKRATE
0008        e            58         DF_BLINK2
0020        e            57         DF_ERRBLINK
0000        e            55         DF_STEADY
0008        e            56         DS_BRKBLINK
0080        e            52         DS_ON
0005/--                 184         H_acc16
0002/--                 182         H_acc4
0008/--                 186         H_acc64
000b/--                 189         H_bbufp
000c/--                 191         H_buf
0000/--                 173         H_cflags
0004/--                 183         H_cnt16
0001/--                 181         H_cnt4
0007/--                 185         H_cnt64
000a/--                 188         H_fbufp
0015/--                 193         H_hitclk
0016/--                 194         H_hitclksv
0014/--                 192         H_static
0018/--                 196         H_trcnt
0017/--                 195         H_trend
0008        e            66         KEY_BS
000a        e            65         KEY_ENTER
000d        e            67         KEY_NEXT
000b/--                 131         M_bcnt
0024/--                 159         M_dfreq
000e/--                 133         M_dptr
0023/--                 157         M_dstatus
0001/--                 121         M_errflags
0025/--                 163         M_fcdis
0000/--                 102         M_flags
002d/--                 164         M_hitclk
0008/--                 130         M_setbcnt
0002/--                 128         M_settcnt
0005/--                 129         M_tcnt
0020/--                 154         M_tcount
0010/--                 137         M_tol1
0018/--                 145         M_tol16
0014/--                 141         M_tol4
001c/--                 149         M_tol64
0022/--                 155         M_tolfac
0010/--                 136         M_tols
3801        e            25         ND_CONTROL
00df        e            35         ND_CclrAll
00c2        e            38         ND_CclrF
00e0        e            44         ND_Cendint
0040        e            41         ND_CreadHIT
0090        e            32         ND_Cwrite
3800        e            24         ND_DATA
0006        e            10         NUMLEN
0002        e             8         N_HITS
0004        e             7         N_MACHINES
0003/--                 208         RS_fw
0002/--                 207         RS_maxfw
0001/--                 206         RS_pos
```

```
0000/--                205         RS_startpos
00ff          e         15         WATCHDOG
0000/05 ?G I           ---         accum
0090/00                319         arol
00e2/00                362         back
0000/03 ?  I           ---         bcd3_incr
0054/00                286         bufempty
0080/--      s         171         hit_sect
0040/--      s          99         mach_sect
0000/04 ?  I           ---         machref
0000/01 ?  I           ---         machsta
0000/02 ?  I           ---         machstb
007d/00                309         notyet

Nuvatec Z80 assembler   Release 1.92          Tue Dec 29 11.10:17 1981

tol.s
Symbol Table / Cross-Reference Listing

value    type       defined     name of symbol
_______  ________   _______     ______________

00cf/00              350        reind
00ad/00              332        reins
0004/--     s        204        rsarg_sect
00de/00              359        sechit
00fe/00    E         383        stpmch
00ec/00              370        tbreak
004b/00              280        tbump
000d/00              239        tloop
00c0/00              342        tmode
0000/00    E         233        tol
0112/00     s        212        tol.s
0077/00              305        trytrn

Nuvatec Z80 assembler   Release 1.9           Wed Nov 11 14:41:23 1981

accum.s

Addr/     Object   File   Ass'y
Section   Code     Line#  Line# + S t a t e m e n t
_______   ______   _____  _____   _________________________________________

                           1             list      "off"
0000/00             5    212             section   "ROM"
                    6    213
                    7    214     ;section A
                    8    215     ;
                    9    216     ;ACCUM: do accumulation of hit force and test within tolerance levels
                   10    217     ;------------------------------------------------------------------
                   11    218     ;
                   12    219     ;EXTERNAL REFERENCES
                   13    220     ;
                   14    221     ;STPMCH: routine to determine machine number and stop machine
                   15    222     ;
                   16    223     ;------------------------------------------------------------------
                   17    224     ;needs: IX set to specific hit storage area
                   18    225     ;       IY set to start of tolerance values for specific hit testing
                   19    226     ;       HL set to machine flags
                   20    227     ;       A  contains force measurement from buffer
                   21    228     ;
                   22    229     ;returns and destroys: count on it
                   23    230     ;
                   24    231             entry     accum
                   25    232             global    stpmch
                   26    233     ;
0000/00            27    234     accum:
0000/00  FDE5      28    235             push      iy          ;save index to thresholds
0002/00  DDE5      29    236             push      ix
0004/00  0E03      30    237             ld        c,3         ;set C to count down accumulation passes
0006/00  C5        31    238             push      bc          ;save B on to stack for to retain machine number
0007/00  CD1B01    32    239             call      acc         ;call accumulation
000a/00  59        33    240             ld        e,c         ;save return count
000b/00  C1        34    241             pop       bc          ;reinstate machine number
000c/00  4B        35    242             ld        c,e
```

```
000d/00 DDE1      36   243              pop    ix
000f/00 FDE1      37   244              pop    iy
0011/00 CB51      38   245              bit    2,c              ;if set then was out of tolerance
0013/00 2825      39   246              jr     z,thresh
0015/00 CB4E      40   247              bit    1,(hl)           ;if in test mode then hell with it
0017/00 C8        41   248              ret    z
0018/00           42   249     stpr:
0018/00 23        43   250              inc    hl               ;set to error flags
0019/00 CBF6      44   251              set    6,(hl)           ;set to show that short count fault
001b/00 CB49      45   252              bit    1,c              ;if set then either 16 or 4 hit wrong
001d/00 2004      46   253              jr     nz,shrt
001f/00 CBB6      47   254              res    6,(hl)
0021/00 CBFE      48   255              set    7,(hl)           ;set to indicate high count fault
0023/00           49   256     shrt:
0023/00 CBDE      50   257              set    3,(hl)           ;assume error on hit 1
0025/00 CB40      51   258              bit    0,b
0027/00 2804      52   259              jr     z,hit1           ;true on branch
0029/00 CB96      53   260              res    2,(hl)
002b/00 CBDE      54   261              set    3,(hl)
002d/00           55   262     hit1:
002d/00 CBC6      56   263              set    0,(hl)           ;assume threshold to high
002f/00 CB59      57   264              bit    3,c              ;check it out
0031/00 2004      58   265              jr     nz,hgh
0033/00 CB86      59   266              res    0,(hl)
0035/00 CBCE      60   267              set    1,(hl)
0037/00           61   268     hgh:
0037/00 C30000    62   269              jp     stpmch           ;stop the machine
003a/00           63   270     thresh:
003a/00 08        64   271              ex     af,af'           ;save returned hit force in A'
003b/00 AF        65   272              xor    a                ;if equal to 0 then test if thresholds
003c/00 B9        66   273              cp     c                ; should be determined
003d/00 C0        67   274              ret    nz
003e/00 7E        68   275              ld     a,(hl)           ;get flags into A
003f/00 E603      69   276              and    03h
0041/00 FE03      70   277              cp     3                ;are we in intermediate mode
0043/00 C2CF00    71   278              jp     nz,trend         ;test if adjustments being made
0046/00 DDCB0046  72   279              bit    0,(ix+0)         ;tolerance values setup
004a/00 2805      73   280              jr     z,setemup        ;go develope tolerances
004c/00 DDCB00CE  74   281              set    1,(ix+0)         ;indicate that thresholds held up
0050/00 C9        75   282              ret                     ; production mode alone
0051/00           76   283     setemup:
0051/00 08        77   284              ex     af,af'           ;get force back out of alternate register

Nuvatec Z80 assembler   Release 1.9               Wed Nov 11 14:41:23 1981

accum.s

Addr/     Object    File   Ass'y
Section   Code      Line#  Line# + S t a t e m e n t
-------   ------    -----  ----- - -------------------------------------------------------

0052/00 F5        78   285              push   af
0053/00 DD9614    79   286              sub    (ix+H_static)          ;see if value is staying static
0056/00 2829      80   287              jr     z,static
0058/00 CB7F      81   288              bit    7,a              ;if negative, set to positive
005a/00 2803      82   289              jr     z,poss
005c/00 EEFF      83   290              xor    0ffh
005e/00 3C        84   291              inc    a
005f/00           85   292     poss:
005f/00 E5        86   293              push   hl
0060/00 112200    87   294              ld     de,M_tolfac      ;referance tolerance
0063/00 19        88   295              add    hl,de
0064/00 5E        89   296              ld     e,(hl)           ;get value into E
0065/00 1C        90   297              inc    e
0066/00 CB2B      91   298              sra    e                ;must be 1/2 of tolerance factor
0068/00 1C        92   299              inc    e                ;bump by 1 for test adjustment
0069/00 E1        93   300              pop    hl               ;restore HL
006a/00 93        94   301              sub    e                ;make sure less then tolerance factor
006b/00 FA8100    95   302              jp     m,static
006e/00 F1        96   303              pop    af               ;save this new value
006f/00 DD7714    97   304              ld     (ix+H_static),a
0072/00 DD7E00    98   305              ld     a,(ix+0)         ;get flags because this saving will only go
0075/00 C640      99   306              add    40h              ; on 4 times
0077/00 DD7700    100  307              ld     (ix+0),a         ;re-save the counter
007a/00 D0        101  308              ret    nc
007b/00 23        102  309              inc    hl               ;set error flag
```

```
007c/00 CBE6        103    310            set    4,(hl)
007e/00 C30000      104    311            jp     stpmch
0081/00             105    312   static:
0081/00 DDCB00BE    106    313            res    7,(ix+0)               ;reset any static force counts
0085/00 DDCB00B6    107    314            res    6,(ix+0)
0089/00 F1          108    315            pop    af                  ;get back force to compute thresholds from
008a/00 DD7714      109    316            ld     (ix+H_static),a     ;store the static value that is to be used
008d/00 CB66        110    317            bit    4,(hl)              ;if production not set then screw it
008f/00 C8          111    318            ret    z
0090/00 E5          112    319            push   hl                  ;save flag reference
0091/00 112200      113    320            ld     de,M_tolfac         ;offset to tolerance values
0094/00 19          114    321            add    hl,de
0095/00 6E          115    322            ld     l,(hl)              ;get tolerance into L
0096/00 CB25        116    323            sla    l                   ;multilpy by 8 for single threshold tolerance
0098/00 CB25        117    324            sla    l
009a/00 CB25        118    325            sla    l
009c/00 0604        119    326            ld     b,4                 ;4 thresholds to compute
009e/00 11FCFF      120    327            ld     de,-4               ;set IY back to begining of buffer
00a1/00 FD19        121    328            add    iy,de
00a3/00             122    329   settol:
00a3/00 F5          123    330            push   af                  ;save average value
00a4/00 F5          124    331            push   af
00a5/00 3C          125    332            inc    a                   ;add 1 for flutter
00a6/00 85          126    333            add    l                   ;add in tolerance
00a7/00 3002        127    334            jr     nc,ok1              ;if no carry then okay
00a9/00 3EFF        128    335            ld     a,0ffh
00ab/00             129    336   ok1:
00ab/00 FD7701      130    337            ld     (iy+1),a            ;save it away
00ae/00 F1          131    338            pop    af                  ;get back average
00af/00 37          132    339            scf                        ;set carry flag for subtraction
00b0/00 95          133    340            sub    l                   ;get low value
00b1/00 3002        134    341            jr     nc,ok2              ;if carry flag unaffected then okay
00b3/00 3E01        135    342            ld     a,1                 ;absolute minimum
00b5/00             136    343   ok2:
00b5/00 FD7700      137    344            ld     (iy+0),a
00b8/00 F1          138    345            pop    af
00b9/00 110400      139    346            ld     de,4                ;set to next thresholds
00bc/00 FD19        140    347            add    iy,de
00be/00 CB2D        141    348            sra    l
00c0/00 10E1        142    349            djnz   settol
00c2/00 E1          143    350            pop    hl                  ;get back flag location
00c3/00 DDCB00C6    144    351            set    0,(ix+0)                ;indicate tolerances set
00c7/00             145    352   restr:
00c7/00 AF          146    353            xor    a                   ;clear trend accumulator and counter
00c8/00 DD7717      147    354            ld     (ix+H_trend),a
00cb/00 DD7718      148    355            ld     (ix+H_trcnt),a
00ce/00 C9          149    356            ret
                    150    357    ;trend: test if initial base line is hholding valid
00cf/00             151    358   trend:

Nuvatec Z80 assembler   Release 1.9            Wed Nov 11 14:41:23 1981

accum.s

Addr/    Object   File   Ass'y
Section  Code     Line#  Line# + S t a t e m e n t
-------  -------- -----  ----- - ---------------------------------------------
00cf/00 CB4E        152    359            bit    1,(hl)              ;test if in production mode
00d1/00 C8          153    360            ret    z
00d2/00 DDCB0056    154    361            bit    2,(ix+0)            ;trend steady for this hit?
00d6/00 C0          155    362            ret    nz
00d7/00 E5          156    363            push   hl                  ;get the tolerance factor
00d8/00 112200      157    364            ld     de,M_tolfac
00db/00 19          158    365            add    hl,de
00dc/00 4E          159    366            ld     c,(hl)              ;into C we go
00dd/00 E1          160    367            pop    hl                  ;restore HL
                    161    368    ;trend result must be within 1/2 of tol factor, since accumulation is over
                    162    369    ; an accum. of 4 times, the factor in C will be times 2 +1
00de/00 CB21        163    370            sla    c
00e0/00 0C          164    371            inc    c
00e1/00 08          165    372            ex     af,af'              ;get back 64-bit force average
00e2/00 F5          166    373            push   af                 *;save onto stack
00e3/00 08          167    374            ex     af,af'              ;put it back where it came from
00e4/00 F1          168    375            pop    af
```

```
00e5/00 DD9614    169   376            sub     (ix+H_static)     ;subtract static value
00e8/00 DD8617    170   377            add     (ix+H_trend)      ;accumulate differances
00eb/00 DD7717    171   378            ld      (ix+H_trend),a    ;store it back
00ee/00 DD3418    172   379            inc     (ix+H_trcnt)      ;inc trend counter
00f1/00 DD7E18    173   380            ld      a,(ix+H_trcnt)    ;put it back
00f4/00 E603      174   381            and     03h               ;see if 4 times through
00f6/00 C0        175   382            ret     nz                ;return if not 4
00f7/00 DD7E17    176   383            ld      a,(ix+H_trend)    ;get differance accumulation
00fa/00 CB7E      177   384            bit     7,a               ;if negative then pos. it
00fc/00 2803      178   385            jr      z,nott
00fe/00 EEFF      179   386            xor     0ffh
0100/00 3C        180   387            inc     a
0101/00           181   388     nott:
0101/00 B9        182   389            cp      c                 ;got to be within 5 accumulated
0102/00 F21001    183   390            jp      p,doagn
0105/00 DDCB186E  184   391            bit     5,(ix+H_trcnt)    ;32 test tries (32*64 parts for trend shutdown)
0109/00 C8        185   392            ret     z
010a/00 DDCB00D6  186   393            set     2,(ix+0)          ;indicate trend for this hit steady
010e/00 18B7      187   394            jr      restr             ;reset locations for trending
0110/00           188   395     doagn:
0110/00 CBC6      189   396            set     0,(hl)            ;set back into intermediate mode
0112/00 DDCB008E  190   397            res     1,(ix+0)          ;reset that thresholds held
0116/00 CB9E      191   398            res     3,(hl)            ;reset that threshold are made
0118/00 C35100    192   399            jp      setemup           ;recompute thresholds
                  193   400     ;
                  194   401     ;ACC:  add to accumulation
                  195   402     ;
                  196   403     ;Needs:          A - force value to add to accumulator
                  197   404     ;                IX- machstb area 4-hit counter
                  198   405     ;                IY- machsta area 4-hit threshold for specific cycle
                  199   406     ;                HL- flags for that machine
                  200   407     ;                C - count of accumulators
                  201   408     ;
                  202   409     ;Returns:  C = 0-3 for count down of accumulation cycles
                  203   410     ;                0  if it went through all accumulators, and A = 64-hit avg.
                  204   411     ;                4  if average was out of tolerance
                  205   412     ;
011b/00           206   413     acc:
011b/00 DD8603    207   414            add     (ix+3)            ;add to accumulator
011e/00 DD7703    208   415            ld      (ix+3),a          ;restore new value
0121/00 3E00      209   416            ld      a,0               ;add carry in if any
0123/00 DD8E02    210   417            adc     (ix+2)            ;high byte
0126/00 DD7702    211   418            ld      (ix+2),a          ;restore high byte of accumulation
0129/00 DD7E01    212   419            ld      a,(ix+1)          ;bump accumulation counter for specific hit acc.
012c/00 3C        213   420            inc     a
012d/00 E603      214   421            and     03h
012f/00 DD7701    215   422            ld      (ix+1),a          ;restore count
0132/00 C0        216   423            ret     nz                ;if non-zero then all done now
0133/00 DD5602    217   424            ld      d,(ix+2)          ;get accumulator value into DE
0136/00 DD5E03    218   425            ld      e,(ix+3)
0139/00 DD7703    219   426            ld      (ix+3),a          ;clear accumulator
013c/00 DD7702    220   427            ld      (ix+2),a
013f/00 7B        221   428            ld      a,e               ;if low 2 bits 11, bump to round off
0140/00 E603      222   429            and     03h
0142/00 FE03      223   430            cp      03h
0144/00 2004      224   431            jr      nz,noround
0146/00 1C        225   432            inc     e

Nuvatec Z80 assembler   Release 1.9           Wed Nov 11 14:41:23 1981

accum.s

Addr/    Object   File    Ass'y
Section   Code    Line#   Line# + S t a t e m e n t
-------  -------  -----   -----   -------------------------------------------

0147/00 2001      226   433            jr      nz,noround
0149/00 14        227   434            inc     d
014a/00           228   435     noround:
014a/00 CB2A      229   436            sra     d                 ;divide accumulated value by 4
014c/00 CB1B      230   437            rr      e
014e/00 CB2A      231   438            sra     d
0150/00 CB1B      232   439            rr      e
0152/00 7B        233   440            ld      a,e               ;get average force value into A
                  234   441     ;store force value away for force display program
0153/00 D5        235   442            push    de                ;save from destruction
```

```
0154/00 E5        236   443           push  hl
0155/00 C5        237   444           push  bc
0156/00 112C00    238   445           ld    de,M_fcdis+7    ;where hit-2 64-cnt is to be stored
0159/00 19        239   446           add   hl,de           ;set up HL
015a/00 CB40      240   447           bit   0,b             ;if set then 2 is okay
015c/00 2001      241   448           jr    nz,oyy
015e/00 2B        242   449           dec   hl              ;set to hit 1 spot
015f/00           243   450  oyy:
015f/00 0D        244   451           dec   c               ;bring C down till correct area is reached
0160/00 2807      245   452           jr    z,lddd
0162/00 2B        246   453           dec   hl
0163/00 2B        247   454           dec   hl
0164/00 0D        248   455           dec   c
0165/00 2802      249   456           jr    z,lddd
0167/00 2B        250   457           dec   hl
0168/00 2B        251   458           dec   hl
0169/00           252   459  lddd:
0169/00 77        253   460           ld    (hl),a
016a/00 C1        254   461           pop   bc              ;restore everything
016b/00 E1        255   462           pop   hl
016c/00 D1        256   463           pop   de
                  257   464  ;
016d/00 CB5E      258   465           bit   3,(hl)          ;should we test tolerance
016f/00 2814      259   466           jr    z,reaccum
0171/00 08        260   467           ex    af,af'          ;save force a bit
0172/00 FD5600    261   468           ld    d,(iy+0)        ;get low threshold into D and high into E
0175/00 FD5E01    262   469           ld    e,(iy+1)
0178/00 7A        263   470           ld    a,d             ;test if any values, if none then must be
0179/00 B3        264   471           or    e               ; in intermediate mode
017a/00 2809      265   472           jr    z,reaccum       ;since no tolerances then testing
017c/00 08        266   473           ex    af,af'          ;get the force back
017d/00 BA        267   474           cp    d               ;>= then low threshold
017e/00 FA9201    268   475           jp    m,nogl          ;if not over here
0181/00 BB        269   476           cp    e               ;<  then high threshold
0182/00 F29401    270   477           jp    p,nogo
0185/00           271   478  reaccum:
0185/00 110400    272   479           ld    de,4            ;set IX and IY to next accumlator and
0188/00 FD19      273   480           add   iy,de           ; tolerance values
018a/00 DD2B      274   481           dec   ix
018c/00 DD19      275   482           add   ix,de
018e/00 0D        276   483           dec   c               ;any more to do
018f/00 208A      277   484           jr    nz,acc
0191/00 C9        278   485           ret
0192/00           279   486  nogl:
0192/00 CBD9      280   487           set   3,c             ;set to indicate threshold too high
0194/00           281   488  nogo:
0194/00 CBD1      282   489           set   2,c             ;indicate that out of tolerance
0196/00 C9        283   490           ret
                  284   491  ;
                  285   492  ;*********
0197/00           286   493           end

No errors in this assembly

Symbol table entries used:       92/ 574
Symbol name characters used:   768/7500

Nuvatec Z80 assembler   Release 1.9            Wed Nov 11 14:41:23 1981

accum.s
Symbol Table / Cross-Reference Listing

value   type    defined     name of symbol
-----   ----    -------     --------------

3001     e        22        AD_CONTROL
00d3     e        34        AD_CclrAll
00e0     e        43        AD_Cendint
0040     e        40        AD_CreadKEY
0090     e        31        AD_Cwrite
3000     e        21        AD_DATA
0003     e        11        BCD_NUMLEN
0010     e        13        CLOCKRATE
0008     e        58        DF_BLINK2
0020     e        57        DF_ERRBLINK
0000     e        55        DF_STEADY
0008     e        56        DS_BRKBLINK
```

```
0080          e      52      DS_ON
0005/--              184     H_acc16
0002/--              182     H_acc4
0008/--              186     H_acc64
000b/--              189     H_bbufp
000c/--              191     H_buf
0000/--              173     H_cflags
0004/--              183     H_cnt16
0001/--              181     H_cnt4
0007/--              185     H_cnt64
000a/--              188     H_fbufp
0015/--              193     H_hitclk
0016/--              194     H_hitclksv
0014/--              192     H_static
0018/--              196     H_trcnt
0017/--              195     H_trend
0008          e      66      KEY_BS
000a          e      65      KEY_ENTER
000d          e      67      KEY_NEXT
000b/--              131     M_bcnt
0024/--              159     M_dfreq
000e/--              133     M_dptr
0023/--              157     M_dstatus
0001/--              121     M_errflags
0025/--              163     M_fcdis
0000/--              102     M_flags
002d/--              164     M_hitclk
0008/--              130     M_setbcnt
0002/--              128     M_settcnt
0005/--              129     M_tcnt
0020/--              154     M_tcount
0010/--              137     M_tol1
0018/--              145     M_tol16
0014/--              141     M_tol4
001c/--              149     M_tol64
0022/--              155     M_tolfac
0010/--              136     M_tols
3801          e      25      ND_CONTROL
00df          e      35      ND_CclrAll
00c2          e      38      ND_CclrF
00e0          e      44      ND_Cendint
0040          e      41      ND_CreadHIT
0090          e      32      ND_Cwrite
3800          e      24      ND_DATA
0006          e      10      NUMLEN
0002          e      8       N_HITS
0004          e      7       N_MACHINES
0003/--              208     RS_fw
0002/--              207     RS_maxfw
0001/--              206     RS_pos
0000/--              205     RS_startpos
00ff          e      15      WATCHDOG
011b/00              413     acc
0000/00     E        234     accum
0197/00      s       212     accum.s
0110/00              395     doagn
0037/00              268     hgh
002d/00              262     hit1
0080/--      s       171     hit_sect
0169/00              459     lddd
0040/--      s       99      mach_sect
0192/00              486     nogl
0194/00              488     nogo

Nuvatec Z80 assembler   Release 1.9          Wed Nov 11 14:41:23 1981

accum.s
Symbol Table / Cross-Reference Listing

value    type       defined    name of symbol
------   --------   -------    --------------

014a/00             435        noround
0101/00             388        nott
00ab/00             336        ok1
00b5/00             343        ok2
015f/00             450        oyy
```

```
005f/00              292       poss
0185/00              478       reaccum
00c7/00              352       restr
0004/--     s        204       rsarg_sect
0051/00              283       setemup
00a3/00              329       settol
0023/00              256       shrt
0081/00              312       static
0000/01 ?G I         ---       stpmch
0018/00              249       stpr
003a/00              270       thresh
00cf/00              358       trend

Nuvatec Z80 assembler   Release 1.92          Tue Dec 29 11:09:28 1981

ndisp.s

Addr/     Object    File   Ass'y
Section   Code      Line#  Line# + S t a t e m e n t
-------   -------   -----  -----  ----------------------------------------
                             1              list     "off"
0000/00               5    212              section  "ROM"
                      6    213
                      7    214              import   ndbuffer, nd_zflags
                      8    215              export   blankBCD
                      9    216              export   upd_ndisps, upd_ndbuf, ndisplay
                     10    217
                     11    218    ;--------------------------------------------------------------;
                     12    219    ;
                     13    220    ; Name:          upd_ndisps
                     14    221    ;
                     15    222    ; Function:      Refresh all numeric displays (one for each machine)
                     16    223    ;
                     17    224    ; Needs:
                     18    225    ;
                     19    226    ; Returns:
                     20    227    ;
                     21    228    ; Destroys:      af,bc,de,hl,iy  (caller beware- must save them yourself)
                     22    229    ;
                     23    230    ; Other Comments:
                     24    231    ;
                     25    232    ;--------------------------------------------------------------;
                     26    233              import   machsta
                     27    234
0000/00              28    235    upd_ndisps:
0000/00 CDDB00       29    236              call     machlgts            ;do machine light settings first
0003/00 FD210000     30    237              ld       iy,machsta          ; iy -> first machine's data block
0007/00 014000       31    238              ld       bc,sizeof(mach_sect) ; bc = length of machine data block
                     32    239
                     33    240              ;------------------------------;
                     34    241              ; Machine # 1 and 2            ;
                     35    242              ;------------------------------;
000a/00 CDAF00       36    243              call     ld_hl               ; de -> machine 1's BCD# to display
000d/00 54           37    244              ld       d,h                 ;
000e/00 5D           38    245              ld       e,l                 ;
000f/00 FD09         39    246              add      iy,bc               ; iy -> machine 2's data block
0011/00 CDAF00       40    247              call     ld_hl               ; hl -> machine 2's BCD# to display
                     41    248                                           ;
0014/00 AF           42    249              xor      a                   ; a = 0:  0 start offset in ndbuffer
0015/00 CD3000       43    250              call     upd_ndbuf           ; update buffer, for machines 1 & 2
                     44    251
                     45    252              ;------------------------------;
                     46    253              ; Machine # 3 and 4            ;
                     47    254              ;------------------------------;
0018/00 FD09         48    255              add      iy,bc               ; iy -> machine 3's data block
001a/00 CDAF00       49    256              call     ld_hl               ; de -> machine 3's BCD# to display
001d/00 54           50    257              ld       d,h                 ;
001e/00 5D           51    258              ld       e,l                 ;
001f/00 FD09         52    259              add      iy,bc               ; iy -> machine 4's data block
0021/00 CDAF00       53    260              call     ld_hl               ; hl -> machine 4's BCD# to display
                     54    261                                           ;
0024/00 3E01         55    262              ld       a,1                 ; a = 1:  +1 start offset in ndbuffer
0026/00 CD3000       56    263              call     upd_ndbuf           ; update buffer, for machines 1 & 2
                     57    264
                     58    265              ;------------------------------;
```

```
                           59      266          ; Leading zero-suppress numeric displays;
                           60      267          ;----------------------------------------;
0029/00 CD6F00             61      268          call    zsupp                   ; suppress leading O's
                           62      269
                           63      270          ;----------------------------------------;
                           64      271          ; Update numeric displays from buffer    ;
                           65      272          ;----------------------------------------;
002c/00 CDC400             66      273          call    ndisplay                ;
                           67      274
                           68      275          ;------------------------------;
                           69      276          ; Return                       ;
                           70      277          ;------------------------------;
002f/00 C9                 71      278          ret
                           72      279          eject

Nuvatec Z80 assembler   Release 1.92         Tue Dec 29 11:09:28 1981

ndisp.s

Addr/     Object    File    Ass'y
Section    Code     Line#   Line# + S t a t e m e n t
-------   ------    -----   -----  -  ---------------------------------------------
                     73      280   ;----------------------------------------------------------------;
                     74      281   ;
                     75      282   ; Name:          upd_ndbuf
                     76      283   ;
                     77      284   ; Function:      Refresh the numeric display buffer (for one machine)
                     78      285   ;
                     79      286   ; Needs:
                     80      287   ;        de      -> BCD string to be displayed, using High nybble of ND_DATA out
                     81      288   ;        hl      -> BCD string to be displayed, using Low  nybble of ND_DATA out
                     82      289   ;        a       =  starting offset in display buffer (0 or 1)
                     83      290   ;
                     84      291   ; Returns:
                     85      292   ;
                     86      293   ; Destroys:      af
                     87      294   ;
                     88      295   ; Other Comments:
                     89      296   ;
                     90      297   ;----------------------------------------------------------------;
                     91      298
0030/00              92      299   upd_ndbuf:
0030/00 FDE5C5       93      300           push    iy,bc                   ; save regs
0033/00 4F           94      301           ld      c,a                     ; iy -> ndbuffer + offset in A
0034/00 0600         95      302           ld      b,0                     ;
0036/00 FD210400     96      303           ld      iy,ndbuffer+4           ;
003a/00 FD09         97      304           add     iy,bc                   ;
                     98      305
003c/00 0603         99      306           ld      b,BCD_NUMLEN            ; B is loop counter
                    100      307
003e/00             101      308   nd_loop:
003e/00 1A          102      309           ld      a,(de)                  ; get high nybble from high nybble
003f/00 E6F0        103      310           and     0xf0                    ;
0041/00 4E          104      311           ld      c,(hl)                  ; get low  nybble from high nybble
0042/00 CB39        105      312           srl     c                       ;
0044/00 CB39        106      313           srl     c                       ;
0046/00 CB39        107      314           srl     c                       ;
0048/00 CB39        108      315           srl     c                       ;
004a/00 B1          109      316           or      c                       ; A = low + high
004b/00 FD7700      110      317           ld      (iy+0),a                ; place in buffer
                    111      318
004e/00 FD23        112      319           inc     iy                      ; advance buffer pointer
0050/00 FD23        113      320           inc     iy                      ;
                    114      321
0052/00 1A          115      322           ld      a,(de)                  ; get high nybble from low  nybble
0053/00 4F          116      323           ld      c,a                     ;
0054/00 CB21        117      324           sla     c                       ;
0056/00 CB21        118      325           sla     c                       ;
0058/00 CB21        119      326           sla     c                       ;
005a/00 CB21        120      327           sla     c                       ;
005c/00 7E          121      328           ld      a,(hl)                  ; get low  nybble from low  nybble
005d/00 E60F        122      329           and     0x0f                    ;
005f/00 B1          123      330           or      c                       ; A = low + high
0060/00 FD7700      124      331           ld      (iy+0),a                ; place in buffer
                    125      332
```

```
0063/00 FD23      126    333         inc    iy                  ; advance buffer pointer
0065/00 FD23      127    334         inc    iy                  ;
0067/00 13        128    335         inc    de                  ; advance BCD pointer  (high)
0068/00 23        129    336         inc    hl                  ; advance BCD pointer  (low )
                  130    337
0069/00 10D3      131    338         djnz   nd_loop             ; do next 2 BCD digits (1 byte)
                  132    339
006b/00 C1FDE1    133    340         pop    bc,iy               ;
006e/00 C9        134    341         ret
                  135    342         eject

Nuvatec Z80 assembler   Release 1.92          Tue Dec 29 11:09:28 1981

ndisp.s

Addr/    Object  File   Ass'y
Section  Code    Line#  Line# + S t a t e m e n t
-------  ------  -----  -----   ---------------------------------------------
                  136    343    ;--------------------------------------------------------------;
                  137    344    ;
                  138    345    ; Name:          zsupp
                  139    346    ;
                  140    347    ; Function:      perform leading zero suppression
                  141    348    ;
                  142    349    ; Needs, returns and destroys:  IY and IX unchanged
                  143    350    ;                               everything else is destroyed
                  144    351    ;
                  145    352    ; Other Comments:
                  146    353    ;
                  147    354    ;--------------------------------------------------------------;
                  148    355
006f/00           149    356    zsupp:
006f/00 0605      150    357         ld     b,05h               ;loop count (2 bytes tested each loop)
0071/00 3A0000    151    358         ld     a,(nd_zflags)       ;get zero-suppression flags in C
0074/00 4F        152    359         ld     c,a                 ;
0075/00 210400    153    360         ld     hl,ndbuffer+4       ;buffer address
0078/00           154    361    zsup:
0078/00 1601      155    362         ld     d,01h               ;OR mask if significant digit encountered
007a/00 CB41      156    363         bit    0,c                 ;should we check?
007c/00 CC9D00    157    364         call   z,zssh              ;yes on call
007f/00 CB22      158    365         sla    d                   ;change mask for next
0081/00 CB49      159    366         bit    1,c
0083/00 CCA100    160    367         call   z,zssl
0086/00 23        161    368         inc    hl                  ;set to next to test
0087/00 CB22      162    369         sla    d
0089/00 CB51      163    370         bit    2,c
008b/00 CC9D00    164    371         call   z,zssh
008e/00 CB22      165    372         sla    d
0090/00 CB59      166    373         bit    3,c
0092/00 CCA100    167    374         call   z,zssl
0095/00 23        168    375         inc    hl
0096/00 79        169    376         ld     a,c                 ;if all are set, then leave now
0097/00 FE0F      170    377         cp     0fh
0099/00 C8        171    378         ret    z
009a/00 10DC      172    379         djnz   zsup-$              ;any more to do
009c/00 C9        173    380         ret                        ;if not bye-bye
009d/00           174    381    zssh:
009d/00 1EF0      175    382         ld     e,0f0h              ;testing high nibble
009f/00 1802      176    383         jr     zin-$               ;go to it
00a1/00           177    384    zssl:
00a1/00 1E0F      178    385         ld     e,00fh              ;testing low nibble
00a3/00           179    386    zin:
00a3/00 7E        180    387         ld     a,(hl)
00a4/00 A3        181    388         and    e                   ;test if 0
00a5/00 2004      182    389         jr     nz,set-$            ;if not go indicate no more suppression
00a7/00 7E        183    390         ld     a,(hl)              ;put a hex F in instead
00a8/00 B3        184    391         or     e
00a9/00 77        185    392         ld     (hl),a
00aa/00 C9        186    393         ret
00ab/00           187    394    set:
00ab/00 79        188    395         ld     a,c                 ;set to indicate no more suppression
00ac/00 B2        189    396         or     d                   ; on this set of numbers
00ad/00 4F        190    397         ld     c,a
00ae/00 C9        191    398         ret
                  192    399
```

```
                              193      400           eject

Nuvatec Z80 assembler      Release 1.92          Tue Dec 29 11:09:28 1981
ndisp.s

Addr/      Object      File     Ass'y
Section    Code        Line#    Line#  + S t a t e m e n t
-------    ------      -----    -----  - -----------------------------------------
                        194      401    ;-----------------------------------------------------------------;
                        195      402    ;
                        196      403    ; Name:            ld_hl
                        197      404    ;
                        198      405    ; Function:        load hl with ptr to BCD# for a machine, from (iy+M_dptr)
                        199      406    ;
                        200      407    ; Needs:           iy      -> machine data area
                        201      408    ;
                        202      409    ; Returns:         hl      -> BCD# to be displayed for machine
                        203      410    ;                             (a blank BCD display if M_dstatus so dictates)
                        204      411    ;
                        205      412    ; Destroys:        af
                        206      413    ;
                        207      414    ; Other Comments:
                        208      415    ;
                        209      416    ;-----------------------------------------------------------------;
                        210      417
00af/00                 211      418    ld_hl:
00af/00 FDCB237E        212      419              bit      7,(iy + M_dstatus)       ; if blinking, is it on or off ?
00b3/00 2808            213      420              jr       z,upd_nblank             ;     if off, display blank string
00b5/00 FD6E0E          214      421              ld       l,(iy + M_dptr)          ; hl -> BCD num string to be displayed
00b8/00 FD660F          215      422              ld       h,(iy + (M_dptr+1))
00bb/00 1803            216      423              jr       ld_hl_exit               ;
00bd/00                 217      424    upd_nblank:
00bd/00 21C100          218      425              ld       hl,blankBCD              ; display off,so update with blank BCD #
00c0/00                 219      426    ld_hl_exit:
00c0/00 C9              220      427              ret
                        221      428
                        222      429
00c1/00 FFFFFF          223      430    blankBCD: db       [BCD_NUMLEN] 0xff        ; BCD string which displays as blanks
                        224      431              space    3

                        225      432    ;-----------------------------------------------------------------;
                        226      433    ;
                        227      434    ; Name:            ndisplay
                        228      435    ;
                        229      436    ; Function:        Refresh the numeric displays from the numeric display buffer
                        230      437    ;
                        231      438    ; Needs:           ndbuffer loaded with value(s) to be displayed
                        232      439    ;
                        233      440    ; Returns:
                        234      441    ;
                        235      442    ; Destroys:        af, b, de, hl
                        236      443    ;
                        237      444    ; Other Comments:
                        238      445    ;
                        239      446    ;-----------------------------------------------------------------;
                        240      447
00c4/00                 241      448    ndisplay:
00c4/00 0E90            242      449              ld       c,ND_Cwrite              ;load C with control write
                        243      450                                                ;        starting @ location 4 in disp.
                        244      451
00c6/00 210038          245      452              ld       hl,ND_DATA               ; hl -> data port of numeric display
00c9/00 110000          246      453              ld       de,ndbuffer              ; de -> buffer to be displayed
00cc/00 0610            247      454              ld       b,N_MACHINES*BCD_NUMLEN+4; b = loop counter
                        248      455
00ce/00                 249      456    nd_loop2:
00ce/00 F3              250      457              di
00cf/00 79              251      458              ld       a,c
00d0/00 320138          252      459              ld       (ND_CONTROL),a           ;send out control byte
00d3/00 1A              253      460              ld       a,(de)                   ; get BCD byte
00d4/00 77              254      461              ld       (hl),a                   ; output 2 BCD digits (one ea. to 2 disp's)
00d5/00 FB              255      462              ei
00d6/00 13              256      463              inc      de                       ; point to next BCD byte
```

```
00d7/00 0C        257   464          inc     c
00d8/00 10F4      258   465          djnz    nd_loop2                ; if still more, output it
                  259   466
00da/00 C9        260   467          ret
                  261   468    ;MACHLGTS: set up for proper machine lights to be lit
00db/00           262   469    machlgts:
00db/00 210000    263   470          ld      hl,ndbuffer             ;turn all off
00de/00 3E00      264   471          ld      a,0

Nuvatec Z80 assembler   Release 1.92          Tue Dec 29 11:09:28 1981

ndisp.s

Addr/    Object   File   Ass'y
Section  Code     Line#  Line# + S t a t e m e n t
-------  ------   -----  -----  - ---------------------------------------

00e0/00 77        265   472          ld      (hl),a
00e1/00 23        266   473          inc     hl
00e2/00 E5        267   474          push    hl
00e3/00 77        268   475          ld      (hl),a
00e4/00 23        269   476          inc     hl
00e5/00 77        270   477          ld      (hl),a
00e6/00 23        271   478          inc     hl
00e7/00 77        272   479          ld      (hl),a
00e8/00 E1        273   480          pop     hl
00e9/00 FD210000  274   481          ld      iy,machsta              ;point to machine flags
00ed/00 114000    275   482          ld      de,sizeof(mach_sect)
00f0/00 0604      276   483          ld      b,4                     ;loop count
00f2/00 0E10      277   484          ld      c,10h                   ;initial mask
00f4/00           278   485    litlp:
00f4/00 FD7E00    279   486          ld      a,(iy+0)                ;get a machine
00f7/00 E5        280   487          push    hl                      ;save buffer reference
00f8/00 E603      281   488          and     03h                     ;get just machine state
00fa/00 2810      282   489          jr      z,refed
00fc/00 23        283   490          inc     hl
00fd/00 FE03      284   491          cp      3                       ;interum state?
00ff/00 2006      285   492          jr      nz,ntimd                ;nope
0101/00 7E        286   493          ld      a,(hl)                  ;set yellow and green
0102/00 B1        287   494          or      c
0103/00 77        288   495          ld      (hl),a
0104/00 23        289   496          inc     hl                      ;do green also
0105/00 1805      290   497          jr      refed
0107/00           291   498    ntimd:
0107/00 FE01      292   499          cp      1                       ;test state only
0109/00 2801      293   500          jr      z,refed
010b/00 23        294   501          inc     hl                      ;green state
010c/00           295   502    refed:
010c/00 7E        296   503          ld      a,(hl)
010d/00 B1        297   504          or      c
010e/00 77        298   505          ld      (hl),a                  ;mask to 0 for ON
010f/00 CB01      299   506          rlc     c                       ;rotate mask for next machine
0111/00 E1        300   507          pop     hl
0112/00 FD19      301   508          add     iy,de                   ;set to next machine
0114/00 10DE      302   509          djnz    litlp
0116/00 C9        303   510          ret

No errors in this assembly

Symbol table entries used:     90/ 571
Symbol name characters used:  799/7500

Nuvatec Z80 assembler   Release 1.92          Tue Dec 29 11:09:28 1981

ndisp.s
Symbol Table / Cross-Reference Listing

value    type     defined     name of symbol
-----    ------   -------     ---------------

3001       e        22        AD_CONTROL
00d3       e        34        AD_CclrAll
00e0       e        43        AD_Cendint
0040       e        40        AD_CreadKEY
0090       e        31        AD_Cwrite
3000       e        21        AD_DATA
```

```
0003        e     11     BCD_NUMLEN
0010        e     13     CLOCKRATE
0008        e     58     DF_BLINK2
0020        e     57     DF_ERRBLINK
0000        e     55     DF_STEADY
0008        e     56     DS_BRKBLINK
0080        e     52     DS_ON
0005/--           184    H_acc16
0002/--           182    H_acc4
0008/--           186    H_acc64
000b/--           189    H_bbufp
000c/--           191    H_buf
0000/--           173    H_cflags
0004/--           183    H_cnt16
0001/--           181    H_cnt4
0007/--           185    H_cnt64
000a/--           188    H_fbufp
0015/--           193    H_hitclk
0016/--           194    H_hitclksv
0014/--           192    H_static
0018/--           196    H_trcnt
0017/--           195    H_trend
0008        e     66     KEY_BS
000a        e     65     KEY_ENTER
000d        e     67     KEY_NEXT
000b/--           131    M_bcnt
0024/--           159    M_dfreq
000e/--           133    M_dptr
0023/--           157    M_dstatus
0001/--           121    M_errflags
0025/--           163    M_fcdis
0000/--           102    M_flags
002d/--           164    M_hitclk
0008/--           130    M_setbcnt
0002/--           128    M_settcnt
0005/--           129    M_tcnt
0020/--           154    M_tcount
0010/--           137    M_tol1
0018/--           145    M_tol16
0014/--           141    M_tol4
001c/--           149    M_tol64
0022/--           155    M_tolfac
0010/--           136    M_tols
3801        e     25     ND_CONTROL
00df        e     35     ND_CclrAll
00c2        e     38     ND_CclrF
00e0        e     44     ND_Cendint
0040        e     41     ND_CreadHIT
0090        e     32     ND_Cwrite
3800        e     24     ND_DATA
0006        e     10     NUMLEN
0002        e     8      N_HITS
0004        e     7      N_MACHINES
0003/--           208    RS_fw
0002/--           207    RS_maxfw
0001/--           206    RS_pos
0000/--           205    RS_startpos
00ff        e     15     WATCHDOG
00c1/00   E       430    blankBCD
0080/--     s     171    hit_sect
00af/00           418    ld_hl
00c0/00           426    ld_hl_exit
00f4/00           485    litlp
0040/--     s     99     mach_sect
00db/00           469    machIgts
0000/03 ? I       ---    machsta
003e/00           308    nd_loop
00ce/00           456    nd_loop2
0000/02 ? I       ---    nd_zflags

Nuvatec Z80 assembler   Release 1.92          Tue Dec 29 11:09:28 1981

ndisp.s
Symbol Table / Cross-Reference Listing

value   type      defined      name of symbol
```

```
 ____       ______    ______       ________________
0000/01 ? I             ---        ndbuffer
0117/00     s          212         ndisp.s
00c4/00   E            448         ndisplay
0107/00                498         ntimd
010c/00                502         refed
0004/--     s          204         rsarg_sect
00ab/00                394         set
00bd/00                424         upd_nblank
0030/00   E            299         upd_ndbuf
0000/00   E            235         upd_ndisps
00a3/00                386         zin
009d/00                381         zssh
00a1/00                384         zssl
0078/00                361         zsup
006f/00                356_        zsupp

Nuvatec Z80 assembler   Release 1.9             Sun Nov  8 13:49:55 1981

errchk.s

Addr/    Object   File   Ass'y
Section  Code     Line#  Line# + S t a t e m e n t
_______  ______   _____  _____ _ ___________________________________________

                            1          list     "off"
0000/00               5   212          section  "ROM"
                      6   213
                      7   214          export   errchk
                      8   215          import   adisplay, adispch, adisp_lock, machsta, funcod
                      9   216
                     10   217  ;-------------------------------------------------------------------;
                     11   218  ;
                     12   219  ; Name:             errchk
                     13   220  ;
                     14   221  ; Function:         Check each machine's error flag;
                     15   222  ;                       if on, set its numeric display blinking and
                     16   223  ;                       display error on alpha display
                     17   224  ;
                     18   225  ; Needs:            (see "import" list)
                     19   226  ;
                     20   227  ; Returns:
                     21   228  ;
                     22   229  ; Destroys:         af
                     23   230  ;
                     24   231  ; Other Comments:
                     25   232  ;                   could be done in loop in upd_ndisps, if further code
                     26   233  ;                   compaction is necessary
                     27   234  ;
                     28   235  ;-------------------------------------------------------------------;
                     29   236
0000/00              30   237  errchk:
0000/00 E5C5D5       31   238          push    hl,bc,de                    ; save regs
0003/00 FDE5         32   239          push    iy                          ;
0005/00 FD210000     33   240          ld      iy,machsta                  ; IY -> first machine's data block
0009/00 114000       34   241          ld      de,sizeof(mach_sect)        ; DE = length of machine data block
000c/00 210009       35   242          ld      hl,0x0900                   ; H = 9 = start display position of
                     36   243                                              ;        machine #s in error message
                     37   244                                              ; L = 0 = "any errors" flag OFF
000f/00 0604         38   245          ld      b,N_MACHINES                ; B = loop count
0011/00 0E01         39   246          ld      c,1                         ; C = machine #
                     40   247
0013/00              41   248  errchk_loop:
0013/00 3EFF         42   249          ld      a,0ffh                      ;MASK OF VALID ERROR BITS
0015/00 FDA601       43   250          and     (iy+M_errflags)             ; is any error flag for machine set?
0018/00 2832         44   251          jr      z,ec_clr                    ; no,    so all's OK
                     45   252                                              ;
001a/00 FD362420     46   253          ld      (iy+M_dfreq),DF_ERRBLINK;  yes;   make its numeric display blink
001e/00 CB45         47   254          bit     0,l                         ;        put "ERROR" on display, unless
0020/00 200E         48   255          jr      nz,ec_loop2                 ;            already displayed
0022/00 E5           49   256          push    hl                          ;        unlock alpha display for update
                     50   257          ;ld     hl,adisp_lock               ;
                     51   258          ;res    0,(hl)                      ;
0023/00 215D00       52   259          ld      hl,err_msg                  ;        put "ERROR" on alpha display
0026/00 3A0000       53   260          ld      a,(funcod)                  ;see if conversation in progress
0029/00 B7           54   261          or      a
```

```
002a/00 CC0000   55   262         call   z,adisplay            ;
                 56   263         ;ld    hl,adisp_lock         ;      lock alpha display from update
                 57   264         ;set   0,(hl)                ;         (until errors are cleared)
002d/00 E1       58   265         pop    hl                    ;
002e/00 CBC5     59   266         set    0,1                   ;      flag that ERROR was printed
0030/00          60   267   ec_loop2:
0030/00 D5       61   268         push   de                    ;
0031/00 54       62   269         ld     d,h                   ;      display the # of the machine
0032/00 79       63   270         ld     a,c                   ;         with the error(s)
0033/00 C630     64   271         add    a,'0'                 ;
0035/00 4F       65   272         ld     c,a                   ;save in C for one instruction
0036/00 3A0000   66   273         ld     a,(funcod)
0039/00 B7       67   274         or     a
003a/00 79       68   275         ld     a,c
003b/00 CC0000   69   276         call   z,adispch                        ;
003e/00 D1       70   277         pop    de                    ;
003f/00 24       71   278         inc    h                     ;      and advance position for next
0040/00 24       72   279         inc    h                     ;         machine # which may be disp
                 73   280
0041/00          74   281   ec_loop3:
0041/00 FD19     75   282         add    iy,de                 ; IY -> next machine's data block
0043/00 0C       76   283         inc    c                     ; update machine #
0044/00 10CD     77   284         djnz   errchk_loop           ; check next machine

Nuvatec Z80 assembler   Release 1.9          Sun Nov  8 13:49:55 1981

errchk.s

Addr/      Object   File    Ass'y
Section    Code     Line#   Line#  + S t a t e m e n t
-------    ------   -----   -----  - ------------------------------------------------

                 78   285
                 79   286
                 80   287         ;---------------------------------;
                 81   288         ; Return                          ;
                 82   289         ;---------------------------------;
0046/00 FDE1     83   290         pop    iy                    ; restore regs
0048/00 D1C1E1   84   291         pop    de,bc,hl              ;
004b/00 C9       85   292         ret
                 86   293
                 87   294   ;since no errors on this machine, make sure everything is kosher
004c/00          88   295   ec_clr:
004c/00 FD7E00   89   296         ld     a,(iy+M_flags)        ;test if in a break mode
004f/00 E6C0     90   297         and    0C0h
0051/00 20EE     91   298         jr     nz,ec_loop3
0053/00 FD362400 92   299         ld     (iy+M_dfreq),DF_STEADY
0057/00 FD362380 93   300         ld     (iy+M_dstatus),DS_ON
005b/00 18E4     94   301         jr     ec_loop3
                 95   302
005d/00 2A2A4552 96   303   err_msg:      db     "**ERROR \0"
        524F5220
        00

No errors in this assembly

Symbol table entries used:       79/ 574
Symbol name characters used:   728/7500

Nuvatec Z80 assembler   Release 1.9          Sun Nov  8 13:49:55 1981

errchk.s
Symbol Table / Cross-Reference Listing

value    type     defined    name of symbol
-----    ----     -------    --------------

3001      e         22       AD_CONTROL
00d3      e         34       AD_CclrAll
00e0      e         43       AD_Cendint
0040      e         40       AD_CreadKEY
0090      e         31       AD_Cwrite
3000      e         21       AD_DATA
0003      e         11       BCD_NUMLEN
0010      e         13       CLOCKRATE
0008      e         58       DF_BLINK2
```

```
0020          e     57      DF_ERRBLINK
0000          e     55      DF_STEADY
0008          e     56      DS_BRKBLINK
0080          e     52      DS_ON
0005/--            184      H_acc16
0002/--            182      H_acc4
0008/--            186      H_acc64
000b/--            189      H_bbufp
000c/--            191      H_buf
0000/--            173      H_cflags
0004/--            183      H_cnt16
0001/--            181      H_cnt4
0007/--            185      H_cnt64
000a/--            188      H_fbufp
0015/--            193      H_hitclk
0016/--            194      H_hitclksv
0014/--            192      H_static
0018/--            196      H_trcnt
0017/--            195      H_trend
0008          e     66      KEY_BS
000a          e     65      KEY_ENTER
000d          e     67      KEY_NEXT
000b/--            131      M_bcnt
0024/--            159      M_dfreq
000e/--            133      M_dptr
0023/--            157      M_dstatus
0001/--            121      M_errflags
0025/--            163      M_fcdis
0000/--            102      M_flags
002d/--            164      M_hitclk
0008/--            130      M_setbcnt
0002/--            128      M_settcnt
0005/--            129      M_tcnt
0020/--            154      M_tcount
0010/--            137      M_tol1
0018/--            145      M_tol16
0014/--            141      M_tol4
001c/--            149      M_tol64
0022/--            155      M_tolfac
0010/--            136      M_tols
3801          e     25      ND_CONTROL
00df          e     35      ND_CclrAll
00c2          e     38      ND_CclrF
00e0          e     44      ND_Cendint
0040          e     41      ND_CreadHIT
0090          e     32      ND_Cwrite
3800          e     24      ND_DATA
0006          e     10      NUMLEN
0002          e      8      N_HITS
0004          e      7      N_MACHINES
0003/--            208      RS_fw
0002/--            207      RS_maxfw
0001/--            206      RS_pos
0000/--            205      RS_startpos
00ff          e     15      WATCHDOG
0000/03 ?  I       ---      adisp_lock
0000/02 ?  I       ---      adispch
0000/01 ?  I       ---      adisplay
004c/00            295      ec_clr
0030/00            267      ec_loop2
0041/00            281      ec_loop3
005d/00            303      err_msg
0000/00  E         237      errchk
0066/00     s      212      errchk.s
0013/00            248      errchk_loop
0000/05 ?  I       ---      funcod

Nuvatec Z80 assembler   Release 1.9          Sun Nov  8 13:49:55 1981

errchk.s
Symbol Table / Cross-Reference Listing

value    type      defined       name of symbol
_____    ____      _______       ______________

0080/--     s       171          hit_sect
0040/--     s        99          mach_sect
```

```
0000/04 ?  I          ---          machsta
0004/--    s          204          rsarg_sect

Nuvatec Z80 assembler   Release 1.9          Tue Dec  1 11:09:46 1981

keybrd.s

Addr/     Object   File    Ass'y
Section   Code     Line#   Line# + S t a t e m e n t
-------   ------   -----   ----- - ----------------------------------------------

0000/00                        1          section "ROM"
                               2          list    "off"
                    5         92    ;
                    6         93    ;section C
                    7         94    ;
                    8         95    ;KEYBRD: this program is for handling of the key presses entered
                    9         96    ;         into the box as user or machine input
                   10         97    ;         It is broken into sections:
                   11         98    ;                 1) test if key in buffer
                   12         99    ;                 2) if a key is there:
                   13        100    ;                       a) if function key, call up neccessary conversation
                   14        101    ;                       b) if non-function, determine if any conversation
                   15        102    ;                          is waiting for input and pass key to proper address
                   16        103    ;                       c) if machine box button, do necessary setting and
                   17        104    ;                          setup for that machine
                   18        105    ;
                   19        106    ;-----------------------------------------------------------------------
                   20        107    ;EXTERNAL REFERENCES
                   21        108    ;
                   22        109    ;FUNCOD -        code number of conversation in play
                   23        110    ;NEXENT -        address location to pass non-function user input keys to
                   24        111    ;SPCENT -        address location to pass function user input keys to if
                   25        112    ;                use as input for a conversation
                   26        113    ;FPTR,BPTR -     front and back pointers for key input buffer
                   27        114    ;KBBUFF -        keyboard buffer
                   28        115    ;
                   29        116    ;-----------------------------------------------------------------------
                   30        117    ;Needs: nothing upon entry
                   31        118    ;
                   32        119    ;Returns nothing and everthing should be counted on being destroyed
                   33        120    ;
                   34        121          entry   keybrd,clscon,keyred,keyred2
                   35        122          extrn   funcod,nexent,spcent,fptr,bptr,kbbuff,machbut
                   36        123          extrn   adisplay_clr,conflg,sysflg
                   37        124          global  setup,error,conv_pick_d,force
                   38        125          import  kr_savebc, kr_savede, kr_savehl, kr_saveiy, kr_saveret
                   39        126    ;
0000/00            40        127    keybrd:
0000/00 F3         41        128          di                        ;disable interupts while screwing with pointers
0001/00 210000     42        129          ld      hl,fptr           ;set to front pointer address
0004/00 7E         43        130          ld      a,(hl)            ;get front into B
0005/00 47         44        131          ld      b,a
0006/00 23         45        132          inc     hl                ;set to back pointer
0007/00 7E         46        133          ld      a,(hl)
0008/00 B8         47        134          cp      b                 ;if equal then no keys to process
0009/00 2002       48        135          jr      nz,kyok
000b/00 FB         49        136          ei
000c/00 C9         50        137          ret                       ;return because pointers are equal
000d/00            51        138    kyok:
000d/00 3C         52        139          inc     a                 ;reset back pointer and set HL to
000e/00 F5         53        140          push    af
000f/00 E607       54        141          and     07h               ; proper spot in buffer
0011/00 77         55        142          ld      (hl),a
0012/00 FB         56        143          ei                        ;now that pointer reloaded, enable interupts
0013/00 F1         57        144          pop     af
0014/00 5F         58        145          ld      e,a               ;DE = A
0015/00 1600       59        146          ld      d,0
0017/00 19         60        147          add     hl,de
0018/00 7E         61        148          ld      a,(hl)            ;get the key
                   62        149    ;determine if key switch is on
0019/00 E5         63        150          push    hl                ;save buffer address
001a/00 210000     64        151          ld      hl,sysflg         ;get SYSFLG address into HL
001d/00 CB86       65        152          res     0,(hl)            ;assume it's reset
001f/00 CB7F       66        153          bit     7,a               ;is it really on
0021/00 2802       67        154          jr      z,noton
```

```
0023/00 CBC6      68   155           set     O,(hl)            ;show key switch on
0025/00           69   156  noton:
0025/00 E1        70   157           pop     hl
0026/00 7E        71   158           ld      a,(hl)            ;get the key again
0027/00 E67F      72   159           and     7fh               ;get rid of key-lock switch indication
0029/00 21B800    73   160           ld      hl,keytab         ;key translation table
002c/00 0617      74   161           ld      b,keys_def        ;number of defined keys
                  75   162  ;now go through the table until a key code equal something in table
002e/00           76   163  cplp:

Nuvatec Z80 assembler   Release 1.9          Tue Dec  1 11:09:46 1981

keybrd.s

Addr/    Object  File   Ass'y
Section  Code    Line#  Line# + S t a t e m e n t
-------  ------  -----  -----   -----------------------------------------
002e/00 BE        77   164           cp      (hl)              ;they equal?
002f/00 2805      78   165           jr      z,keygot-$        ;yes on branch
0031/00 23        79   166           inc     hl                ;set to next location
0032/00 23        80   167           inc     hl
0033/00 10F9      81   168           djnz    cplp-$            ;anymore?
0035/00 C9        82   169           ret                       ;if not then key not defined
                  83   170  ;now that the key has been recognized, get it's translation and process it
0036/00           84   171  keygot:
0036/00 23        85   172           inc     hl                ;set to translation
0037/00 7E        86   173           ld      a,(hl)            ;got it
0038/00 E6F0      87   174           and     0f0h              ;machine box button
003a/00 FEF0      88   175           cp      0f0h
003c/00 7E        89   176           ld      a,(hl)            ;reload it
003d/00 CA0000    90   177           jp      z,machbut
0040/00 CB7F      91   178           bit     7,a               ;is it a function key
0042/00 286E      92   179           jr      z,nonfunc         ;if not then go test if someone wants it
0044/00 CB77      93   180           bit     6,a               ;interceptable key?
0046/00 200A      94   181           jr      nz,noint
0048/00 57        95   182           ld      d,a               ;save key
0049/00 2A0000    96   183           ld      hl,(spcent)       ;anyone looking for function keys
004c/00 7D        97   184           ld      a,l
004d/00 B4        98   185           or      h
004e/00 7A        99   186           ld      a,d               ;restore key into A
004f/00 2801     100   187           jr      z,noint           ;if no one wants it use as function key
0051/00 E9       101   188           jp      (hl)
0052/00          102   189  noint:
0052/00 57       103   190           ld      d,a               ;save key code
0053/00 3A0000   104   191           ld      a,(conflg)        ;is conversation unabortable
0056/00 CB77     105   192           bit     6,a
0058/00 C0       106   193           ret     nz
0059/00 7A       107   194           ld      a,d               ;restore code into A
005a/00 E61F     108   195           and     1fh               ;get rid of flags
005c/00 F5       109   196           push    af                ;save function code on stack
005d/00 CD7200   110   197           call    clscon            ;close down conversation
0060/00 F1       111   198           pop     af
0061/00 320000   112   199           ld      (funcod),a        ;save conversation code
0064/00 CB27     113   200           sla     a                 ;times 2 for command table index
0066/00 21E700   114   201           ld      hl,comtab-2
0069/00 5F       115   202           ld      e,a               ;add it in to access command table
006a/00 1600     116   203           ld      d,0
006c/00 19       117   204           add     hl,de
006d/00 5E       118   205           ld      e,(hl)            ;get address into DE
006e/00 23       119   206           inc     hl                ;get high byte
006f/00 56       120   207           ld      d,(hl)
0070/00 EB       121   208           ex      de,hl
0071/00 E9       122   209           jp      (hl)              ;jump to conversation processing
                 123   210  ;
                 124   211  ;CLSCON: when a conversation is to be closed, jump to this routine to
                 125   212  ;        clear conversation varibles and return to normal program flow
0072/00          126   213  clscon:
0072/00 CD0000   127   214           call    adisplay_clr      ;clear display
0075/00          128   215  clscon2:
0075/00 210000   129   216           ld      hl,funcod         ;clear indications and scratch ram
0078/00 E5       130   217           push    hl
0079/00 D1       131   218           pop     de
007a/00 13       132   219           inc     de
007b/00 017F00   133   220           ld      bc,07fh           ;should be enough
007e/00 3600     134   221           ld      (hl),0
```

```
0080/00 EDB0      135     222              ldir
0082/00 C9        136     223              ret
                  137     224
                  138     225     ;-----------------------------------------------------------------
                  139     226     ;KEYRED: if a conversation will require user input, a call is made to this
                  140     227     ;        routine to load up NEXENT location with addres to pass control upon
                  141     228     ;        next non-function key input. if looking for function key input, the
                  142     229     ;        program should still call this program, but must seperately load the
                  143     230     ;        SPCENT location to give an address to pass such function key inputs
0083/00           144     231     keyred:
0083/00 E1        145     232              pop     hl              ;get return address off of stack
0084/00 220000    146     233              ld      (nexent),hl     ;save it here for next key input
0087/00 C9        147     234              ret
                  148     235
                  149     236     ;-----------------------------------------------------------------
                  150     237     ;KEYRED2:  same as keyred, except saves/restores registers bc,de,hl,iy

Nuvatec Z80 assembler    Release 1.9          Tue Dec  1 11:09:46 1981

keybrd.s

Addr/     Object    File    Ass'y
Section   Code      Line#   Line# + S t a t e m e n t
-------   ------    -----   -----   -------------------------------------------------------
0088/00             151     238     keyred2:
0088/00 ED430000    152     239              ld      (kr_savebc),bc  ; save regs
008c/00 ED530000    153     240              ld      (kr_savede),de  ;
0090/00 220000      154     241              ld      (kr_savehl),hl  ;
0093/00 FD220000    155     242              ld      (kr_saveiy),iy  ;
0097/00 E1          156     243              pop     hl              ; save return address
0098/00 220000      157     244              ld      (kr_saveret),hl ;
009b/00 CD8300      158     245              call    keyred          ; read the key
009e/00 2A0000      159     246              ld      hl,(kr_saveret) ; restore return address
00a1/00 E5          160     247              push    hl              ;
00a2/00 ED4B0000    161     248              ld      bc,(kr_savebc)  ;
00a6/00 ED5B0000    162     249              ld      de,(kr_savede)  ;
00aa/00 2A0000      163     250              ld      hl,(kr_savehl)  ;
00ad/00 FD2A0000    164     251              ld      iy,(kr_saveiy)  ;
00b1/00 C9          165     252              ret
                    166     253
                    167     254     ;-----------------------------------------------------------------
00b2/00             168     255     nonfunc:
00b2/00 57          169     256              ld      d,a             ;save key translation
00b3/00 2A0000      170     257              ld      hl,(nexent)     ;any one looking for key input
00b6/00 7D          171     258              ld      a,l
00b7/00 B4          172     259              or      h
00b8/00 C8          173     260              ret     z               ;if 0 address then no go
00b9/00 7A          174     261              ld      a,d             ;put key code back into A
00ba/00 E9          175     262              jp      (hl)
                    176     263     ;
                    177     264     ;KEYTAB: table of translation codes for keyboard input. for each possible key
                    178     265     ;KEYTAB: table of key inputs and translations of key codes
                    179     266     ;        each entry has 2 bytes :
                    180     267     ;                        1 - code recieved from keyboard
                    181     268     ;                        2 - translation of code
                    182     269     ;        trasnlation is configured:
                    183     270     ;                high nibble = hex F - machine box button press
                    184     271     ;                otherwise bit 7 - function key
                    185     272     ;                              6 - if function then interceptable
                    186     273     ;                if not then normal key which will be ascii translation
                    187     274     ;
00bb/00             188     275     keytab:
00bb/00 4D81        189     276              db      4dh,81h         ;SETUP
00bd/00 4582        190     277              db      45h,82h         ;DIGIT-ALTER conversation
00bf/00 5D83        191     278              db      5dh,83h         ;ERROR conversation
00c1/00 5584        192     279              db      55h,84h         ;hit force value conversation
00c3/00 0F0F        193     280              db      0fh,0fh         ;internal key press for above conversation
00c5/00 5C37        194     281              db      5ch,'7'
00c7/00 4434        195     282              db      44h,'4'
00c9/00 4C31        196     283              db      4ch,'1'
00cb/00 5408        197     284              db      54h,KEY_BS      ;BackSpace key
00cd/00 5B38        198     285              db      5bh,'8'
00cf/00 4335        199     286              db      43h,'5'
00d1/00 4B32        200     287              db      4bh,'2'
00d3/00 5330        201     288              db      53h,'0'
```

```
00d5/00 5A39      202    289              db       5ah,'9'
00d7/00 4236      203    290              db       42h,'6'
00d9/00 4A33      204    291              db       4ah,'3'
00db/00 520D      205    292              db       52h,KEY_NEXT      ;NEXT key
00dd/00 510A      206    293              db       51h,KEY_ENTER     ;ENTER key
00df/00 5985      207    294              db       59h,85h           ;CLEAR key
00e1/00 46F1      208    295              db       46h,0f1h          ;Machine box 1
00e3/00 4EF2      209    296              db       4eh,0f2h          ;            2
00e5/00 56F3      210    297              db       56h,0f3h          ;            3
00e7/00 5EF4      211    298              db       5eh,0f4h          ;            4
0017              212    299     keys_def equ      ($-keytab)/2
                  213    300     ;
                  214    301     ;COMTAB: address table of conversation start addresses. each valid function
                  215    302     ;        code should have an address location corespondingly located in the table
00e9/00           216    303     comtab
00e9/00 0000      217    304              dw       setup             ;set up production values
00eb/00 0000      218    305              dw       conv_pick_d       ;alter information on digit displays
00ed/00 0000      219    306              dw       error             ;display errors
00ef/00 0000      220    307              dw       force
00f1/00 7200      221    308              dw       clscon
00f3/00 00000000  222    309              dw       0,0,0,0
        00000000

Nuvatec Z80 assembler   Release 1.9               Tue Dec  1 11:09:46 1981

keybrd.s

Addr/     Object   File    Ass'y
Section   Code     Line#   Line#  + S t a t e m e n t
-------   ------   -----   -----  - -------------------

No errors in this assembly

Symbol table entries used:      61/ 574
Symbol name characters used:   530/7500

Nuvatec Z80 assembler   Release 1.9               Tue Dec  1 11:09:46 1981

keybrd.s
Symbol Table / Cross-Reference Listing

value      type      defined      name of symbol
-----      ----      -------      --------------

3001          e        23         AD_CONTROL
00d3          e        35         AD_CclrAll
00e0          e        44         AD_Cendint
0040          e        41         AD_CreadKEY
0090          e        32         AD_Cwrite
3000          e        22         AD_DATA
0003          e        12         BCD_NUMLEN
0010          e        14         CLOCKRATE
0008          e        59         DF_BLINK2
0020          e        58         DF_ERRBLINK
0000          e        56         DF_STEADY
0008          e        57         DS_BRKBLINK
0080          e        53         DS_ON
0008          e        67         KEY_BS
000a          e        66         KEY_ENTER
000d          e        68         KEY_NEXT
3801          e        26         ND_CONTROL
00df          e        36         ND_CclrAll
00c2          e        39         ND_CclrF
00e0          e        45         ND_Cendint
0040          e        42         ND_CreadHIT
0090          e        33         ND_Cwrite
3800          e        25         ND_DATA
0006          e        11         NUMLEN
0002          e         9         N_HITS
0004          e         8         N_MACHINES
00ff          e        16         WATCHDOG
0000/08 ?  I           ---        adisplay_clr
0000/05 ?  I           ---        bptr
0072/00   E            213        clscon
0075/00                215        clscon2
```

```
00e9/00             303        comtab
0000/09 ?  I        ---        conflg
0000/11 ?G I        ---        conv_pick_d
002e/00             163        cplp
0000/10 ?G I        ---        error
0000/13 ?G I        ---        force
0000/04 ?  I        ---        fptr
0000/01 ?  I        ---        funcod
0000/06 ?  I        ---        kbbuff
0000/00    E        127        keybrd
00fb/00      s        1        keybrd.s
0036/00             171        keygot
0083/00    E        231        keyred
0088/00    E        238        keyred2
0017           e    299        keys_def
00bb/00             275        keytab
0000/0b ?  I        ---        kr_savebc
0000/0c ?  I        ---        kr_savede
0000/0d ?  I        ---        kr_savehl
0000/0e ?  I        ---        kr_saveiy
0000/0f ?  I        ---        kr_saveret
000d/00             138        kyok
0000/07 ?  I        ---        machbut
0000/02 ?  I        ---        nexent
0052/00             189        noint
00b2/00             255        nonfunc
0025/00             156        noton
0000/12 ?G I        ---        setup
0000/03 ?  I        ---        spcent
0000/0a ?  I        ---        sysflg

Nuvatec Z80 assembler   Release 1.92         Mon Dec 28 13:53:35 1981

machbut.s


Addr/    Object   File   Ass'y
Section  Code     Line#  Line# + S t a t e m e n t

                            1            list     "off"
0000/00             5     212            section  "ROM"
                    6     213            export   machbut
                    7     214            import   machref
0000/00             8     215   machbut:
0000/00 E607        9     216            and      07h           ;get just machine number
0002/00 CD0000     10     217            call     machref
0005/00 CB7E       11     218            bit      7,(hl)        ;if production set done, then screw it
0007/00 C0         12     219            ret      nz
0008/00 7E         13     220            ld       a,(hl)        ;get flag byte
0009/00 E603       14     221            and      03h
000b/00 2038       15     222            jr       nz,ntstp
000d/00 23         16     223            inc      hl            ;if error flags are set then prohbit change
000e/00 7E         17     224            ld       a,(hl)
000f/00 B7         18     225            or       a
0010/00 2B         19     226            dec      hl
0011/00 C0         20     227            ret      nz
0012/00 34         21     228            inc      (hl)          ;set to be in test mode from stop
0013/00 CB96       22     229            res      2,(hl)        ;reset that timing is set
0015/00 112D00     23     230            ld       de,M_hitclk   ;clear hitclk counter
0018/00 E5         24     231            push     hl
0019/00 E5         25     232            push     hl
001a/00 19         26     233            add      hl,de
001b/00 3600       27     234            ld       (hl),0
001d/00 23         28     235            inc      hl
001e/00 36FF       29     236            ld       (hl),0ffh
0020/00 E1         30     237            pop      hl            ;get back start address
0021/00 112000     31     238            ld       de,M_tcount   ;index to test run counter
0024/00 19         32     239            add      hl,de
0025/00 3600       33     240            ld       (hl),0
0027/00 E1         34     241            pop      hl
0028/00 CB76       35     242            bit      6,(hl)        ;test if break should be reset
002a/00 C8         36     243            ret      z
002b/00 CBB6       37     244            res      6,(hl)              ;reset break stop indication
002d/00 E5         38     245            push     hl
002e/00 112400     39     246            ld       de,M_dfreq          ;clear blinking
0031/00 19         40     247            add      hl,de
```

```
0032/00 3600     41   248           ld     (hl),0
0034/00 2B       42   249           dec    hl             ;make sure display is on
0035/00 CBFE     43   250           set    7,(hl)
0037/00 E1       44   251           pop    hl
0038/00 110B00   45   252           ld     de,M_bcnt
003b/00 19       46   253           add    hl,de
003c/00 3600     47   254           ld     (hl),0
003e/00 23       48   255           inc    hl
003f/00 3600     49   256           ld     (hl),0
0041/00 23       50   257           inc    hl
0042/00 3600     51   258           ld     (hl),0
0044/00 C9       52   259           ret
0045/00          53   260   ntstp:
0045/00 CB4F     54   261           bit    1,a            ;if production set then ignore key
0047/00 C0       55   262           ret    nz
0048/00 CB66     56   263           bit    4,(hl)         ;production set?
004a/00 C8       57   264           ret    z
004b/00 CBCE     58   265           set    1,(hl)         ;set to interim
004d/00 CB5E     59   266           bit    3,(hl)         ;if tolerances are set then just put into
004f/00 2802     60   267           jr     z,goclr
0051/00 CB86     61   268           res    0,(hl)
0053/00          62   269   goclr:
0053/00 F3       63   270           di                    ;disable interupts at this time
0054/00 CB96     64   271           res    2,(hl)         ;reset that timing is set
0056/00 112D00   65   272           ld     de,M_hitclk    ;clear hit measurement clock
0059/00 19       66   273           add    hl,de
005a/00 3600     67   274           ld     (hl),0
005c/00 23       68   275           inc    hl
005d/00 36FF     69   276           ld     (hl),0ffh
005f/00 FDE5     70   277           push   iy             ;get machine storage address and clear
0061/00 E1       71   278           pop    hl             ;accumulators, buffers, and clocks
0062/00 E5       72   279           push   hl
0063/00 E5       73   280           push   hl
0064/00 D1       74   281           pop    de
0065/00 13       75   282           inc    de
0066/00 010900   76   283           ld     bc,9
0069/00 3600     77   284           ld     (hl),0

Nuvatec Z80 assembler   Release 1.92         Mon Dec 28 13:53:35 1981

machbut.s

Addr/     Object   File    Ass'y
Section   Code     Line#   Line# + S t a t e m e n t
--------  -------  -----   -----   ---------------------------------------
006b/00 EDB0     78   285           ldir
006d/00 E1       79   286           pop    hl
006e/00 118000   80   287           ld     de,128
0071/00 19       81   288           add    hl,de
0072/00 E5       82   289           push   hl
0073/00 D1       83   290           pop    de
0074/00 13       84   291           inc    de
0075/00 010900   85   292           ld     bc,9
0078/00 3600     86   293           ld     (hl),0
007a/00 EDB0     87   294           ldir
007c/00 FB       88   295           ei
007d/00 C9       89   296           ret
007e/00          90   297   promod:                       ;for the time being, this condition is ignored
007e/00 C9       91   298           ret
007f/00 C9       92   299           ret

No errors in this assembly

Symbol table entries used:      73/ 571
Symbol name characters used:   669/7500

Nuvatec Z80 assembler   Release 1.92         Mon Dec 28 13:53:35 1981

machbut.s
Symbol Table / Cross-Reference Listing

value    type      defined    name of symbol
-----    -----     -------    --------------
3001       *          22      AD_CONTROL
```

```
00d3         e       34        AD_CclrAll
00e0         e       43        AD_Cendint
0040         e       40        AD_CreadKEY
0090         e       31        AD_Cwrite
3000         e       21        AD_DATA
0003         e       11        BCD_NUMLEN
0010         e       13        CLOCKRATE
0008         e       58        DF_BLINK2
0020         e       57        DF_ERRBLINK
0000         e       55        DF_STEADY
0008         e       56        DS_BRKBLINK
0080         e       52        DS_ON
0005/--             184        H_acc16
0002/--             182        H_acc4
0008/--             186        H_acc64
000b/--             189        H_bbufp
000c/--             191        H_buf
0000/--             173        H_cflags
0004/--             183        H_cnt16
0001/--             181        H_cnt4
0007/--             185        H_cnt64
000a/--             188        H_fbufp
0015/--             193        H_hitclk
0016/--             194        H_hitclksv
0014/--             192        H_static
0018/--             196        H_trcnt
0017/--             195        H_trend
0008         e       66        KEY_BS
000a         e       65        KEY_ENTER
000d         e       67        KEY_NEXT
000b/--             131        M_bcnt
0024/--             159        M_dfreq
000e/--             133        M_dptr
0023/--             157        M_dstatus
0001/--             121        M_errflags
0025/--             163        M_fcdis
0000/--             102        M_flags
002d/--             164        M_hitclk
0008/--             130        M_setbcnt
0002/--             128        M_settcnt
0005/--             129        M_tcnt
0020/--             154        M_tcount
0010/--             137        M_tol1
0018/--             145        M_tol16
0014/--             141        M_tol4
001c/--             149        M_tol64
0022/--             155        M_tolfac
0010/--             136        M_tols
3801         e       25        ND_CONTROL
00df         e       35        ND_CclrAll
00c2         e       38        ND_CclrF
00e0         e       44        ND_Cendint
0040         e       41        ND_CreadHIT
0090         e       32        ND_Cwrite
3800         e       24        ND_DATA
0006         e       10        NUMLEN
0002         e        8        N_HITS
0004         e        7        N_MACHINES
0003/--             208        RS_fw
0002/--             207        RS_maxfw
0001/--             206        RS_pos
0000/--             205        RS_startpos
00ff         e       15        WATCHDOG
0053/00             269        goclr
0080/--        s    171        hit_sect
0040/--        s     99        mach_sect
0000/00   E         215        machbut
0080/00        s    212        machbut s
0000/01 ?  I        ---        machref
0045/00             260        ntstp
007e/00             297        promod
0004/--        s    204        rsarg_sect

Nuvatec Z80 assembler   Release 1.92          Tue Dec 29 11:18:39 1981                 page 1

setup.s
```

```
Addr/     Object    File   Ass'y
Section   Code      Line#  Line# + S t a t e m e n t
                              1          list    "off"
0000/00               5     212          section "ROM"
                      6     213     ;section C
                      7     214     ;
                      8     215     ;SETUP: support conversation for input machine information needed
                      9     216     ;       for production run on a machine
                     10     217     ;
                     11     218     ;----------------------------------------------------------------
                     12     219     ;Needs and returns:      nothing of relevance
                     13     220     ;
                     14     221     ; destroys:       af, bc, de, hl, iy       (basically, everything)
                     15     222     ;
                     16     223     ;----------------------------------------------------------------
                     17     224     ;
                     18     225          entry   setup,machref
                     19     226          extrn   clscon,scrch,machsta,asc_bcd,bcd_asc,machnum,adisplay_cp,sysflg
                     20     227          extrn   machstb,keyred
                     21     228          global  inmachine,readstring
                     22     229     ;
                     23     230     ;get number of machine to be set up, and then relate number to memory area
                     24     231     ;  of that machine and save it in conversation scratch area
0000/00              25     232     setup:
0000/00 CD0000       26     233          call    inmachine
0003/00 3A0000       27     234          ld      a,(machnum)          ;get machine number
0006/00 CDC301       28     235          call    machref
0009/00 220000       29     236          ld      (scrch),hl           ;save reference here
000c/00 FD221400     30     237          ld      (scrch+20),iy        ;save B area here for if needed
0010/00 210000       31     238          ld      hl,sysflg            ;if key switch is ON, allow normal setup
0013/00 CB46         32     239          bit     0,(hl)               ;if OFF, then go to operator routine
0015/00 CA6C01       33     240          jp      z,opset              ; to allow tolerances to be reavaluated
0018/00              34     241     totag:
0018/00 21ED01       35     242          ld      hl,totprmt           ;put up prompt asking for total count
001b/00 3E02         36     243          ld      a,2
001d/00 CD0000       37     244          call    adisplay_cp
0020/00 2A0000       38     245          ld      hl,(scrch)           ;get machine location referance
0023/00 E5           39     246          push    hl                   ;save onto stack
0024/00              40     247          RSARGS  6,9,scrch+2
                     40     248 +        import  rs_args              ;
0024/00 FD210000     40     249 +        ld      iy,rs_args           ; iy -> argument block
0028/00 FD360009     40     250 +        ld      (iy+RS_startpos),9   ; starting position for display
002c/00 FD360109     40     251 +        ld      (iy+RS_pos),+9  ; current position for cursor
0030/00 FD360206     40     252 +        ld      (iy+RS_maxfw),6 ; maximum allowed input field width
0034/00 FD360300     40     253 +        ld      (iy+RS_fw),+0        ; current input field width (# chars read)
0038/00 210200       40     254 +        ld      hl,scrch+2                ; address of buffer for input chars
003b/00 E3           41     255          ex      (sp),hl              ;save storage and get out machine
003c/00 110200       42     256          ld      de,M_settcnt         ;set HL to total parts count
003f/00 CDD801       43     257          call    chkconv
0042/00 B7           44     258          or      a
0043/00 280C         45     259          jr      z,nonum1-$
0045/00 FD36010F     46     260          ld      (iy+RS_pos),6+9      ;set to show that a number entered
0049/00 FD360306     47     261          ld      (iy+RS_fw),6         ;put a 0 at end
004d/00 AF           48     262          xor     a
004e/00 320800       49     263          ld      (scrch+8),a
0051/00              50     264     nonum1:
0051/00 E1           51     265          pop     hl                   ;get back storage area address
0052/00 CD0000       52     266          call    readstring
0055/00 3A0300       53     267          ld      a,(rs_args+RS_fw)    ;get count of input
0058/00 B7           54     268          or      a                    ;if 0, then do re-input
0059/00 28BD         55     269          jr      z,totag
005b/00 320800       56     270          ld      (scrch+8),a          ;save count of inputed digits
005e/00              57     271     brkag:
005e/00 21F401       58     272          ld      hl,brkprmt           ;put up prompt asking for total count
0061/00 3E02         59     273          ld      a,2
0063/00 CD0000       60     274          call    adisplay_cp
0066/00 2A0000       61     275          ld      hl,(scrch)           ;get machine area index
0069/00 E5           62     276          push    hl                   ;save onto stack
006a/00              63     277          RSARGS  6,9,scrch+9
                     63     278 +        import  rs_args              ;
006a/00 FD210000     63     279 +        ld      iy,rs_args           ; iy -> argument block
006e/00 FD360009     63     280 +        ld      (iy+RS_startpos),9   ; starting position for display
0072/00 FD360109     63     281 +        ld      (iy+RS_pos),+9  ; current position for cursor
0076/00 FD360206     63     282 +        ld      (iu+RS_maxfw),6 ; maximum allowed input field width
```

```
007a/00 FD360300    63     283 +         ld      (iy+RS_fw),+0              ; current input field width (# chars read)
007e/00 210900      63     284 +         ld      hl,scrch+9                           ; address of buffer for input chars

Nuvatec Z80 assembler   Release 1.92          Tue Dec 29 11:18:39 1981                    page 2

setup.s

Addr/    Object    File    Ass'y
Section   Code     Line#   Line#  + S t a t e m e n t
-------  -------   -----   -----  - ---------------------------------------------------------------

0081/00 E3          64     285           ex      (sp),hl                    ;switch machine referance with buffer
0082/00 110800      65     286           ld      de,M_setbcnt               ;set HL to total parts count
0085/00 CDD801      66     287           call    chkconv
0088/00 B7          67     288           or      a
0089/00 280C        68     289           jr      z,nonum2-$
008b/00 FD36010F    69     290           ld      (iy+RS_pos),6+9
008f/00 FD360306    70     291           ld      (iy+RS_fw),6               ;set to show that a number entered
0093/00 AF          71     292           xor     a
0094/00 320F00      72     293           ld      (scrch+15),a
0097/00             73     294  nonum2:
0097/00 E1          74     295           pop     hl                         ;buffer address
0098/00 CD0000      75     296           call    readstring
009b/00 3A0300      76     297           ld      a,(rs_args+RS_fw)          ;get count of input
009e/00 B7          77     298           or      a                          ;if 0, then do re-input
009f/00 28BD        78     299           jr      z,brkag
00a1/00 321000      79     300           ld      (scrch+16),a               ;save count of inputed digits
00a4/00             80     301  tolag:
00a4/00 21FB01      81     302           ld      hl,tolprmt                 ;get tolerance deviation
00a7/00 3E02        82     303           ld      a,2
00a9/00 CD0000      83     304           call    adisplay_cp
00ac/00             84     305           RSARGS  1,14,scrch+17
                    84     306 +         import  rs_args
00ac/00 FD210000    84     307 +         ld      iy,rs_args                 ; iy -> argument block
00b0/00 FD36000E    84     308 +         ld      (iy+RS_startpos),14        ; starting position for display
00b4/00 FD36010E    84     309 +         ld      (iy+RS_pos),+14 ; current position for cursor
00b8/00 FD360201    84     310 +         ld      (iy+RS_maxfw),1 ; maximum allowed input field width
00bc/00 FD360300    84     311 +         ld      (iy+RS_fw),+0              ; current input field width (# chars read)
00c0/00 211100      84     312 +         ld      hl,scrch+17                          ; address of buffer for input chars
00c3/00 E5          85     313           push    hl
00c4/00 2A0000      86     314           ld      hl,(scrch)
00c7/00 112200      87     315           ld      de,M_tolfac                ;get current tolerance factor
00ca/00 19          88     316           add     hl,de
00cb/00 7E          89     317           ld      a,(hl)                     ;test if 0
00cc/00 B7          90     318           or      a
00cd/00 280D        91     319           jr      z,nonum3
00cf/00 F630        92     320           or      30h                        ;make an ascii
00d1/00 321100      93     321           ld      (scrch+17),a               ;save it in buffer
00d4/00 FD36010E    94     322           ld      (iy+RS_pos),14+1
00d8/00 FD360301    95     323           ld      (iy+RS_fw),1
00dc/00             96     324  nonum3:
00dc/00 E1          97     325           pop     hl
00dd/00 CD0000      98     326           call    readstring
00e0/00 3A0300      99     327           ld      a,(rs_args+RS_fw)          ;get count of input
00e3/00 B7         100     328           or      a
00e4/00 28BE       101     329           jr      z,tolag
                   102     330  ;now that the necessary information has been gotten, load it into storage
00e6/00 2A0000     103     331           ld      hl,(scrch)                 ;get machine area reference
00e9/00 CB7E       104     332           bit     7,(hl)                     ;is a production finished in this section
00eb/00 2819       105     333           jr      z,noclr                    ;if not then no clearing
00ed/00 E5         106     334           push    hl                         ;save start
00ee/00 E5         107     335           push    hl                         ;set DE to 1 spot ahead
00ef/00 D1         108     336           pop     de
00f0/00 13         109     337           inc     de
00f1/00 013E00     110     338           ld      bc,40h-1                   ;BC = count of machine section -1
00f4/00 3600       111     339           ld      (hl),0
00f6/00 EDB0       112     340           ldir
00f8/00 2A1400     113     341           ld      hl,(scrch+20)              ;clear hit accumulation area also
00fb/00 E5         114     342           push    hl
00fc/00 D1         115     343           pop     de
00fd/00 13         116     344           inc     de
00fe/00 01FF00     117     345           ld      bc,2*128-1                 ;size of hit 1 & 2 sections -1
0101/00 3600       118     346           ld      (hl),0
0103/00 EDB0       119     347           ldir
0105/00 E1         120     348           pop     hl                         ;restore as before
0106/00            121     349  noclr:
```

```
0106/00 CBE6      122    350           set    4,(hl)                  ;indicate production entered
0108/00 E5        123    351           push   hl
0109/00 E5        124    352           push   hl                      ;reset blink and display pointer
010a/00 E5        125    353           push   hl
010b/00 112400    126    354           ld     de,M_dfreq
010e/00 19        127    355           add    hl,de
010f/00 3600      128    356           ld     (hl),0
0111/00 2B        129    357           dec    hl                      ;make sure display is on
0112/00 CBFE      130    358           set    7,(hl)

Nuvatec Z80 assembler   Release 1 92

setup.s

Addr/    Object   File    Ass'y
Section   Code    Line#   Line# + S t a t e m e n t
-------  -------  -----   ----- - ---------------------------------------------------------
0114/00 E1        131    359           pop    hl
0115/00 FDE1      132    360           pop    iy
0117/00 110500    133    361           ld     de,M_tcnt
011a/00 19        134    362           add    hl,de
011b/00 FD750E    135    363           ld     (iy+M_dptr),l           ;display pointer load
011e/00 FD740F    136    364           ld     (iy+M_dptr+1),h
0121/00 E1        137    365           pop    hl                      ;set HL back to begining of area
0122/00 110200    138    366           ld     de,M_settcnt            ;address total, break and tolerance
0125/00 E5        139    367           push   hl
0126/00 19        140    368           add    hl,de
0127/00 E3        141    369           ex     (sp),hl
0128/00 110800    142    370           ld     de,M_setbcnt            ;break
012b/00 E5        143    371           push   hl
012c/00 19        144    372           add    hl,de
012d/00 E3        145    373           ex     (sp),hl
012e/00 112200    146    374           ld     de,M_tolfac
0131/00 19        147    375           add    hl,de
0132/00 111100    148    376           ld     de,scrch+17             ;reference where tolerance is at
0135/00 1A        149    377           ld     a,(de)                  ;if their not the same then reset
0136/00 E60F      150    378           and    0fh                     ;get rid of ascii for test
0138/00 BE        151    379           cp     (hl)                    ; threshold flags for recomputing
0139/00 2810      152    380           jr     z,notlch
013b/00 E5        153    381           push   hl
013c/00 D5        154    382           push   de
013d/00 CDAE01    155    383           call   thrclr                  ;clear for thresholds
0140/00 2A0000    156    384           ld     hl,(scrch)              ;get flag address
0143/00 CB4E      157    385           bit    1,(hl)                  ;in production mode
0145/00 2802      158    386           jr     z,nopro
0147/00 CBC6      159    387           set    0,(hl)
0149/00           160    388   nopro:
0149/00 D1        161    389           pop    de
014a/00 E1        162    390           pop    hl                      ;restore original into HL
014b/00           163    391   notlch:
014b/00 1A        164    392           ld     a,(de)                  ;get rid of ascii
014c/00 E60F      165    393           and    0fh
014e/00 77        166    394           ld     (hl),a
014f/00 3A1000    167    395           ld     a,(scrch+16)            ;get count of break digits
0152/00 47        168    396           ld     b,a
0153/00 0E03      169    397           ld     c,3
0155/00 110900    170    398           ld     de,scrch+9
0158/00 E1        171    399           pop    hl
0159/00 CD0000    172    400           call   asc_bcd
015c/00 3A0800    173    401           ld     a,(scrch+8)             ;get count of total digits
015f/00 47        174    402           ld     b,a
0160/00 0E03      175    403           ld     c,3
0162/00 110200    176    404           ld     de,scrch+2
0165/00 E1        177    405           pop    hl
0166/00 CD0000    178    406           call   asc_bcd
0169/00 C30000    179    407           jp     clscon                  ;close down conversation
                  180    408    ;if key switch was off, this section is for clearing 'tolerances set' indication
016c/00           181    409   opset
016c/00 2A0000    182    410           ld     hl,(scrch)              ;if in production mode at all then no go
016f/00 CB4E      183    411           bit    1,(hl)
0171/00 C20000    184    412           jp     nz,clscon
0174/00 3E01      185    413           ld     a,1                     ;put up CLEAR BREAK TOTAL prompt
0176/00 210602    186    414           ld     hl,clrpr
0179/00 CD0000    187    415           call   adisplay_cp
017c/00 CD0000    188    416           call   keyred                  ;get the answer
```

```
017f/00 FE0D        189    417            cp     KEY_NEXT
0181/00 2813        190    418            jr     z,nogo
0183/00 FE0A        191    419            cp     KEY_ENTER
0185/00 20E5        192    420            jr     nz,opset
0187/00 2A0000      193    421            ld     hl,(scrch)           ;clear count of break total
018a/00 110B00      194    422            ld     de,M_bcnt
018d/00 19          195    423            add    hl,de
018e/00 3600        196    424            ld     (hl),0
0190/00 23          197    425            inc    hl
0191/00 3600        198    426            ld     (hl),0
0193/00 23          199    427            inc    hl
0194/00 3600        200    428            ld     (hl),0
0196/00             201    429  nogo
0196/00 3E01        202    430            ld     a,1                  ;put up CLEAR THRESHOLD prompt
0198/00 211802      203    431            ld     hl,thrpr
019b/00 CD0000      204    432            call   adisplay_cp

Nuvatec Z80 assembler   Release 1.92          Tue Dec 29 11:18:39 1981

setup.s

Addr/     Object   File    Ass'y
Section    Code    Line#   Line# + S t a t e m e n t
-------   -------  -----   -----  -------------------------------------------
019e/00 CD0000      205    433            call   keyred               ;answer
01a1/00 FE0D        206    434            cp     KEY_NEXT
01a3/00 CA0000      207    435            jp     z,clscon
01a6/00 FE0A        208    436            cp     KEY_ENTER
01a8/00 20EC        209    437            jr     nz,nogo
01aa/00 210000      210    438            ld     hl,clscon            ;push CLSCON address onto stack
01ad/00 E5          211    439            push   hl
01ae/00             212    440  thrclr:
01ae/00 2A0000      213    441            ld     hl,(scrch)           ;clear indication in flags
01b1/00 CB9E        214    442            res    3,(hl)
01b3/00 CBAE        215    443            res    5,(hl)               ;allow drift again
01b5/00 2A1400      216    444            ld     hl,(scrch+20)        ;clear machine storage B area
01b8/00 E5          217    445            push   hl
01b9/00 D1          218    446            pop    de
01ba/00 13          219    447            inc    de
01bb/00 01FF00      220    448            ld     bc,100h-1
01be/00 3600        221    449            ld     (hl),0
01c0/00 EDB0        222    450            ldir
01c2/00 C9          223    451            ret
                    224    452  ;MACHREF: sets HL equal to start of machine area passed in A
01c3/00             225    453  machref:
01c3/00 E607        226    454            and    07h
01c5/00 21C0FF      227    455            ld     hl,machsta-sizeof(mach_sect)
01c8/00 FD2180FF    228    456            ld     iy,machstb-128
01cc/00 114000      229    457            ld     de,sizeof(mach_sect)
01cf/00             230    458  malop:
01cf/00 19          231    459            add    hl,de
01d0/00 FD19        232    460            add    iy,de          ;add twice to IY for B section
01d2/00 FD19        233    461            add    iy,de
01d4/00 3D          234    462            dec    a
01d5/00 20F8        235    463            jr     nz,malop
01d7/00 C9          236    464            ret
                    237    465   ;CHKCONV: checks if a number stored is non-zero, returns with A = 0 if so
                    238    466   ;         if not it converts to ascii and displays number
01d8/00             239    467  chkconv:
01d8/00 19          240    468            add    hl,de                ;combine to reach value
01d9/00 E5          241    469            push   hl                   ;save start address
01da/00 7E          242    470            ld     a,(hl)
01db/00 23          243    471            inc    hl                   ;or in all bytes
01dc/00 B6          244    472            or     (hl)
01dd/00 23          245    473            inc    hl
01de/00 B6          246    474            or     (hl)
01df/00 D1          247    475            pop    de                   ;get back start address
01e0/00 C8          248    476            ret    z                    ;if result was 0 then bye-bye
01e1/00 C1          249    477            pop    bc                   ;pop off return address
01e2/00 E1          250    478            pop    hl                   ;get buffer address into DE
01e3/00 E5          251    479            push   hl
01e4/00 C5          252    480            push   bc                   ;put back return address
01e5/00 0603        253    481            ld     b,3                  ;digit count
01e7/00 CD0000      254    482            call   bcd_asc
```

```
01ea/00 3E01       255     483                ld        a,1
01ec/00 C9         256     484                ret
                   257     485      ;prompts for conversation
01ed/00 544F5441   258     486      totprmt:       db        "TOTAL-",0
        4C2D00
01f4/00 42524541   259     487      brkprmt:       db        "BREAK-",0
        4B2D00
01fb/00 544F4C45   260     488      tolprmt:       db        "TOLERANCE-",0
        52414E43
        452D00
0206/00 434C4541   261     489      clrpr:         db        "CLEAR BREAK TOTAL",0
        52204252
        45414B20
        544F5441
        4C00
0218/00 434C4541   262     490      thrpr:         db        "CLEAR THRESHOLD",0
        52205448
        52455348
        4F4C4400
                   263     491      ;
                   264     492      ;*******
0228/00            265     493                end

No errors in this assembly

Nuvatec Z80 assembler   Release 1.92          Tue Dec 29 11:18:39 1981

setup.s

Addr/     Object   File    Ass'y
Section    Code    Line#   Line#  + S t a t e m e n t
________  ________ _____   ______ _ ____________________________________


Symbol table entries used:     102/ 571
Symbol name characters used:   880/7500

Nuvatec Z80 assembler   Release 1.92          Tue Dec 29 11:18:39 1981

setup.s
Symbol Table / Cross-Reference Listing

value    type        defined      name of symbol
_____    ______      _______      ______________

3001         e          22        AD_CONTROL
00d3         e          34        AD_CclrAll
00e0         e          43        AD_Cendint
0040         e          40        AD_CreadKEY
0090         e          31        AD_Cwrite
3000         e          21        AD_DATA
0003         e          11        BCD_NUMLEN
0010         e          13        CLOCKRATE
0008         e          58        DF_BLINK2
0020         e          57        DF_ERRBLINK
0000         e          55        DF_STEADY
0008         e          56        DS_BRKBLINK
0080         e          52        DS_ON
0005/--                184        H_acc16
0002/--                182        H_acc4
0008/--                186        H_acc64
000b/--                189        H_bbufp
000c/--                191        H_buf
0000/--                173        H_cflags
0004/--                183        H_cnt16
0001/--                181        H_cnt4
0007/--                185        H_cnt64
000a/--                188        H_fbufp
0015/--                193        H_hitclk
0016/--                194        H_hitclksv
0014/--                192        H_static
0018/--                196        H_trcnt
0017/--                195        H_trend
0008         e          66        KEY_BS
000a         e          65        KEY_ENTER
000d         e          67        KEY_NEXT
```

```
000b/--                131        M_bcnt
0024/--                159        M_dfreq
000e/--                133        M_dptr
0023/--                157        M_dstatus
0001/--                121        M_errflags
0025/--                163        M_fcdis
0000/--                102        M_flags
002d/--                164        M_hitclk
0008/--                130        M_setbcnt
0002/--                128        M_settcnt
0005/--                129        M_tcnt
0020/--                154        M_tcount
0010/--                137        M_tol1
0018/--                145        M_tol16
0014/--                141        M_tol4
001c/--                149        M_tol64
0022/--                155        M_tolfac
0010/--                136        M_tols
3801           e        25        ND_CONTROL
00df           e        35        ND_CclrAll
00c2           e        38        ND_CclrF
00e0           e        44        ND_Cendint
0040           e        41        ND_CreadHIT
0090           e        32        ND_Cwrite
3800           e        24        ND_DATA
0006           e        10        NUMLEN
0002           e         8        N_HITS
0004           e         7        N_MACHINES
0003/--                208        RS_fw
0002/--                207        RS_maxfw
0001/--                206        RS_pos
0000/--                205        RS_startpos
00ff           e        15        WATCHDOG
0000/07 ?   I          ---        adisplay_cp
0000/04 ?   I          ---        asc_bcd
0000/05 ?   I          ---        bcd_asc
005e/00                271        brkag
01f4/00                487        brkprmt
01d8/00                467        chkconv
0206/00                489        clrpr
0000/01 ?   I          ---        clscon
0080/--        s       171        hit_sect
0000/0f ?G  I          ---        inmachine
0000/0a ?   I          ---        keyred

Nuvatec Z80 assembler   Release 1.92          Tue Dec 29 11:18:39 1981

setup.s
Symbol Table / Cross-Reference Listing

value     type        defined     name of symbol
-------   --------    -------     ----------------

0040/--        s        99        mach_sect
0000/06 ?   I          ---        machnum
01c3/00   E            453        machref
0000/03 ?   I          ---        machsta
0000/09 ?   I          ---        machstb
01cf/00                458        malop
0106/00                349        noclr
0196/00                429        nogo
0051/00                264        nonum1
0097/00                294        nonum2
00dc/00                324        nonum3
0149/00                388        nopro
014b/00                391        notlch
016c/00                409        opset
0000/0e ?G  I          ---        readstring
0000/0d ?   I          ---        rs_args
0004/--        s       204        rsarg_sect
0000/02 ?   I          ---        scrch
0000/00   E            232        setup
0228/00        s       212        setup.s
0000/08 ?   I          ---        sysflg
01ae/00                440        thrclr
0218/00                490        thrpr
00a4/00                301        tolag
```

```
01fb/00                  488        tolprmt
0018/00                  241        totag
01ed/00                  486        totprmt

Nuvatec Z80 assembler   Release 1.92          Tue Dec 22 16:31:23 1981

conv.s

Addr/    Object   File   Ass'y
Section  _Code_   Line#  Line# + S t a t e m e n t
-------  -------  -----  ----- - ---------------------------------------
                             1  ;--------------------------------------------------------;
                             2  ;         This file contains user/machine conversations    ;
                             3  ;--------------------------------------------------------;
                             4
                             5          list     "off"
0000/00                  9 216          section  "ROM"
                        10 217
                        11 218  ;--------------------------------------------------------;
                        12 219  ;
                        13 220  ; Name:          conv_pick_d
                        14 221  ;
                        15 222  ; Function:      conversation to pick value to be shown in numeric displays
                        16 223  ;
                        17 224  ; Needs:
                        18 225  ;
                        19 226  ; Returns:
                        20 227  ;
                        21 228  ; Destroys:      all registers (except IX)
                        22 229  ;
                        23 230  ; Other Comments:
                        24 231  ;
                        25 232  ;--------------------------------------------------------;
                        26 233
                        27 234          import  cpd_retn, machnum, blankBCD, machsta, inmachine, scrch
                        28 235          import  keyred2, machref, adisplay_cp, clscon
                        29 236          export  conv_pick_d
                        30 237
0000/00                 31 238  conv_pick_d:
                        32 239   ;get machine number to change
0000/00  CD0000         33 240          call    inmachine
0003/00  3A0000         34 241          ld      a,(machnum)
0006/00  CD0000         35 242          call    machref
0009/00  220100         36 243          ld      (scrch+1),hl
000c/00  AF             37 244          xor     a                       ;start at zero
000d/00  1812           38 245          jr      into                    ;display first and change pointer
000f/00                 39 246  get_key:
000f/00  CD0000         40 247          call    keyred2                 ; read a key
0012/00  FE0A           41 248          cp      KEY_ENTER               ; if ENTER is pressed then exit
0014/00  CA0000         42 249          jp      z,clscon
0017/00  FE0D           43 250          cp      KEY_NEXT                ; else if got NEXT key, re-loop (djnz),
0019/00  20F4           44 251          jr      nz,get_key              ; else wait until get ENTER or NEXT
001b/00  3A0300         45 252          ld      a,(scrch+3)             ;index count for prompt and pointer
001e/00  3C             46 253          inc     a
001f/00  E603           47 254          and     03h
0021/00                 48 255  into:
0021/00  320300         49 256          ld      (scrch+3),a             ;save it
0024/00  1600           50 257          ld      d,0                     ;
0026/00  5F             51 258          ld      e,a                     ;save it a bit
0027/00  D5             52 259          push    de                      ; HL -> mptr_table entry corresponding
0028/00  215400         53 260          ld      hl,mptr_table           ;        to prompt selected
002b/00  19             54 261          add     hl,de                   ;
002c/00  5E             55 262          ld      e,(hl)                  ; DE = mptr_table entry, which is index
                        56 263                                          ;        into machine's info area of BCD
                        57 264                                          ;        number to be displayed (0 if blank)
002d/00  2A0100         58 265          ld      hl,(scrch+1)            ;get start of area for specified mach.
0030/00  E5             59 266          push    hl                      ;into IY also
0031/00  FDE1           60 267          pop     iy
0033/00  19             61 268          add     hl,de                   ;add in offset
0034/00  FD750E         62 269          ld      (iy+M_dptr),l           ;store the pointer
0037/00  FD740F         63 270          ld      (iy+M_dptr+1),h
003a/00  D1             64 271          pop     de                      ;get back offset for prompt determing
003b/00  CB23           65 272          sla     e                       ;2*DE
003d/00  214C00         66 273          ld      hl,prompt_table
0040/00  19             67 274          add     hl,de
```

```
0041/00 5E          68     275                 ld      e,(hl)
0042/00 23          69     276                 inc     hl
0043/00 66          70     277                 ld      h,(hl)
0044/00 6B          71     278                 ld      l,e
0045/00 3E02        72     279                 ld      a,2                 ;display offset
0047/00 CD0000      73     280                 call    adisplay_cp
004a/00 18C3        74     281                 jr      get_key
                    75     282
                    76     283
                    77     284

Nuvatec Z80 assembler   Release 1.92          Tue Dec 22 16:31:23 1981

conv.s

Addr/    Object     File   Ass'y
Section  Code       Line#  Line# + S t a t e m e n t
-------  --------   -----  -----   -----------------------------------------

004c/00             78     285  prompt_table:
004c/00 7600        79     286                 dw      prompt3         ;
004e/00 8500        80     287                 dw      prompt4         ;
0050/00 5800        81     288                 dw      prompt1         ;
0052/00 6700        82     289                 dw      prompt2         ;
0004                83     290  prompt_count:  equ     ($-prompt_table)/2
                    84     291
0054/00             85     292  mptr_table:                            ; entries correspond to prompt_table entries
0054/00 08          86     293                 db      M_setbcnt       ;
0055/00 0B          87     294                 db      M_bcnt          ;
0056/00 02          88     295                 db      M_settcnt       ;
0057/00 05          89     296                 db      M_tcnt          ;
                    90     297
0058/00 50415254    91     298  prompt1:       db      "PARTS LIMIT  ?\0"
        53204C49
        4D495420
        203F00
0067/00 50415254    92     299  prompt2:       db      "PARTS TOTAL  ?\0"
        5320544F
        54414C20
        203F00
0076/00 42524541    93     300  prompt3:       db      "BREAKS LIMIT ?\0"
        4B53204C
        494D4954
        203F00
0085/00 42524541    94     301  prompt4:       db      "BREAKS TOTAL ?\0"
        4B532054
        4F54414C
        203F00

No errors in this assembly

Symbol table entries used:      88/ 571
Symbol name characters used:   810/7500

Nuvatec Z80 assembler   Release 1.92          Tue Dec 22 16:31:23 1981

conv.s
Symbol Table / Cross-Reference Listing

value    type        defined      name of symbol
-----    ----        -------      --------------

3001       e           26         AD_CONTROL
00d3       e           38         AD_CclrAll
00e0       e           47         AD_Cendint
0040       e           44         AD_CreadKEY
0090       e           35         AD_Cwrite
3000       e           25         AD_DATA
0003       e           15         BCD_NUMLEN
0010       e           17         CLOCKRATE
0008       e           62         DF_BLINK2
0020       e           61         DF_ERRBLINK
0000       e           59         DF_STEADY
0008       e           60         DS_BRKBLINK
0080       e           56         DS_ON
0005/--               188         H_acc16
```

```
0002/--              186     H_acc4
0008/--              190     H_acc64
000b/--              193     H_bbufp
000c/--              195     H_buf
0000/--              177     H_cflags
0004/--              187     H_cnt16
0001/--              185     H_cnt4
0007/--              189     H_cnt64
000a/--              192     H_fbufp
0015/--              197     H_hitclk
0016/--              198     H_hitclksv
0014/--              196     H_static
0018/--              200     H_trcnt
0017/--              199     H_trend
0008         e        70     KEY_BS
000a         e        69     KEY_ENTER
000d         e        71     KEY_NEXT
000b/--              135     M_bcnt
0024/--              163     M_dfreq
000e/--              137     M_dptr
0023/--              161     M_dstatus
0001/--              125     M_errflags
0025/--              167     M_fcdis
0000/--              106     M_flags
002d/--              168     M_hitclk
0008/--              134     M_setbcnt
0002/--              132     M_settcnt
0005/--              133     M_tcnt
0020/--              158     M_tcount
0010/--              141     M_tol1
0018/--              149     M_tol16
0014/--              145     M_tol4
001c/--              153     M_tol64
0022/--              159     M_tolfac
0010/--              140     M_tols
3801         e        29     ND_CONTROL
00df         e        39     ND_CclrAll
00c2         e        42     ND_CclrF
00e0         e        48     ND_Cendint
0040         e        45     ND_CreadHIT
0090         e        36     ND_Cwrite
3800         e        28     ND_DATA
0006         e        14     NUMLEN
0002         e        12     N_HITS
0004         e        11     N_MACHINES
0003/--              212     RS_fw
0002/--              211     RS_maxfw
0001/--              210     RS_pos
0000/--              209     RS_startpos
00ff         e        19     WATCHDOG
0000/09 ?  I         ---     adisplay_cp
0000/03 ?  I         ---     blankBCD
0000/0a ?  I         ---     clscon
0094/00      s       216     conv.s
0000/00    E         238     conv_pick_d
0000/01 ?  I         ---     cpd_retn
000f/00              246     get_key
0080/--      s       175     hit_sect
0000/05 ?  I         ---     inmachine
0021/00              255     into
0000/07 ?  I         ---     keyred2

Nuvatec Z80 assembler   Release 1.92         Tue Dec 22 16:31:23 1981

conv.s
Symbol Table / Cross-Reference Listing

value     type       defined     name of symbol
-------   --------   -------     ----------------

0040/--      s       103     mach_sect
0000/02 ?  I         ---     machnum
0000/08 ?  I         ---     machref
0000/04 ?  I         ---     machsta
0054/00              292     mptr_table
0058/00              298     prompt1
0067/00              299     prompt2
```

```
0076/00                 300        prompt3
0085/00                 301        prompt4
0004                    290        prompt_count
004c/00                 285        prompt_table
0004/--      s          208        rsarg_sect
0000/06 ?  I            ---        scrch

Nuvatec Z80 assembler   Release 1.92          Tue Dec 29 11:18:10 1981

error.s

Addr/    Object   File    Ass'y
Section  Code     Line#   Line# + S t a t e m e n t
-------  -------  -----   ----- - ----------------------------------------
                              1              list    "off"
0000/00               4      91              section "ROM"
                      5      92    ;section C
                      6      93    ;
                      7      94    ;ERROR: list out errors on machine
                      8      95    ;
                      9      96    ;-----------------------------------------------
                     10      97    ;Needs, returns, detroys: nothing of importance
                     11      98    ;
                     12      99              entry   error
                     13     100              extern  scrch,machnum,clscon
                     14     101              extern  machsta,inmachine,keyred,machref
                     15     102              extern  adisplay_cp,adisplay_clr
                     16     103    ;
0000/00              17     104    error:
0000/00 CD0000       18     105              call    inmachine
0003/00 3A0000       19     106              ld      a,(machnum)
0006/00 CD0000       20     107              call    machref
0009/00 23           21     108              inc     hl              ;set to machine error flags
000a/00 220100       22     109              ld      (scrch+1),hl    ;save reference here
000d/00 FD220400     23     110              ld      (scrch+4),iy    ;ditto for the dynamic area
0011/00 3E01         24     111              ld      a,1             ;use A as a mask for bit relation
0013/00 0E00         25     112              ld      c,0             ;and C as error number counter
0015/00 1811         26     113              jr      into-$
0017/00              27     114    errlop:
0017/00 2A0100       28     115              ld      hl,(scrch+1)    ;get error byte address
001a/00 3A0300       29     116              ld      a,(scrch+3)     ;get error counter
001d/00 4F           30     117              ld      c,a
001e/00 AF           31     118              xor     a               ;clear carry flag
001f/00 3A0000       32     119              ld      a,(scrch)
0022/00 CB27         33     120              sla     a               ;shift mask bit over 1
0024/00 DA0000       34     121              jp      c,clscon        ;if carry off then done
0027/00 0C           35     122              inc     c
0028/00              36     123    into:
0028/00 F5           37     124              push    af              ;save away error counter
0029/00 79           38     125              ld      a,c
002a/00 320300       39     126              ld      (scrch+3),a
002d/00 F1           40     127              pop     af
002e/00 320000       41     128              ld      (scrch),a       ;save mask away
0031/00 A6           42     129              and     (hl)            ;error flag set
0032/00 28E3         43     130              jr      z,errlop
0034/00 79           44     131              ld      a,c             ;get error number in A
0035/00 216100       45     132              ld      hl,errtab       ;address of error prompt table
0038/00 CB27         46     133              sla     a
003a/00 1600         47     134              ld      d,0
003c/00 5E           48     135              ld      e,a             ;off set into table
003d/00 19           49     136              add     hl,de
003e/00 7E           50     137              ld      a,(hl)          ;get address of prompt
003f/00 23           51     138              inc     hl
0040/00 66           52     139              ld      h,(hl)
0041/00 6F           53     140              ld      l,a             ;make sure address is set up
0042/00 B4           54     141              or      h               ;if 0 then bad error flagging
0043/00 2812         55     142              jr      z,entgot        ;since uncalled for error, clear it
0045/00 3E01         56     143              ld      a,1             ;2 space offset on display
0047/00 CD0000       57     144              call    adisplay_cp     ;put it up
004a/00              58     145    entwait:
004a/00 CD0000       59     146              call    keyred          ;wait for an ENTER key
004d/00 FE0A         60     147              cp      KEY_ENTER
004f/00 2806         61     148              jr      z,entgot        ;if enter go on
0051/00 FE0D         62     149              cp      KEY_NEXT
0053/00 20F5         63     150              jr      nz,entwait      ;if not a next go back and look again
```

```
0055/00 18C0         64     151            jr       errlop             ;go on to next error
0057/00              65     152   entgot:
0057/00 3A0000       66     153            ld       a,(scrch)
005a/00 2A0100       67     154            ld       hl,(scrch+1)       ;since ENTER pushed clear error out
005d/00 AE           68     155            xor      (hl)
005e/00 77           69     156            ld       (hl),a
005f/00 18B6         70     157            jr       errlop
                     71     158    ;table of error prompt addresses
0061/00              72     159   errtab:
0061/00 C000         73     160            dw       err2
0063/00 B300         74     161            dw       err1
0065/00 9500         75     162            dw       err3
0067/00 A400         76     163            dw       err4

Nuvatec Z80 assembler   Release 1.92           Tue Dec 29 11:18:10 1981

error.s

Addr/    Object     File    Ass'y
Section  Code       Line#   Line#  + S t a t e m e n t

0069/00 CD00         77     164            dw       err5
006b/00 DD00         78     165            dw       err6
006d/00 7700         79     166            dw       err7
006f/00 8600         80     167            dw       err8
0071/00 00000000     81     168            dw       0,0,0
        0000
                     82     169     ;error prompts
0077/00 4C4F2043     83     170   err7:    db       "LO COUNT FAULT",0
        4F554E54
        20464155
        4C5400
0086/00 48492043     84     171   err8:    db       "HI COUNT FAULT",0
        4F554E54
        20464155
        4C5400
0095/00 4552524F     85     172   err3:    db       "ERROR IN HIT 1",0
        5220494E
        20484954
        203100
00a4/00 4552524F     86     173   err4:    db       "ERROR IN HIT 2",0
        5220494E
        20484954
        203200
00b3/00 464F5243     87     174   err1:    db       "FORCE TOO HI",0
        4520544F
        4F204849
        00
00c0/00 464F5243     88     175   err2:    db       "FORCE TOO LO",0
        4520544F
        4F204C4F
        00
00cd/00 4E4F2053     89     176   err5:    db       "NO STATIC FORCE",0
        54415449
        4320464F
        52434500
00dd/00 54455354     90     177   err6:    db       "TEST RUN LIMIT",0
        2052554E
        204C494D
        495400
                     91     178    ;
                     92     179    ;********

No errors in this assembly

Symbol table entries used:       51/ 571
Symbol name characters used:    437/7500

Nuvatec Z80 assembler   Release 1.92           Tue Dec 29 11.18.10 1981

error.s
Symbol Table / Cross-Reference Listing

value    type       defined     name of symbol
```

```
------     --------   ------     -------
3001          e         22       AD_CONTROL
00d3          e         34       AD_CclrAll
00e0          e         43       AD_Cendint
0040          e         40       AD_CreadKEY
0090          e         31       AD_Cwrite
3000          e         21       AD_DATA
0003          e         11       BCD_NUMLEN
0010          e         13       CLOCKRATE
0008          e         58       DF_BLINK2
0020          e         57       DF_ERRBLINK
0000          e         55       DF_STEADY
0008          e         56       DS_BRKBLINK
0080          e         52       DS_ON
0008          e         66       KEY_BS
000a          e         65       KEY_ENTER
000d          e         67       KEY_NEXT
3801          e         25       ND_CONTROL
00df          e         35       ND_CclrAll
00c2          e         38       ND_CclrF
00e0          e         44       ND_Cendint
0040          e         41       ND_CreadHIT
0090          e         32       ND_Cwrite
3800          e         24       ND_DATA
0006          e         10       NUMLEN
0002          e          8       N_HITS
0004          e          7       N_MACHINES
00ff          e         15       WATCHDOG
0000/09 ?  I            ---      adisplay_clr
0000/08 ?  I            ---      adisplay_cp
0000/03 ?  I            ---      clscon
0057/00                 152      entgot
004a/00                 145      entwait
00b3/00                 174      err1
00c0/00                 175      err2
0095/00                 172      err3
00a4/00                 173      err4
00cd/00                 176      err5
00dd/00                 177      err6
0077/00                 170      err7
0086/00                 171      err8
0017/00                 114      errlop
0000/00    E            104      error
00ec/00     s            91      error.s
0061/00                 159      errtab
0000/05 ?  I            ---      inmachine
0028/00                 123      into
0000/06 ?  I            ---      keyred
0000/02 ?  I            ---      machnum
0000/07 ?  I            ---      machref
0000/04 ?  I            ---      machsta
0000/01 ?  I            ---      scrch

Nuvatec Z80 assembler   Release 1.9          Sun Nov  8 13:50:26 1981

force.s

Addr/     Object   File   Ass'y
Section    Code    Line#  Line# + S t a t e m e n t
-------   ------   -----  -----   ----------------------------------------
                             1            list    "off"
                     5     212   ;FORCE:  interactive routine for display average hit force values on the
                     6     213   ;        alpha display. choice of 1,4,16 or 64 hit averages
                     7     214   ;
                     8     215            entry   force
                     9     216            extrn   machstb,machsta,inmachine,keyred,machref
                    10     217            extrn   bufstf,scrch,adisplay_p,machnum,adispch
                    11     218   ;
0000/00             12     219   force:
0000/00 CD0000      13     220            call    inmachine
0003/00 3A0000      14     221            ld      a,(machnum)           ;get chosen machine number
0006/00 CD0000      15     222            call    machref
0009/00 112500      16     223            ld      de,M_dfreq+1
000c/00 19          17     224            add     hl,de
```

```
0000d/00 220000     18    225          ld      (scrch),hl          ;save machine storage reference
0010/00             19    226   loop:
0010/00 3E0F        20    227          ld      a,0fh               ;get a return key code to stuff
0012/00 CD0000      21    228          call    bufstf              ;stuffer in dah buffer
0015/00 2A0000      22    229          ld      hl,(scrch)          ;get machine storage reference
0018/00 3A0200      23    230          ld      a,(scrch+2)         ;get inde
001b/00             24    231   tryag:
001b/00 B7          25    232          or      a
001c/00 2805        26    233          jr      z,sett
001e/00 23          27    234          inc     hl
001f/00 23          28    235          inc     hl
0020/00 3D          29    236          dec     a
0021/00 18FB        30    237          jr      tryag
0023/00             31    238   sett:
0023/00 E5          32    239          push    hl                  ;save reference to force values
0024/00 219100      33    240          ld      hl,distr
0027/00 110A00      34    241          ld      de,scrch+10
002a/00 010C00      35    242          ld      bc,dilgt
002d/00 EDB0        36    243          ldir
002f/00 E1          37    244          pop     hl                  ;get back value reference
0030/00 E5          38    245          push    hl
0031/00 FD210C00    39    246          ld      iy,scrch+12         ;do hex->decimal conversion
0035/00 CD6E00      40    247          call    hexasc
0038/00 FD211200    41    248          ld      iy,scrch+18
003c/00 E1          42    249          pop     hl
003d/00 23          43    250          inc     hl
003e/00 CD6E00      44    251          call    hexasc
0041/00 210A00      45    252          ld      hl,scrch+10         ;display the string
0044/00 3E01        46    253          ld      a,1
0046/00 CD0000      47    254          call    adisplay_p
0049/00             48    255   wait:
0049/00 CD0000      49    256          call    keyred              ;go wait for return key
004c/00 FE0F        50    257          cp      0fh
004e/00 28C0        51    258          jr      z,loop              ;if return key then go back
0050/00 FE30        52    259          cp      30h                 ;test for ascii 0-3 for changing reference
0052/00 280C        53    260          jr      z,oky
0054/00 FE31        54    261          cp      31h
0056/00 2808        55    262          jr      z,oky
0058/00 FE32        56    263          cp      32h
005a/00 2804        57    264          jr      z,oky
005c/00 FE33        58    265          cp      33h
005e/00 20E9        59    266          jr      nz,wait
0060/00             60    267   oky:
0060/00 F5          61    268          push    af                  ;save it a bit
0061/00 160E        62    269          ld      d,14                ;display number
0063/00 CD0000      63    270          call    adispch
0066/00 F1          64    271          pop     af                  ;get back the number
0067/00 E603        65    272          and     03h                 ;get just number
0069/00 320200      66    273          ld      (scrch+2),a
006c/00 18DB        67    274          jr      wait                ;go wait for display key
                    68    275   ;
006e/00             69    276   hexasc:
006e/00 7E          70    277          ld      a,(hl)              ;load A with force value
006f/00 0E30        71    278          ld      c,30h               ;use C as counter
0071/00             72    279   hunlp:
0071/00 D664        73    280          sub     100
0073/00 3803        74    281          jr      c,hunneg
0075/00 0C          75    282          inc     c
0076/00 18F9        76    283          jr      hunlp
0078/00             77    284   hunneg:

Nuvatec Z80 assembler   Release 1.9          Sun Nov  8 13:50:26 1981

force.s

Addr/     Object    File   Ass'y
Section   Code      Line#  Line# + S t a t e m e n t
-------   ------    -----  -----   -------------------------------------

0078/00 C664        78    285          add     100
007a/00 FD7100      79    286          ld      (iy+0),c            ;load into buffer
007d/00 0E30        80    287          ld      c,30h
007f/00             81    288   tenlp:
007f/00 D60A        82    289          sub     10                  ;now the 10's spot
0081/00 3803        83    290          jr      c,tenneg
0083/00 0C          84    291          inc     c
```

```
0084/00 18F9       85    292            jr      tenlp
0086/00            86    293   tenneg:
0086/00 C60A       87    294            add     10                              ;make positive again
0088/00 FD7101     88    295            ld      (iy+1),c
008b/00 F630       89    296            or      30h                             ;convert 1's digit
008d/00 FD7702     90    297            ld      (iy+2),a
0090/00 C9         91    298            ret
                   92    299   ;
0091/00 312D2020   93    300   distr:   db      '1-    2-    ',0
        2020322D
        20202000
000c               94    301   dilgt:   equ     $-distr
                   95    302   ;
                   96    303   ;******
009d/00            97    304            end

No errors in this assembly

Symbol table entries used:      91/ 574
Symbol name characters used:   789/7500

Nuvatec Z80 assembler   Release 1.9            Sun Nov  8 13:50:26 1981

force.s
Symbol Table / Cross-Reference Listing

value    type        defined       name of symbol
-----    ----        -------       --------------

3001       e           22          AD_CONTROL
00d3       e           34          AD_CclrAll
00e0       e           43          AD_Cendint
0040       e           40          AD_CreadKEY
0090       e           31          AD_Cwrite
3000       e           21          AD_DATA
0003       e           11          BCD_NUMLEN
0010       e           13          CLOCKRATE
0008       e           58          DF_BLINK2
0020       e           57          DF_ERRBLINK
0000       e           55          DF_STEADY
0008       e           56          DS_BRKBLINK
0080       e           52          DS_ON
0005/--               184          H_acc16
0002/--               182          H_acc4
0008/--               186          H_acc64
000b/--               189          H_bbufp
000c/--               191          H_buf
0000/--               173          H_cflags
0004/--               183          H_cnt16
0001/--               181          H_cnt4
0007/--               185          H_cnt64
000a/--               188          H_fbufp
0015/--               193          H_hitclk
0016/--               194          H_hitclksv
0014/--               192          H_static
0018/--               196          H_trcnt
0017/--               195          H_trend
0008       e           66          KEY_BS
000a       e           65          KEY_ENTER
000d       e           67          KEY_NEXT
0006/--               131          M_bcnt
0024/--               159          M_dfreq
000e/--               133          M_dptr
0023/--               157          M_dstatus
0001/--               121          M_errflags
0025/--               163          M_fcdis
0000/--               102          M_flags
002d/--               164          M_hitclk
0008/--               130          M_setbcnt
0002/--               128          M_settcnt
0005/--               129          M_tcnt
0020/--               154          M_tcount
0010/--               137          M_tol1
0018/--               145          M_tol16
0014/--               141          M_tol4
001c/--               149          M_tol64
```

```
0022/--                  155      M_tolfac
0010/--                  136      M_tols
3801        e             25      ND_CONTROL
00df        e             35      ND_CclrAll
00c2        e             38      ND_CclrF
00e0        e             44      ND_Cendint
0040        e             41      ND_CreadHIT
0090        e             32      ND_Cwrite
3800        e             24      ND_DATA
0006        e             10      NUMLEN
0002        e              8      N_HITS
0004        e              7      N_MACHINES
0003/--                  208      RS_fw
0002/--                  207      RS_maxfw
0001/--                  206      RS_pos
0000/--                  205      RS_startpos
00ff        e             15      WATCHDOG
0000/0a ?  I             ---      adispch
0000/08 ?  I             ---      adisplay_p
0000/06 ?  I             ---      bufstf
000c        e            301      dilgt
0091/00                  300      distr
0000/00   E              219      force
009d/00     s            210      force.s
006e/00                  276      hexasc
0080/--     s            171      hit_sect
0071/00                  279      hunlp
0078/00                  284      hunneg

Nuvatec Z80 assembler   Release 1.9          Sun Nov  8 13:50:26 1981

force.s
Symbol Table / Cross-Reference Listing

value    type        defined      name of symbol

0000/03 ?  I             ---      inmachine
0000/04 ?  I             ---      keyred
0010/00                  226      loop
0040/--     s             99      mach_sect
0000/09 ?  I             ---      machnum
0000/05 ?  I             ---      machref
0000/02 ?  I             ---      machsta
0000/01 ?  I             ---      machstb
0060/00                  267      oky
0004/--     s            204      rsarg_sect
0000/07 ?  I             ---      scrch
0023/00                  238      sett
007f/00                  288      tenlp
0086/00                  293      tenneg
001b/00                  231      tryag
0049/00                  255      wait

Nuvatec Z80 assembler   Release 1.9          Sun Nov  8 13:46:46 1981

adisp.s

Addr/     Object   File    Ass'y
Section    Code    Line#   Line# + S t a t e m e n t

                             1          list    "off"
0000/00              5     212          section "ROM"
                     6     213
                     7     214          import  adisp_lock
                     8     215          export  adisplay, adisplay_c, adisplay_p, adisplay_cp
                     9     216          export  adisplay_clr, adispch
                    10     217
                    11     218  ;------------------------------------------------------------;
                    12     219  ;
                    13     220  ; Name:         adisplay
                    14     221  ;               adisplay_p       (same, but with explicit display
                    15     222  ;                                 start position passed)
                    16     223  ;
```

```
                      17   224  ; Function:     display (null-terminated) string pointed to by hl
                      18   225  ;               on Alphanumeric display
                      19   226  ;
                      20   227  ; Needs:
                      21   228  ;        hl     -> string to display (null terminated)
                      22   229  ;
                      23   230  ;        [following for "adisplay_p" only]
                      24   231  ;        a      =  start position of string in display
                      25   232  ;
                      26   233  ;        adisp_lock =  0  normally;  1  if display is to be locked from update
                      27   234  ;
                      28   235  ; Returns:
                      29   236  ;
                      30   237  ; Destroys:     af
                      31   238  ;
                      32   239  ; Other Comments:
                      33   240  ;
                      34   241  ;==========================================================================;
                      35   242
0000/00               36   243  adisplay:
0000/00 3E01          37   244          ld      a,1                     ; start display @ position 1 for
                      38   245                                          ;          "adisplay" entry
0002/00               39   246  adisplay_p:
0002/00 E5D5C5        40   247          push    hl,de,bc                ; save regs
                      41   248
0005/00 E5            42   249          push    hl                      ;
0006/00 210000        43   250          ld      hl,adisp_lock           ; is alpha display locked?
0009/00 CB46          44   251          bit     0,(hl)                  ;
000b/00 E1            45   252          pop     hl                      ;
000c/00 2019          46   253          jr      nz,adisp_exit2          ; if so, don't touch display
000e/00 F690          47   254          or      AD_Cwrite               ; write is to start @ position in a
0010/00 4F            48   255          ld      c,a                     ;save in C
0011/00 110030        49   256          ld      de,AD_DATA              ; de -> Alpha display data port
                      50   257
0014/00               51   258  adisp1:
0014/00 7E            52   259          ld      a,(hl)                  ; get next char of string
0015/00 B7            53   260          or      a                       ; if it's '\0', end of string; quit
0016/00 280F          54   261          jr      z,adisp_exit            ;
0018/00 D620          55   262          sub     20h                     ;character offset needed
001a/00 F5            56   263          push    af
001b/00 79            57   264          ld      a,c
001c/00 F3            58   265          di
001d/00 320130        59   266          ld      (AD_CONTROL),a          ;send out control
0020/00 F1            60   267          pop     af                      ;and now the character
0021/00 12            61   268          ld      (de),a                  ; display the char
0022/00 FB            62   269          ei                              ;re-enable
0023/00 23            63   270          inc     hl                      ;set HL to next spot
0024/00 0C            64   271          inc     c                       ;ditto with the control
0025/00 18ED          65   272          jr      adisp1
                      66   273
0027/00               67   274  adisp_exit:
0027/00               68   275  adisp_exit2:
0027/00 C1D1E1        69   276          pop     bc,de,hl                ; restore regs
002a/00 C9            70   277          ret
                      71   278          eject

Nuvatec Z80 assembler   Release 1.9             Sun Nov  8 13:46:46 1981

adisp.s

Addr/    Object  File   Ass'y
Section   Code   Line#  Line# + S t a t e m e n t
-------  ------  -----  ----- - -----------------------------------------------------

                      72   279  ;--------------------------------------------------------------------------;
                      73   280  ;
                      74   281  ; Name:         adisplay_clr    simply clear display
                      75   282  ;               adisplay_c      clear display, then display string
                      76   283  ;               adisplay_cp     (same, but with explicit display
                      77   284  ;                                start position passed)
                      78   285
                      79   286  ; Function:     clear Alphanumeric display, then
                      80   287  ;               display (null-terminated) string pointed to by hl
                      81   288  ;
                      82   289  ; Needs:
                      83   290  ;        hl     -> string to display (null terminated)
```

```
                 84   291   ;
                 85   292   ;        [following for "adisplay_cp" only]
                 86   293   ;        a        =  start position of string in display
                 87   294   ;
                 88   295   ; Returns:
                 89   296   ;
                 90   297   ; Destroys:      af
                 91   298   ;
                 92   299   ; Other Comments:
                 93   300   ;
                 94   301   ;---------------------------------------------------------------------------;
                 95   302
002b/00          96   303   adisplay_clrp:
002b/00 E5       97   304            push     hl                        ;save message address
002c/00 215000   98   305            ld       hl,blank16
002f/00 B7       99   306            or       a                         ; any offset?
0030/00 280D    100   307            jr       z,clrin
0032/00 F5      101   308            push     af                        ; save it
0033/00         102   309   more:
0033/00 23      103   310            inc      hl
0034/00 3D      104   311            dec      a
0035/00 20FC    105   312            jr       nz,more
0037/00 F1      106   313            pop      af
0038/00 1805    107   314            jr       clrin
003a/00         108   315   adisplay_clr:
003a/00 E5      109   316            push     hl                        ; save reg
003b/00 215000  110   317            ld       hl,blank16                ; clear display: 16 blanks
003e/00 AF      111   318            xor      a                         ; start at 0 position
003f/00         112   319   clrin:
003f/00 CD0200  113   320            call     adisplay_p
0042/00 E1      114   321            pop      hl                        ; restore reg
0043/00 C9      115   322            ret
                116   323
0044/00         117   324   adisplay_c:
0044/00 CD3A00  118   325            call     adisplay_clr              ; clear the display
0047/00 18B7    119   326            jr       adisplay                  ; now display string; retn from adisplay
                120   327
0049/00         121   328   adisplay_cp:
0049/00 F5      122   329            push     af                        ; save A
004a/00 CD2B00  123   330            call     adisplay_clrp             ; clear the display
004d/00 F1      124   331            pop      af                        ; restore A
004e/00 18B2    125   332            jr       adisplay_p                ; now display string; retn from adisplay
                126   333
0050/00 20202020 127  334   blank16:          db       [16]' ','\0'     ; null-terminated 16-blank string
        20202020
        20202020
        20202020
        00
                128   335   ;---------------------------------------------------------------------------;
                129   336   ;
                130   337   ; Name:          adispch
                131   338   ;
                132   339   ; Function:      display a single char on Alphanumeric display
                133   340   ;
                134   341   ; Needs:
                135   342   ;        a       =  char to display
                136   343   ;        d       =  start position of string in display
                137   344   ;
                138   345   ; Returns:
                139   346   ;
                140   347   ; Destroys:      af
                141   348   ;

Nuvatec Z80 assembler   Release 1.9          Sun Nov  8 13:46:46 1981

adisp.s

Addr/    Object   File    Ass'y
Section   Code    Line#   Line# + S t a t e m e n t
-------  ------   -----   ----- - ---------------------------------------------------

                142   349   ; Other Comments:
                143   350   ;
                144   351   ;---------------------------------------------------------------------------;
                145   352
0061/00         146   353   adispch:
```

```
0061/00 E5D5      147     354         push    hl,de              ; save regs
0063/00 5F        148     355         ld      e,a                ; e = char to display
0064/00 210130    149     356         ld      hl,AD_CONTROL      ; setup display control to
0067/00 3E90      150     357         ld      a,AD_Cwrite        ;       write the next char at
0069/00 B2        151     358         or      d                  ;       position passed in d
006a/00 F3        152     359         di
006b/00 77        153     360         ld      (hl),a             ;
                  154     361
006c/00 7B        155     362         ld      a,e                ; write the data char to the display
006d/00 D620      156     363         sub     0x20               ;       (offset by 0x20)
006f/00 320030    157     364         ld      (AD_DATA),a        ;
                  158     365
0072/00 FB        159     366         ei
0073/00 D1E1      160     367         pop     de,hl              ; restore regs
0075/00 C9        161     368         ret

No errors in this assembly

Symbol table entries used:       82/ 574
Symbol name characters used:    770/7500

Nuvatec Z80 assembler   Release 1.9            Sun Nov  8 13:46:46 1981

adisp.s
Symbol Table / Cross-Reference Listing

value    type        defined      name of symbol

3001          e          22       AD_CONTROL
00d3          e          34       AD_CclrAll
00e0          e          43       AD_Cendint
0040          e          40       AD_CreadKEY
0090          e          31       AD_Cwrite
3000          e          21       AD_DATA
0003          e          11       BCD_NUMLEN
0010          e          13       CLOCKRATE
0008          e          58       DF_BLINK2
0020          e          57       DF_ERRBLINK
0000          e          55       DF_STEADY
0008          e          56       DS_BRKBLINK
0080          e          52       DS_ON
0005/--                 184       H_acc16
0002/--                 182       H_acc4
0008/--                 186       H_acc64
000b/--                 189       H_bbufp
000c/--                 191       H_buf
0000/--                 173       H_cflags
0004/--                 183       H_cnt16
0001/--                 181       H_cnt4
0007/--                 185       H_cnt64
000a/--                 188       H_fbufp
0015/--                 193       H_hitclk
0016/--                 194       H_hitclksv
0014/--                 192       H_static
0018/--                 196       H_trcnt
0017/--                 195       H_trend
0008          e          66       KEY_BS
000a          e          65       KEY_ENTER
000d          e          67       KEY_NEXT
000b/--                 131       M_bcnt
0024/--                 159       M_dfreq
000e/--                 133       M_dptr
0023/--                 157       M_dstatus
0001/--                 121       M_errflags
0025/--                 163       M_fcdis
0000/--                 102       M_flags
002d/--                 164       M_hitclk
0008/--                 130       M_setbcnt
0002/--                 128       M_settcnt
0005/--                 129       M_tcnt
0020/--                 154       M_tcount
0010/--                 137       M_tol1
0018/--                 145       M_tol16
0014/--                 141       M_tol4
001c/--                 149       M_tol64
0022/--                 155       M_tolfac
```

```
0010/--                136      M_tols
3801          *         25      ND_CONTROL
00d8          *         35      ND_CclrAll
00c2          *         38      ND_CclrF
00e0          *         44      ND_Cendint
0040          *         41      ND_CreadHIT
0090          *         32      ND_Cwrite
3800          *         24      ND_DATA
0006          *         10      NUMLEN
0002          *          8      N_HITS
0004          *          7      N_MACHINES
0003/--                208      RS_fw
0002/--                207      RS_maxfw
0001/--                206      RS_pos
0000/--                205      RS_startpos
00ff          *         15      WATCHDOG
0076/00      s         212      adisp.s
0014/00                258      adispl
0027/00                274      adisp_exit
0027/00                275      adisp_exit2
0000/01  ?  I          ---      adisp_lock
0061/00     E          353      adispch
0000/00     E          243      adisplay
0044/00     E          324      adisplay_c
003a/00     E          315      adisplay_clr
002b/00                303      adisplay_clrp
0049/00     E          328      adisplay_cp

Nuvatec Z80 assembler   Release 1.9          Sun Nov  8 13:46:46 1981

adisp.s
Symbol Table / Cross-Reference Listing

value    type      defined       name of symbol

0002/00   E          246         adisplay_p
0050/00              334         blank16
003f/00              319         clrin
0080/--      s       171         hit_sect
0040/--      s        99         mach_sect
0033/00              309         more
0004/--      s       204         rsarg_sect

Nuvatec Z80 assembler   Release 1.9          Sun Nov  8 13:47:19 1981

asc_bcd.s

Addr/     Object   File    Ass'y
Section   Code     Line#   Line# + S t a t e m e n t
-------   ------   -----   -----  -
0000/00                      1          section "ROM"
                             2     ;section C
                             3     ;
                             4     ;ASC_BCD: convert number from ascii to BCD
                             5     ;
                             6     ;-----------------------------------------------------
                             7     ;Needs:  HL - pointing to address to store BCD
                             8     ;        DE - pointing to address of ascii string
                             9     ;        B  - ascii digit count
                            10     ;        C  - BCD byte count
                            11     ;
                            12     ;Returns and destroys: yep
                            13     ;-----------------------------------------------------
                            14     ;
                            15     ; Assumes an even # of ascii digits (even count passed in B)
                            16     ;
                            17     ;-----------------------------------------------------
                            18             entry   asc_bcd
                            19     ;
0000/00                     20     asc_bcd:
0000/00  79                 21             ld      a,c           ;get count of BCD bytes into A
0001/00  C5                 22             push    bc            ;save ascii count
0002/00  04                 23             inc     b             ;make B positive number
0003/00  CB80               24             res     0,b
```

```
0005/00 CB27          25            sla     a               ;double BCD count (2 digits per nibble)
0007/00               26    chkag:
0007/00 B8            27            cp      b
0008/00 2807          28            jr      z,okay          ;if same then gone on with conversion
000a/00 3D            29            dec     a               ;subtract 2
000b/00 3D            30            dec     a
000c/00 3600          31            ld      (hl),0          ;load 00h in location set HL forward
000e/00 23            32            inc     hl
000f/00 18F6          33            jr      chkag
0011/00               34    okay:
0011/00 C1            35            pop     bc              ;get back counts
0012/00 4F            36            ld      c,a             ;load adjusted count into C
0013/00 AF            37            xor     a               ;clear accumulator
                      38
0014/00               39    fixload:
0014/00 CB40          40            bit     0,b
0016/00 200B          41            jr      nz,nohigh
0018/00               42    high:
0018/00 1A            43            ld      a,(de)          ;get ascii
0019/00 CB27          44            sla     a               ;shift up by 4
001b/00 CB27          45            sla     a
001d/00 CB27          46            sla     a
001f/00 CB27          47            sla     a
0021/00 1809          48            jr      nextdigit       ; to next ascii digit
0023/00               49    nohigh:
0023/00 E5            50            push    hl              ; save regs
0024/00 6F            51            ld      l,a             ;save high nibble in L
0025/00 1A            52            ld      a,(de)          ;get ascii of low
0026/00 E60F          53            and     0fh
0028/00 B5            54            or      l
0029/00 E1            55            pop     hl              ; restore regs
002a/00 77            56            ld      (hl),a          ;store it away
002b/00 23            57            inc     hl
002c/00               58    nextdigit:
002c/00 13            59            inc     de
002d/00 05            60            dec     b               ; set to next ascii
002e/00 0D            61            dec     c               ;any more?
002f/00 20E3          62            jr      nz,fixload
0031/00 C9            63            ret
                      64    ;
                      65    ;*******
0032/00               66            end

No errors in this assembly

Symbol table entries used:        8/ 574
Symbol name characters used:     63/7500

Nuvatec Z80 assembler    Release 1.9          Sun Nov  8 13:47:19 1981

asc_bcd.s
Symbol Table / Cross-Reference Listing

value     type        defined      name of symbol

0000/00    E            20         asc_bcd
0032/00      s           1         asc_bcd.s
0007/00                 26         chkag
0014/00                 39         fixload
0018/00                 42         high
002c/00                 58         nextdigit
0023/00                 49         nohigh
0011/00                 34         okay

Nuvatec Z80 assembler    Release 1.9          Sun Nov  8 13:47:38 1981

bcd.s

Addr/     Object   File    Ass'y
Section   Code     Line#   Line# + S t a t e m e n t

                            1           list     "off"
0000/00             5     212           section  "ROM"
                    6     213   ;----------------------------------------------;
```

```
               7   214  ;
               8   215  ; Name:          bcd_incr
               9   216  ;                (bcd3_incr is entry point for fixed-length 3-byte BCD string)
              10   217  ;
              11   218  ; Function:      increments BCD string  pointed to by hl
              12   219  ;
              13   220  ; Needs:
              14   221  ;       hl       -> BCD string (MSByte first)
              15   222  ;       b        =  length of string (bytes)
              16   223  ;
              17   224  ; Returns:
              18   225  ;
              19   226  ; Destroys:      af,  b
              20   227  ;
              21   228  ; Other Comments:
              22   229  ;
              23   230  ;---------------------------------------------------------------------;
              24   231            export  bcd3_incr
              25   232            export  bcd_incr
              26   233
0000/00       27   234  bcd3_incr:
0000/00       28   235            ASSUME  BCD_NUMLEN == 3
0000/00 0603  29   240            ld      b,3                  ; entry point for 3-byte BCD incr
              30   241
0002/00       31   242  bcd_incr:
0002/00 E5D5  32   243            push    hl,de                ; save regs
0004/00 1600  33   244            ld      d,0                  ; hl = hl + b
0006/00 58    34   245            ld      e,b                  ;       ( i.e. hl -> 1 byte past LSB)
0007/00 19    35   246            add     hl,de                ;
              36   247
0008/00       37   248  bcd_i1:
0008/00 2B    38   249            dec     hl                   ; point to next 2 BCD digits
0009/00 7E    39   250            ld      a,(hl)               ; a = next byte
000a/00 C601  40   251            add     a,1                  ; increment it (can't use "inc" instr here)
000c/00 27    41   252            daa                          ; adjust for BCD increment
000d/00 77    42   253            ld      (hl),a               ; store updated BCD digits
000e/00 3002  43   254            jr      nc,bcd_iexit         ; if no carry, done; so quit
0010/00 10F6  44   255            djnz    bcd_i1               ; continue if string not thru
              45   256
0012/00       46   257  bcd_iexit:
0012/00 D1E1  47   258            pop     de,hl                ; restore regs
0014/00 C9    48   259            ret
              49   260            eject

Nuvatec Z80 assembler   Release 1.9          Sun Nov  8 13:47:38 1981

bcd.s

Addr/     Object  File   Ass'y
Section   Code    Line#  Line# + S t a t e m e n t
_______   _____   _____  _____ _ _____________________________________________________

              50   261  ;---------------------------------------------------------------------;
              51   262  ;
              52   263  ; Name:          bcd_decr
              53   264  ;                (bcd3_decr is entry point for fixed-length 3-byte BCD string)
              54   265  ;
              55   266  ; Function:      decrements BCD string  pointed to by hl
              56   267  ;
              57   268  ; Needs:
              58   269  ;       hl       -> BCD string (MSByte first)
              59   270  ;       b        =  length of string (bytes)
              60   271  ;
              61   272  ; Returns:
              62   273  ;
              63   274  ; Destroys:      af,  b
              64   275  ;
              65   276  ; Other Comments:
              66   277  ;
              67   278  ;---------------------------------------------------------------------;
              68   279            export  bcd3_decr
              69   280            export  bcd_decr
              70   281
0015/00       71   282  bcd3_decr:
0015/00       72   283            ASSUME  BCD_NUMLEN == 3
0015/00 0603  73   288            ld      b,3                  ; entry point for 3-byte BCD decr
```

```
                         74      289
0017/00                  75      290   bcd_decr:
0017/00 E5D5             76      291            push    hl,de              ; save regs
0019/00 1600             77      292            ld      d,0                ; hl = hl + b
001b/00 58               78      293            ld      e,b                ;       ( i.e. hl -> 1 byte past LSB)
001c/00 19               79      294            add     hl,de              ;
                         80      295
001d/00                  81      296   bcd_d1:
001d/00 2B               82      297            dec     hl                 ; point to next 2 BCD digits
001e/00 7E               83      298            ld      a,(hl)             ; a = next byte
001f/00 D601             84      299            sub     1                  ; decrement it (can't use "dec" here)
0021/00 27               85      300            daa                        ; adjust for BCD decrement
0022/00 77               86      301            ld      (hl),a             ; store updated BCD digits
0023/00 3002             87      302            jr      nc,bcd_dexit       ; if no carry(borrow), done; so quit
0025/00 10F6             88      303            djnz    bcd_d1             ; continue if string not thru
                         89      304
0027/00                  90      305   bcd_dexit:
0027/00 D1E1             91      306            pop     de,hl              ; restore regs
0029/00 C9               92      307            ret

No errors in this assembly

Symbol table entries used:     76/ 574
Symbol name characters used:   702/7500

Nuvatec Z80 assembler   Release 1.9             Sun Nov  8 13:47:38 1981

bcd.s
Symbol Table / Cross-Reference Listing

value    type      defined       name of symbol

3001       e          22         AD_CONTROL
00d3       e          34         AD_CclrAll
00e0       e          43         AD_Cendint
0040       e          40         AD_CreadKEY
0090       e          31         AD_Cwrite
3000       e          21         AD_DATA
0003       e          11         BCD_NUMLEN
0010       e          13         CLOCKRATE
0008       e          58         DF_BLINK2
0020       e          57         DF_ERRBLINK
0000       e          55         DF_STEADY
0008       e          56         DS_BRKBLINK
0080       e          52         DS_ON
0005/--              184         H_acc16
0002/--              182         H_acc4
0008/--              186         H_acc64
000b/--              189         H_bbufp
000c/--              191         H_buf
0000/--              173         H_cflags
0004/--              183         H_cnt16
0001/--              181         H_cnt4
0007/--              185         H_cnt64
000a/--              188         H_fbufp
0015/--              193         H_hitclk
0016/--              194         H_hitclksv
0014/--              192         H_static
0018/--              196         H_trcnt
0017/--              195         H_trend
0008       e          66         KEY_BS
000a       e          65         KEY_ENTER
000d       e          67         KEY_NEXT
000b/--              131         M_bcnt
0024/--              159         M_dfreq
000e/--              133         M_dptr
0023/--              157         M_dstatus
0001/--              121         M_errflags
0025/--              163         M_fcdis
0000/--              102         M_flags
002d/--              164         M_hitclk
0008/--              130         M_setbcnt
0002/--              128         M_settcnt
0005/--              129         M_tcnt
0020/--              154         M_tcount
0010/--              137         M_toll
```

```
0018/--                    145       M_tol16
0014/--                    141       M_tol4
001c/--                    149       M_tol64
0022/--                    155       M_tolfac
0010/--                    136       M_tols
3801          e             25       ND_CONTROL
00df          e             35       ND_CclrAll
00c2          e             38       ND_CclrF
00e0          e             44       ND_Cendint
0040          e             41       ND_CreadHIT
0090          e             32       ND_Cwrite
3800          e             24       ND_DATA
0006          e             10       NUMLEN
0002          e              8       N_HITS
0004          e              7       N_MACHINES
0003/--                    208       RS_fw
0002/--                    207       RS_maxfw
0001/--                    206       RS_pos
0000/--                    205       RS_startpos
00ff          e             15       WATCHDOG
002a/00       s            212       bcd.s
0015/00     E              282       bcd3_decr
0000/00     E              234       bcd3_incr
001d/00                    296       bcd_d1
0017/00     E              290       bcd_decr
0027/00                    305       bcd_dexit
0008/00                    248       bcd_i1
0012/00                    257       bcd_iexit
0002/00     E              242       bcd_incr
0080/--       s            171       hit_sect
0040/--       s             99       mach_sect

Nuvatec Z80 assembler   Release 1.9         Sun Nov  8 13:47:38 1981

bcd.s
Symbol Table / Cross-Reference Listing

value    type       defined       name of symbol
------------------------------------------------------------------------
0004/--     s        204          rsarg_sect

Nuvatec Z80 assembler   Release 1.9         Sun Nov  8 13:48:08 1981

bcd_asc.s

Addr/     Object   File    Ass'y
Section   Code     Line#   Line# + S t a t e m e n t
-------   ------   -----   -----   -----------------------------------------
0000/00                      1           section "ROM"
                             2    ;section C
                             3    ;
                             4    ;BCD_ASC: converts string as BCD to ascii string
                             5    ;
                             6    ;-----------------------------------------------
                             7    ;external referances: none
                             8    ;-----------------------------------------------
                             9    ;needs: HL pointing to area to store ascii string
                            10    ;       DE pointing to BCD number start
                            11    ;       B  count of bytes in BCD string
                            12    ;
                            13    ;returns or destroys: count on it
                            14    ;
                            15           entry    bcd_asc
                            16    ;
0000/00                     17    bcd_asc:
0000/00   0E00              18           ld       c,0        ;flag for non-leading zeroes
0002/00                     19    balop:
0002/00   1A                20           ld       a,(de)
0003/00   F5                21           push     af         ;save for low byte conversion
0004/00   CB2F              22           sra      a          ;shift high byte down
0006/00   CB2F              23           sra      a
0008/00   CB2F              24           sra      a
000a/00   CB2F              25           sra      a
000c/00   CD1D00            26           call     conv       ;do ascii conversion and load
```

```
0000f/00 F1              27          pop     af              ;get back for low byte
0010/00 CD1D00           28          call    conv
0013/00 13               29          inc     de
0014/00 10EC             30          djnz    balop
0016/00 CB41             31          bit     0,c             ;was there any number
0018/00 C0               32          ret     nz              ;if so then return now
0019/00 AF               33          xor     a               ;at least one "0" at the end
001a/00 CBC1             34          set     0,c
001c/00 2B               35          dec     hl
                         36    ;fall into conversion, return to calling routine
                         37    ;
                         38    ;conv: takes number in A and converts to ascii digit
                         39    ;      if number is 0 and C is unflagged, space character will be loaded
001d/00                  40    conv:
001d/00 E60F             41          and     0fh             ;get rid of upper nibble
001f/00 2008             42          jr      nz,nonzero      ;if non-zero carry on with conversion
0021/00 CB41             43          bit     0,c             ;leading 0?
0023/00 2004             44          jr      nz,nonzero      ;if so carry on
0025/00 3E20             45          ld      a," "           ;load as a space
0027/00 1804             46          jr      into            ;go to load part
0029/00                  47    nonzero:
0029/00 F630             48          or      30h
002b/00 CBC1             49          set     0,c             ;change to ascci number and indicate number
002d/00                  50    into:
002d/00 77               51          ld      (hl),a          ;put it where it counts
002e/00 23               52          inc     hl              ;set HL to next spot
002f/00 C9               53          ret
                         54    ;
                         55    ;*********
0030/00                  56          end

No errors in this assembly

Symbol table entries used:      6/ 574
Symbol name characters used:   46/7500

Nuvatec Z80 assembler   Release 1.9          Sun Nov  8 13:48:08 1981

bcd_asc.s
Symbol Table / Cross-Reference Listing

value    type       defined       name of symbol
-------  ----       -------       --------------
0002/00               19          balop
0000/00   E           17          bcd_asc
0030/00    s           1          bcd_asc.s
001d/00               40          conv
002d/00               50          into
0029/00               47          nonzero

Nuvatec Z80 assembler   Release 1.9          Sun Nov  8 13:50:58 1981

inmachine.s

Addr/     Object   File   Ass'y
Section   Code     Line#  Line# + S t a t e m e n t
-------   ------   -----  -----   -------------------
                            1           list    "off"
0000/00              5    212           section "ROM"
                     6    213     ;section C
                     7    214     ;
                     8    215     ;INMACHINE: get machine number
                     9    216     ;
                    10    217     ;Needs: nothing
                    11    218     ;destroys: All Z80 regs
                    12    219     ;returns: machine number in 1st byte of scratch conversation ram
                    13    220     ;
                    14    221           entry   inmachine
                    15    222           extrn   machnum,adisplay_clr,adisplay_c,adispch,rtaddr1,keyred
                    16    223     ;
0000/00             17    224     inmachine:
0000/00 E1          18    225           pop     hl              ;save return address
0001/00 220000      19    226           ld      (rtaddr1),hl
```

```
0004/00              20   227  getit:
0004/00 AF           21   228          xor   a                   ;clear number spot
0005/00 320000       22   229          ld    (machnum),a
0008/00 214300       23   230          ld    hl,prmt             ;display "MACHINE?" on alpha display
000b/00 CD0000       24   231          call  adisplay_c
000e/00              25   232  waitit:
000e/00 CD0000       26   233          call  keyred              ;go get a key
0011/00 FE0A         27   234          cp    KEY_ENTER           ;ENTER key?
0013/00 281A         28   235          jr    z,entgot
0015/00 FE31         29   236          cp    "1"                 ;1-4 only other input
0017/00 280C         30   237          jr    z,keydis
0019/00 FE32         31   238          cp    "2"
001b/00 2808         32   239          jr    z,keydis
001d/00 FE33         33   240          cp    "3"
001f/00 2804         34   241          jr    z,keydis
0021/00 FE34         35   242          cp    "4"
0023/00 20E9         36   243          jr    nz,waitit           ;nope, go look again
0025/00              37   244  keydis:
0025/00 320000       38   245          ld    (machnum),a         ;save key here
0028/00 160A         39   246          ld    d,10                ;put up on display
002a/00 CD0000       40   247          call  adispch
002d/00 18DF         41   248          jr    waitit
002f/00              42   249  entgot:
002f/00 3A0000       43   250          ld    a,(machnum)
0032/00 B7           44   251          or    a                   ;any input?
0033/00 28CE         45   252          jr    z,getit
0035/00 F5           46   253          push  af                  ;save on stack
0036/00 CD0000       47   254          call  adisplay_clr        ;clear display
0039/00 F1           48   255          pop   af                  ;get back machine number
003a/00 1600         49   256          ld    d,0                 ;put in position 0
003c/00 CD0000       50   257          call  adispch
003f/00 2A0000       51   258          ld    hl,(rtaddr1)        ;get back return address
0042/00 E9           52   259          jp    (hl)
                     53   260  ;
0043/00 4D414348     54   261  prmt:   db    'MACHINE?',0
        494E453F
        00

                     55   262  ;********
004c/00              56   263          end

No errors in this assembly

Symbol table entries used:      80/ 574
Symbol name characters used:   733/7500

Nuvatec Z80 assembler   Release 1.9          Sun Nov  8 13:50:58 1981

inmachine.s
Symbol Table / Cross-Reference Listing

value     type        defined     name of symbol

3001         e          22        AD_CONTROL
00d3         e          34        AD_CclrAll
00e0         e          43        AD_Cendint
0040         e          40        AD_CreadKEY
0090         e          31        AD_Cwrite
3000         e          21        AD_DATA
0003         e          11        BCD_NUMLEN
0010         e          13        CLOCKRATE
0008         e          58        DF_BLINK2
0020         e          57        DF_ERRBLINK
0000         e          55        DF_STEADY
0008         e          56        DS_BRKBLINK
0080         e          52        DS_ON
0005/--                184        H_acc16
0002/--                182        H_acc4
0008/--                186        H_acc64
000b/--                189        H_bbufp
000c/--                191        H_buf
0000/--                173        H_cflags
0004/--                183        H_cnt16
0001/--                181        H_cnt4
0007/--                185        H_cnt64
000a/--                188        H_fbufp
0015/--                193        H_hitclk
```

```
0016/--                194       H_hitclksv
0014/--                192       H_static
0018/--                196       H_trcnt
0017/==                195       H_trend
0008          e         66       KEY_BS
000a          e         65       KEY_ENTER
000d          e         67       KEY_NEXT
0007/--                131       M_bcnt
0024/--                159       M_dfreq
000e/--                133       M_dptr
0023/--                157       M_dstatus
0001/==                121       M_errflags
0025/--                163       M_fcdis
0000/--                102       M_flags
002d/--                164       M_hitclk
0008/--                130       M_setbcnt
0002/--                128       M_settcnt
0005/--                129       M_tcnt
0020/--                154       M_tcount
0010/==                137       M_tol1
0018/--                145       M_tol16
0014/--                141       M_tol4
001c/--                149       M_tol64
0022/--                155       M_tolfac
0010/--                136       M_tols
3801          e         25       ND_CONTROL
00df          e         35       ND_CclrAll
00c2          e         38       ND_CclrF
00e0          e         44       ND_Cendint
0040          e         41       ND_CreadHIT
0090          e         32       ND_Cwrite
3800          e         24       ND_DATA
0006          e         10       NUMLEN
0002          e          8       N_HITS
0004          e          7       N_MACHINES
0003/==                208       RS_fw
0002/--                207       RS_maxfw
0001/--                206       RS_pos
0000/--                205       RS_startpos
00ff          e         15       WATCHDOG
0000/04 ?  I           ---       adispch
0000/03 ?  I           ---       adisplay_c
0000/02 ?  I           ---       adisplay_clr
002f/00                249       entgot
0004/00                227       getit
0080/--       s        171       hit_sect
0000/00    E           224       inmachine
004c/00       s        212       inmachine.s
0025/00                244       keydis
0000/06 ?  I           ---       keyred
0040/--       s         99       mach_sect

Nuvatec Z80 assembler   Release 1.9          Sun Nov  8 13:50:58 1981

inmachine.s
Symbol Table / Cross-Reference Listing

value    type        defined       name of symbol

0000/01 ?  I           ---       machnum
0043/00                261       prmt
0004/--       s        204       rsarg_sect
0000/05 ?  I           ---       rtaddr1
000e/00                232       waitit

Nuvatec Z80 assembler   Release 1.9          Tue Dec  1 10:21:57 1981

readstring.s

Addr/     Object   File    Ass'y
Section    Code    Line#   Line# + S t a t e m e n t

                              1          list     "off"
```

```
0000/00                    section "ROM"

                           export  readstring
                           import  adisplay_p, adispch, keyred2, rs_saveretn

                   ;-----------------------------------------------------------;
                   ;
                   ; Name:           readstring
                   ;
                   ; Function:       reads input keys up to Enter key
                   ;
                   ; Needs:
                   ;       (Note: arguments can be set up via "RSARGS" macro)
                   ;       hl      -> input character buffer
                   ;       iy      -> argument block (usually @ rs_args), filled in
                   ;
                   ; Returns:
                   ;       input buffer     contains null-terminated string of input
                   ;       rs_args+RS_fw    = length (in chars) of null-terminated input in buffer
                   ;
                   ; Destroys:       af,bc,de,hl,iy  (caller beware- must save them yourself)
                   ;
                   ; Other Comments:
                   ;
                   ;-----------------------------------------------------------;

0000/00            readstring:
0000/00 C1                 pop     bc                      ; get return address of caller
0001/00 ED430000           ld      (rs_saveretn),bc        ;       and save it

                   ;;ld            iy,rs_args              ; iy -> argument block

                                                           ; is there initial (default) input
0005/00 AF                 xor     a                       ;       already in buffer ?
0006/00 FDB603             or      (iy+RS_fw)              ;
0009/00 2806               jr      z,rs_1                  ; yes- display it, first
000b/00 FD7E00             ld      a,(iy+RS_startpos)      ;
000e/00 CD0000             call    adisplay_p              ;

                           ;-------------------------------------------------
                           ; For remainder of subroutine, registers are used as follows:
                           ;       b  :  current input field width (# of chars in buf)
                           ;       c  :  maximum input field width (# chars allowed)
                           ;       d  :  current position in display
                           ;                (index of last char written to display)
                           ;       e  :  current input char
                           ;       hl :  pointer to byte in input buffer where next
                           ;                input char should go
                           ;-------------------------------------------------

0011/00            rs_1:
0011/00 FD4603             ld      b,(iy+RS_fw)            ; b = current field width
0014/00 FD4E02             ld      c,(iy+RS_maxfw)         ; c = maximum field width

                                                           ; hl -> next avail. char in buffer
0017/00 58                 ld      e,b                     ;       (de used as temp. here)
0018/00 1600               ld      d,0                     ;
001a/00 19                 add     hl,de                   ;

001b/00 FD5601             ld      d,(iy+RS_pos)           ; d = current position in display

001e/00            rs_loop:

                                                           ; put up cursor, if OK
                   ;rs_cursor:                             ; current field width < max f.w. ?
001e/00 78                 ld      a,b                     ;
001f/00 B9                 cp      c                       ;       (a = cursor char, for adispch)
0020/00 3E5F               ld      a,'_'                   ; if so, then put out cursor
0022/00 DC0000             call    c,adispch

                                                           ; read next input key (top of loop)
                   ;rs_nextkey:                            ; read a key; key retruned in A
0025/00 CD0000             call    keyred2

0028/00 FE0D               cp      KEY_NEXT
002a/00 28F2               jr      z,rs_loop
002c/00 FE0A               cp      KEY_ENTER               ; is it the awaited Enter key?
002e/00 2824               jr      z,rs_gotenter           ; if so, quit reading

Nuvatec Z80 assembler   Release 1.9            Tue Dec  1 10:21:57 1981

readstring.s
```

```
Addr/     Object  File   Ass'y
Section    Code   Line#  Line# + S t a t e m e n t

                    78    285
0030/00 FE08        79    286          cp      KEY_BS                 ; is it a BackSpace key?
0032/00 200E        80    287          jr      nz,rs_regchar          ; if not, it's a regular input char
                    81    288
                    82    289  ;rs_backspace:
0034/00 AF          83    290          xor     a                      ; already BackSpaced to beginning?
0035/00 B8          84    291          cp      b
0036/00 28E6        85    292          jr      z,rs_loop              ; if so, don't BS again
0038/00 3E20        86    293          ld      a,' '                  ; display blank over current cursor
003a/00 CD0000      87    294          call    adispch                ;      before backspacing
003d/00 05          88    295          dec     b                      ; decr field width
003e/00 15          89    296          dec     d                      ; decr display position
003f/00 2B          90    297          dec     hl                     ; decr input buffer ptr
0040/00 18DC        91    298          jr      rs_loop                ; re-loop, and display cursor now
                    92    299
0042/00             93    300  rs_regchar:                            ; have regular input char here
0042/00 5F          94    301          ld      e,a                    ; e = input char
0043/00 78          95    302          ld      a,b                    ; any more space in field for input ?
0044/00 B9          96    303          cp      c                      ;
0045/00 2003        97    304          jr      nz,rs_addchar          ;      if so, add it to end of buffer
                    98    305  ;rs_overchar:                           ;      if not, "overstrike" last char
0047/00 05          99    306          dec     b                      ;
0048/00 15         100    307          dec     d                      ;
0049/00 2B         101    308          dec     hl                     ;
004a/00            102    309  rs_addchar:                            ; add char to current end of buffer
004a/00 7B         103    310          ld      a,e                    ; (character back into A)
004b/00 CD0000     104    311          call    adispch                ; display the input char
004e/00 73         105    312          ld      (hl),e                 ; store character into buffer
004f/00 04         106    313          inc     b                      ; incr field width
0050/00 14         107    314          inc     d                      ; incr display position
0051/00 23         108    315          inc     hl                     ; incr input buffer ptr
                   109    316
                   110    317
0052/00 18CA       111    318          jr      rs_loop                ; loop back, to read next key
                   112    319
                   113    320
0054/00            114    321  rs_gotenter:                           ; go Enter key, so all done
0054/00 FD7003     115    322          ld      (iy+RS_fw),b           ; store final input field width
                   116    323          ;;ld     (iy+RS_pos),d          ; ? store final current display position
                   117    324
0057/00 78         118    325          ld      a,b                    ; current field width < max f.w. ?
0058/00 B9         119    326          cp      c                      ;
0059/00 3801       120    327          jr      c,rs_nullterm          ; if so, then hl points just past end
                   121    328                                         ;      of input string
005b/00 23         122    329          inc     hl                     ; if not, points at last input char;
                   123    330                                         ;      incr it before null-terminating
005c/00            124    331  rs_nullterm:
005c/00 3600       125    332          ld      (hl),'\0'              ; null-terminate the input string
                   126    333
                   127    334  ;rs_exit:
005e/00 2A0000     128    335          ld      hl,(rs_saveretn)       ; restore return address of caller
0061/00 E9         129    336          jp      (hl)                   ; return to caller

No errors in this assembly

Symbol table entries used:     79/ 574
Symbol name characters used:  746/7500

Nuvatec Z80 assembler   Release 1.9          Tue Dec  1 10:21.57 1981

readstring.s
Symbol Table / Cross-Reference Listing

value    type       defined      name of symbol

3001       e          22         AD_CONTROL
00d3       e          34         AD_CclrAll
00e0       e          43         AD_Cendint
0040       e          40         AD_CreadKEY
0090       e          31         AD_Cwrite
```

```
3000        e      21     AD_DATA
0003        e      11     BCD_NUMLEN
0010        e      13     CLOCKRATE
0008        e      58     DF_BLINK2
0020        e      57     DF_ERRBLINK
0000        e      55     DF_STEADY
0008        e      56     DS_BRKBLINK
0080        e      52     DS_ON
0005/--           184     H_acc16
0002/--           182     H_acc4
0008/--           186     H_acc64
000b/--           189     H_bbufp
000c/--           191     H_buf
0000/--           173     H_cflags
0004/--           183     H_cnt16
0001/--           181     H_cnt4
0007/--           185     H_cnt64
000a/--           188     H_fbufp
0015/--           193     H_hitclk
0016/--           194     H_hitclksv
0014/--           192     H_static
0018/--           196     H_trcnt
0017/--           195     H_trend
0008        e      66     KEY_BS
000a        e      65     KEY_ENTER
000d        e      67     KEY_NEXT
0006/--           131     M_bcnt
0024/--           159     M_dfreq
000e/--           133     M_dptr
0023/--           157     M_dstatus
0001/--           121     M_errflags
0025/--           163     M_fcdis
0000/--           102     M_flags
002d/--           164     M_hitclk
0008/--           130     M_setbcnt
0002/--           128     M_settcnt
0005/--           129     M_tcnt
0020/--           154     M_tcount
0010/--           137     M_tol1
0018/--           145     M_tol16
0014/--           141     M_tol4
001c/--           149     M_tol64
0022/--           155     M_tolfac
0010/--           136     M_tols
3801        e      25     ND_CONTROL
00df        e      35     ND_CclrAll
00c2        e      38     ND_CclrF
00e0        e      44     ND_Cendint
0040        e      41     ND_CreadHIT
0090        e      32     ND_Cwrite
3800        e      24     ND_DATA
0006        e      10     NUMLEN
0002        e       8     N_HITS
0004        e       7     N_MACHINES
0003/--           208     RS_fw
0002/--           207     RS_maxfw
0001/--           206     RS_pos
0000/--           205     RS_startpos
00ff        e      15     WATCHDOG
0000/02 ?  I      ---     adispch
0000/01 ?  I      ---     adisplay_p
0080/--     s     171     hit_sect
0000/03 ?  I      ---     keyred2
0040/--     s      99     mach_sect
0000/00    E      238     readstring
0062/00     s     212     readstring.s
0011/00           260     rs_1
004a/00           309     rs_addchar
0054/00           321     rs_gotenter
001e/00           270     rs_loop

Nuvatec Z80 assembler   Release 1.9          Tue Dec  1 10:21:57 1981

readstring.s
Symbol Table / Cross-Reference Listing

value   type      defined      name of symbol
```

```
 005c/00                     331        rs_nullterm
 0042/00                     300        rs_regchar
 0000/04 ? I                 ---        rs_saveretn
 0004/--     s               204        rsarg_sect

Nuvatec Z80 assembler   Release 1.92           Tue Dec 29 11:08:26 1981

ints2.s

Addr/      Object   File    Ass'y
Section    Code     Line#   Line# + S t a t e m e n t
-------    ------   -----   ------   -----------------

                              1           list    "off"
                     5      212     ;=================================================================;
                     6      213     ;
                     7      214     ;  Name:          ints
                     8      215     ;
                     9      216     ;  Function:      sets up and fields interrupts
                    10      217     ;
                    11      218     ;  Needs:
                    12      219     ;
                    13      220     ;  Returns:
                    14      221     ;
                    15      222     ;  Destroys:      nothing - interrupt routine must save & restore everything
                    16      223     ;
                    17      224     ;  Other Comments:
                    18      225     ;
                    19      226     ;-----------------------------------------------------------------;
                    20      227
                    21      228           import  machsta, clocktick, kbbuff, fptr, machstb
                    22      229           export  hitint, keyint, bufstf
                    23      230      ;----------------------------------------------------------------
                    24      231      ;HITINT: service for hit interupts
                    25      232      ;
                    26      233      ; at this time, hit force interupts are not defined so this section of
                    27      234      ;       code only serves to take care of a spurious interupt condition
                    28      235      ;
                    29      236
0000/00             30      237     hitint:
0000/00 F3          31      238           di                                  ;disable interupts
0001/00 F5          32      239           push    af                          ;save from destruction
0002/00 E5          33      240           push    hl
0003/00 D5          34      241           push    de
0004/00 C5          35      242           push    bc
0005/00 FDE5        36      243           push    iy
0007/00 DDE5        37      244           push    ix
0009/00             38      245     tryag:
0009/00 DB08        39      246           in      a,(08h)                     ;read the port for indications
000b/00 4F          40      247           ld      c,a                         ;save them here
000c/00 CB41        41      248           bit     0,c                         ;machine 1 hit?
000e/00 285C        42      249           jr      z,noti                      ;not 1
0010/00 3E00        43      250           ld      a,00h                       ;address for AD conv.
0012/00 210000      44      251           ld      hl,machsta+(40h*0)          ;set up for testing
0015/00 DD212500    45      252           ld      ix,machsta+(40h*0)+M_fcdis        ;force display buffer
0019/00 FD211000    46      253           ld      iy,machsta+(40*0)+M_toli          ;single hit tolerances
001d/00 110A00      47      254           ld      de,128*0+machstb+H_fbufp                ;buffer storage
0020/00 CB61        48      255           bit     4,c                         ;hit 2?
0022/00 203A        49      256           jr      nz,wsi1                     ;1 on branch
0024/00 CB56        50      257           bit     2,(hl)                      ;timing set?
0026/00 2025        51      258           jr      nz,wep1
0028/00 DD7E09      52      259           ld      a,(ix+9)                    ;first try
002b/00 FEFF        53      260           cp      0ffh
002d/00 200A        54      261           jr      nz,nfr1
002f/00 DD360900    55      262           ld      (ix+9),0
0033/00 DD360800    56      263           ld      (ix+8),0                    ;set to zero
0037/00 181A        57      264           jr      itt1
0039/00             58      265     nfr1:
0039/00 3EFF        59      266           ld      a,0ffh                      ;derive start of count
003b/00 DD9608      60      267           sub     (ix+8)                      ;get what timing has been done
003e/00 2806        61      268           jr      z,zer1
0040/00 3D          62      269           dec     a
0041/00 2803        63      270           jr      z,zer1
0043/00 3D          64      271           dec     a
```

```
0044/00 2002       65    272             jr     nz,ckr1
0046/00            66    273    zer1:
0046/00 3E01       67    274             ld     a,1
0048/00            68    275    ckr1:
0048/00 CBD6       69    276             set    2,(hl)                      ;indicate timing set
004a/00 DD7709     70    277             ld     (ix+9),a                    ;load setting
004d/00            71    278    yep1:
004d/00 DD7E09     72    279             ld     a,(ix+9)                    ;reset timer
0050/00 DD7708     73    280             ld     (ix+8),a
0053/00            74    281    itt1:
0053/00 3E01       75    282             ld     a,01h                       ;hit 2 address
0055/00 FD23       76    283             inc    iy                          ;set IY for hit 2 thresholds
0057/00 FD23       77    284             inc    iy

Nuvatec Z80 assembler    Release 1.92           Tue Dec 29 11:08:26 1981

ints2.s


Addr/    Object   File    Ass'y
Section   Code    Line#   Line# + S t a t e m e n t
_______  _______  _____   _____ _


0059/00 DD23       78    285             inc    ix
005b/00 118A00     79    286             ld     de,128*1+machstb+H_fbufp            ;buffer storage
005e/00            80    287    ws11:
005e/00 F5         81    288             push   af                          ;save AD reference
005f/00 3E10       82    289             ld     a,10h                       ;reset interupt
0061/00 D309       83    290             out    (09h),a
0063/00 AF         84    291             xor    a
0064/00 D309       85    292             out    (09h),a
0066/00 F1         86    293             pop    af
0067/00 CD9101     87    294             call   anal                        ;analyse
006a/00 189D       88    295             jr     tryag                       ;go re read the port
006c/00            89    296    not1:
006c/00 CB49       90    297             bit    1,c                         ;machine 1 hit?
006e/00 285A       91    298             jr     z,not2                      ;not 1
0070/00 3E02       92    299             ld     a,02h
0072/00 214000     93    300             ld     hl,machsta+(40h*1)          ;set up for testing
0075/00 DD216500   94    301             ld     ix,machsta+(40h*1)+M_fcdis      ;force display buffer
0079/00 E5         95    302             push   hl
007a/00 FDE1       96    303             pop    iy
007c/00 110A01     97    304             ld     de,128*2+machstb+H_fbufp            ;buffer storage
007f/00 CB69       98    305             bit    5,c                         ;hit 2?
0081/00 203A       99    306             jr     nz,ws12                     ;1 on branch
0083/00 CB56      100    307             bit    2,(hl)                      ;timing set?
0085/00 2025      101    308             jr     nz,yep2
0087/00 DD7E09    102    309             ld     a,(ix+9)                    ;first try
008a/00 FEFF      103    310             cp     0ffh
008c/00 200A      104    311             jr     nz,nfr2
008e/00 DD360900  105    312             ld     (ix+9),0
0092/00 DD360800  106    313             ld     (ix+8),0                    ;set to zero
0096/00 181A      107    314             jr     itt2
0098/00           108    315    nfr2:
0098/00 3EFF      109    316             ld     a,0ffh                      ;derive start of count
009a/00 DD9608    110    317             sub    (ix+8)                      ;get what timing has been done
009d/00 2806      111    318             jr     z,zer2
009f/00 3D        112    319             dec    a
00a0/00 2803      113    320             jr     z,zer2
00a2/00 3D        114    321             dec    a
00a3/00 2002      115    322             jr     nz,ckr2
00a5/00           116    323    zer2:
00a5/00 3E01      117    324             ld     a,1
00a7/00           118    325    ckr2:
00a7/00 CBD6      119    326             set    2,(hl)                      ;indicate timing set
00a9/00 DD7709    120    327             ld     (ix+9),a                    ;load setting
00ac/00           121    328    yep2:
00ac/00 DD7E09    122    329             ld     a,(ix+9)                    ;reset timer
00af/00 DD7708    123    330             ld     (ix+8),a
00b2/00           124    331    itt2:
00b2/00 3E03      125    332             ld     a,03h
00b4/00 FD23      126    333             inc    iy                          ;set IY for hit 2 thresholds
00b6/00 FD23      127    334             inc    iy
00b8/00 DD23      128    335             inc    ix
00ba/00 118A01    129    336             ld     de,128*3+machstb+H_fbufp            ;buffer storage
00bd/00           130    337    ws12:
00bd/00 CD9101    131    338             call   anal                        ;analyse
```

```
00c0/00 3E20       132    339            ld      a,20h                      ;reset interupt
00c2/00 D309       133    340            out     (09h),a
00c4/00 AF         134    341            xor     a
00c5/00 D309       135    342            out     (09h),a
00c7/00 C30900     136    343            jp      tryag                      ;go re read the port
00ca/00            137    344    not2:
00ca/00 CB51       138    345            bit     2,c                        ;machine 1 hit?
00cc/00 285A       139    346            jr      z,not3                     ;not 1
00ce/00 3E04       140    347            ld      a,04h
00d0/00 218000     141    348            ld      hl,machsta+(40h*2)         ;set up for testing
00d3/00 DD21A500   142    349            ld      ix,machsta+(40h*2)+M_fcdis      ;force display buffer
00d7/00 E5         143    350            push    hl
00d8/00 FDE1       144    351            pop     iy
00da/00 110A02     145    352            ld      de,128*4+machstb+H_fbufp             ;buffer storage
00dd/00 CB71       146    353            bit     6,c                        ;hit 2?
00df/00 203A       147    354            jr      nz,ws13                    ;1 on branch
00e1/00 CB56       148    355            bit     2,(hl)                     ;timing set?
00e3/00 2025       149    356            jr      nz,yep3
00e5/00 DD7E09     150    357            ld      a,(ix+9)                   ;first try
00e8/00 FEFF       151    358            cp      0ffh

Nuvatec Z80 assembler   Release 1.92             Tue Dec 29 11:08:26 1981

ints2.s


Addr/    Object     File   Ass'y
Section   Code      Line#  Line# + S t a t e m e n t
_______  ________   _____  _____ _ ____________________________________________

00ea/00 200A       152    359            jr      nz,nfr3
00ec/00 DD360900   153    360            ld      (ix+9),0
00f0/00 DD360800   154    361            ld      (ix+8),0                   ;set to zero
00f4/00 181A       155    362            jr      itt3
00f6/00            156    363    nfr3:
00f6/00 3EFF       157    364            ld      a,0ffh                     ;derive start of count
00f8/00 DD9608     158    365            sub     (ix+8)                     ;get what timing has been done
00fb/00 2806       159    366            jr      z,zer3
00fd/00 3D         160    367            dec     a
00fe/00 2803       161    368            jr      z,zer3
0100/00 3D         162    369            dec     a
0101/00 2002       163    370            jr      nz,ckr3
0103/00            164    371    zer3:
0103/00 3E01       165    372            ld      a,1
0105/00            166    373    ckr3:
0105/00 CBD6       167    374            set     2,(hl)                     ;indicate timing set
0107/00 DD7709     168    375            ld      (ix+9),a                   ;load setting
010a/00            169    376    yep3:
010a/00 DD7E09     170    377            ld      a,(ix+9)                   ;reset timer
010d/00 DD7708     171    378            ld      (ix+8),a
0110/00            172    379    itt3:
0110/00 3E05       173    380            ld      a,05h                      ;hit 2 address
0112/00 FD23       174    381            inc     iy                         ;set IY for hit 2 thresholds
0114/00 FD23       175    382            inc     iy
0116/00 DD23       176    383            inc     ix
0118/00 118A02     177    384            ld      de,128*5+machstb+H_fbufp             ;buffer storage
011b/00            178    385    ws13:
011b/00 CD9101     179    386            call    anal                       ;analyse
011e/00 3E40       180    387            ld      a,40h                      ;reset interupt
0120/00 D309       181    388            out     (09h),a
0122/00 AF         182    389            xor     a
0123/00 D309       183    390            out     (09h),a
0125/00 C30900     184    391            jp      tryag                      ;go re read the port
0128/00            185    392    not3:
0128/00 CB59       186    393            bit     3,c                        ;machine 1 hit?
012a/00 285A       187    394            jr      z,not4                     ;not 1
012c/00 3E06       188    395            ld      a,06h
012e/00 21C000     189    396            ld      hl,machsta+(40h*3)         ;set up for testing
0131/00 DD21E500   190    397            ld      ix,machsta+(40h*3)+M_fcdis      ;force display buffer
0135/00 E5         191    398            push    hl
0136/00 FDE1       192    399            pop     iy
0138/00 110A03     193    400            ld      de,128*6+machstb+H_fbufp             ;buffer storage
013b/00 CB79       194    401            bit     7,c                        ;hit 2?
013d/00 203A       195    402            jr      nz,ws14                    ;1 on branch
013f/00 CB56       196    403            bit     2,(hl)                     ;timing set?
0141/00 2025       197    404            jr      nz,yep4
0143/00 DD7E09     198    405            ld      a,(ix+9)                   ;first try
```

```
0146/00 FEFF        199   406           cp     0ffh
0148/00 200A        200   407           jr     nz,nfr4
014a/00 DD360900    201   408           ld     (ix+9),0
014e/00 DD360800    202   409           ld     (ix+8),0                    ;set to zero
0152/00 181A        203   410           jr     itt4
0154/00             204   411   nfr4:
0154/00 3EFF        205   412           ld     a,0ffh                      ;derive start of count
0156/00 DD9608      206   413           sub    (ix+8)                      ;get what timing has been done
0159/00 2806        207   414           jr     z,zer4
015b/00 3D          208   415           dec    a
015c/00 2803        209   416           jr     z,zer4
015e/00 3D          210   417           dec    a
015f/00 2002        211   418           jr     nz,ckr4
0161/00             212   419   zer4:
0161/00 3E01        213   420           ld     a,1
0163/00             214   421   ckr4:
0163/00 CBD6        215   422           set    2,(hl)                      ;indicate timing set
0165/00 DD7709      216   423           ld     (ix+9),a                    ;load setting
0168/00             217   424   yep4:                                      ;reset timer
0168/00 DD7E09      218   425           ld     a,(ix+9)
016b/00 DD7708      219   426           ld     (ix+8),a
016e/00             220   427   itt4:
016e/00 3E07        221   428           ld     a,07h                       ;set IY for hit 2 thresholds
0170/00 FD23        222   429           inc    iy
0172/00 FD23        223   430           inc    iy
0174/00 DD23        224   431           inc    ix
0176/00 118A03      225   432           ld     de,128*7+machstb+H_fbufp            ;buffer storage

Nuvatec Z80 assembler   Release 1.92          Tue Dec 29 11:08:26 1981

ints2.s

Addr/    Object   File   Ass'y
Section  Code     Line#  Line# + S t a t e m e n t
-------  -------  -----  -----  -
0179/00             226   433   ws14:
0179/00 CD9101      227   434           call   anal                        ;analyse
017c/00 3E80        228   435           ld     a,80h                       ;reset interupt
017e/00 D309        229   436           out    (09h),a
0180/00 AF          230   437           xor    a
0181/00 D309        231   438           out    (09h),a
0183/00 C30900      232   439           jp     tryag                       ;go re read the port
0186/00             233   440   not4:
0186/00 DDE1        234   441           pop    ix                          ;restore original contents
0188/00 FDE1        235   442           pop    iy
018a/00 C1          236   443           pop    bc
018b/00 D1          237   444           pop    de
018c/00 E1          238   445           pop    hl
018d/00 E1          239   446           pop    af
018e/00 FB          240   447           ei                                 ;back on with the interupts
018f/00 ED4D        241   448           reti
0191/00             242   449   anal:
0191/00 4F          243   450           ld     c,a                         ;save AD address for bit reference
0192/00 D310        244   451           out    (10h),a                     ;load out address
0194/00 0610        245   452           ld     b,10h                       ;loop a bit before sending start
0196/00             246   453   hl1:
0196/00 10FE        247   454           djnz   hl1
0198/00 CBDF        248   455           set    3,a                         ;send out a high pulse
019a/00 D310        249   456           out    (10h),a
019c/00 CB9F        250   457           res    3,a
019e/00 D310        251   458           out    (10h),a
01a0/00             252   459   hl2:
01a0/00 DB10        253   460           in     a,(10h)                     ;wait for a low to indicate conv. start
01a2/00 CB67        254   461           bit    4,a
01a4/00 2803        255   462           jr     z,hl3                       ;go wait for finish signal
01a6/00 10F8        256   463           djnz   hl2
01a8/00 C9          257   464           ret                                ;for get it
01a9/00             258   465   hl3:
01a9/00 DB10        259   466           in     a,(10h)                     ;look for finished
01ab/00 CB67        260   467           bit    4,a
01ad/00 2003        261   468           jr     nz,finit
01af/00 10F8        262   469           djnz   hl3
01b1/00 C9          263   470           ret
01b2/00             264   471   finit:
```

```
01b2/00 DB11     265  472          in    a,(11h)
01b4/00 DD7700   266  473          ld    (ix+0),a            ;save for FORCE conversation
01b7/00 CB46     267  474          bit   0,(hl)              ;see if test is set
01b9/00 203C     268  475          jr    nz,tesset           ;in test mode if not set
01bb/00 CB4E     269  476          bit   1,(hl)              ;is it in STOP mode
01bd/00 C8       270  477          ret   z                   ;if so ignore it
01be/00 FDBE00   271  478          cp    (iy+0)      ;test against single hit tolerance
01c1/00 FADD01   272  479          jp    m,badhit1           ;if less then bad hit
01c4/00 FDBE01   273  480          cp    (iy+1)      ;high end
01c7/00 F2E201   274  481          jp    p,badhit
01ca/00          275  482  stuff:
01ca/00 EB       276  483          ex    de,hl               ;get buffer address into HL
01cb/00 47       277  484          ld    b,a                 ;save force in B-reg
01cc/00 7E       278  485          ld    a,(hl)              ;get front pointer
01cd/00 3C       279  486          inc   a
01ce/00 23       280  487          inc   hl                  ;set ahead to next open spot and
01cf/00 E607     281  488          and   07h                 ; test against back pointer
01d1/00 BE       282  489          cp    (hl)
01d2/00 C8       283  490          ret   z                   ;if equal then no room in buffer
01d3/00 2B       284  491          dec   hl
01d4/00 77       285  492          ld    (hl),a              ;restore pointer
01d5/00 3C       286  493          inc   a                   ;add 2 for proper referencing
01d6/00 3C       287  494          inc   a
01d7/00 1600     288  495          ld    d,0
01d9/00 5F       289  496          ld    e,a                 ;add to HL reference
01da/00 19       290  497          add   hl,de
01db/00 70       291  498          ld    (hl),b              ;store force into buffer
01dc/00 C9       292  499          ret
01dd/00          293  500  badhit1:
01dd/00 23       294  501          inc   hl                  ;set to indicate too high
01de/00 CBC6     295  502          set   0,(hl)
01e0/00 1803     296  503          jr    badint
01e2/00          297  504  badhit:
01e2/00 23       298  505          inc   hl                  ;indicate force too low
01e3/00 CBCE     299  506          set   1,(hl)

Nuvatec Z80 assembler   Release 1.92        Tue Dec 29 11:08:26 1981          page 5

ints2.s

Addr/    Object  File   Ass'y
Section   Code   Line#  Line# + S t a t e m e n t

01e5/00          300  507  badint:
01e5/00 CBD6     301  508          set   2,(hl)              ;indicate hit 1
01e7/00 CB41     302  509          bit   0,c                 ;test if hit 2
01e9/00 2804     303  510          jr    z,ntt2              ;not 2 on branch
01eb/00 CB96     304  511          res   2,(hl)
01ed/00 CBDE     305  512          set   3,(hl)
01ef/00          306  513  ntt2:
01ef/00 CBF6     307  514          set   6,(hl)              ;indicate short count fault
01f1/00 2B       308  515          dec   hl                  ;back to the machine flags
01f2/00 7E       309  516          ld    a,(hl)              ;stop machine
01f3/00 E6FC     310  517          and   0fch                ;set to stop mode
01f5/00 77       311  518          ld    (hl),a
01f6/00 C9       312  519          ret
01f7/00          313  520  tesset:
                 314  521   ;right now nothing is done in test mode
01f7/00 18D1     315  522          jr    stuff
                 316  523   ;KEYINT: service of key and timer interupts
01f9/00          317  524  keyint:
01f9/00 F3       318  525          di                        ;disable other interupts
01fa/00 F5       319  526          push  af                  ;save Areg from destruction
01fb/00          320  527  lokag:
01fb/00 DB09     321  528          in    a,(09h)             ;get the indications
01fd/00 CB47     322  529          bit   0,a                 ;key board interupt
01ff/00 2814     323  530          jr    z,kint1             ;go check for timer
0201/00          324  531  keylp:
0201/00 3E40     325  532          ld    a,AD_CreadKEY       ;set up to read the key
0203/00 320130   326  533          ld    (AD_CONTROL),a      ;out it goes
0206/00 3A0030   327  534          ld    a,(AD_DATA)         ;get the key code
0209/00 CD2902   328  535          call  bufstf              ;stuff it in the buffer
020c/00 3A0130   329  536          ld    a,(AD_CONTROL)      ;any more key presses
020f/00 E60F     330  537          and   0fh
0211/00 20EE     331  538          jr    nz,keylp            ;go look some more
```

```
0213/00 18E6      332   539            jr      lokag          ;get flags again
0215/00           333   540  kint1:
0215/00 CB4F      334   541            bit     1,a            ;timer interupt?
0217/00 280C      335   542            jr      z,kint2        ;go on
0219/00 3E08      336   543            ld      a,08h          ;put out a fast pulse to reset timer indication
021b/00 D309      337   544            out     (09h),a
021d/00 AF        338   545            xor     a
021e/00 D309      339   546            out     (09h),a
0220/00 CD0000    340   547            call    clocktick      ;go apply a tick
0223/00 18D6      341   548            jr      lokag          ;go check out keys again
0225/00           342   549  kint2:
0225/00 F1        343   550            pop     af             ;restore A-reg
0226/00 FB        344   551            ei
0227/00 ED4D      345   552            reti                   ;seee you later
                  346   553  ;BUFSTF: key buffer stuffer
                  347   554  ;         takes contents of A-reg and stuffs it in the key buffer
0229/00           348   555  bufstf:
0229/00 C5        349   556            push    bc
022a/00 E5        350   557            push    hl             ;save HL from destruction
022b/00 F5        351   558            push    af             ;save key code A bit
022c/00 210000    352   559            ld      hl,fptr        ;get address of front buffer pointer
022f/00 7E        353   560            ld      a,(hl)         ;get pointer into A
0230/00 23        354   561            inc     hl             ;set to back pointer
0231/00 3C        355   562            inc     a              ;set ahead
0232/00 47        356   563            ld      b,a
0233/00 E607      357   564            and     07h            ;keep in 0-7 range
0235/00 BE        358   565            cp      (hl)           ;test against back pointer
0236/00 280E      359   566            jr      z,screw        ;if equal then buffer wrap, throw away key
0238/00 2B        360   567            dec     hl             ;reload pointer
0239/00 77        361   568            ld      (hl),a
023a/00 78        362   569            ld      a,b            ;put back index
023b/00 23        363   570            inc     hl             ;set to start of buffer
023c/00 85        364   571            add     a,l            ;add in pointer offset
023d/00 3001      365   572            jr      nc,nocar
023f/00 24        366   573            inc     h
0240/00           367   574  nocar:
0240/00 6F        368   575            ld      l,a            ;HL now set to proper location
0241/00 F1        369   576            pop     af             ;get back key code
0242/00 77        370   577            ld      (hl),a         ;stuff it away
0243/00 E1        371   578            pop     hl             ;restore HL
0244/00 C1        372   579            pop     bc
0245/00 C9        373   580            ret                    ;return

Nuvatec Z80 assembler   Release 1.92          Tue Dec 29 11:08:26 1981

ints2.s

Addr/     Object    File    Ass'y
Section   Code      Line#   Line# + S t a t e m e n t
--------  --------  ------  ------ - ------------------------------------------------------------
0246/00           374   581  screw:
0246/00 F1        375   582            pop     af             ;restore stack
0247/00 AF        376   583            xor     a              ;return A as 0 to show no load took place
0248/00 E1        377   584            pop     hl             ;restore HL
0249/00 C1        378   585            pop     bc
024a/00 C9        379   586            ret
                  380   587  ;
                  381   588  ;*********
024b/00           382   589            end

No errors in this assembly

Symbol table entries used:    122/ 571
Symbol name characters used:  936/7500

Nuvatec Z80 assembler   Release 1.92          Tue Dec 29 11:08:26 1981

ints2.s
Symbol Table / Cross-Reference Listing

value    type      defined      name of symbol
--------  --------  --------     ------------------------------------------------
3001        e          22        AD CONTROL
```

```
00d3      e    34   AD_CclrAll
00e0      e    43   AD_Cendint
0040      e    40   AD_CreadKEY
0090      e    31   AD_Cwrite
3000      e    21   AD_DATA
0003      e    11   BCD_NUMLEN
0010      e    13   CLOCKRATE
0008      e    58   DF_BLINK2
0020      e    57   DF_ERRBLINK
0000      e    55   DF_STEADY
0008      e    56   DS_BRKBLINK
0080      e    52   DS_ON
0005/--       184   H_acc16
0002/--       182   H_acc4
0008/--       186   H_acc64
000b/--       189   H_bbufp
000c/--       191   H_buf
0000/--       173   H_cflags
0004/--       183   H_cnt16
0001/--       181   H_cnt4
0007/--       185   H_cnt64
000a/--       188   H_fbufp
0015/--       193   H_hitclk
0016/--       194   H_hitclksv
0014/--       192   H_static
0018/--       196   H_trcnt
0017/--       195   H_trend
0008      e    66   KEY_BS
000a      e    65   KEY_ENTER
000d      e    67   KEY_NEXT
000b/--       131   M_bcnt
0024/--       159   M_dfreq
000e/--       133   M_dptr
0023/--       157   M_dstatus
0001/--       121   M_errflags
0025/--       163   M_fcdis
0000/--       102   M_flags
002d/--       164   M_hitclk
0008/--       130   M_setbcnt
0002/--       128   M_settcnt
0005/--       129   M_tcnt
0020/--       154   M_tcount
0010/--       137   M_tol1
0018/--       145   M_tol16
0014/--       141   M_tol4
001c/--       149   M_tol64
0022/--       155   M_tolfac
0010/--       136   M_tols
3801      e    25   ND_CONTROL
00df      e    35   ND_CclrAll
00c2      e    38   ND_CclrF
00e0      e    44   ND_Cendint
0040      e    41   ND_CreadHIT
0090      e    32   ND_Cwrite
3800      e    24   ND_DATA
0006      e    10   NUMLEN
0002      e     8   N_HITS
0004      e     7   N_MACHINES
0003/--       208   RS_fw
0002/--       207   RS_maxfw
0001/--       206   RS_pos
0000/--       205   RS_startpos
00ff      e    15   WATCHDOG
0191/00       449   anal
01e2/00       504   badhit
01dd/00       500   badhit1
01e5/00       507   badint
0229/00   E   555   bufstf
0048/00       275   ckr1
00a7/00       325   ckr2
0105/00       373   ckr3
0163/00       421   ckr4
0000/02 ? I   ---   clocktick
01b2/00       471   finit

Nuvatec Z80 assembler   Release 1.92        Tue Dec 29 11:08.26 1981
```

```
ints2.s
Symbol Table / Cross-Reference Listing

value     type      defined      name of symbol
-------   ------    --------     --------------

0000/04 ?  I           ---       fptr
0080/--     s          171       hit_sect
0000/00   E            237       hitInt
0196/00                453       hl1
01a0/00                459       hl2
01a9/00                465       hl3
024b/00     s          210       ints2.s
0053/00                281       itt1
00b2/00                331       itt2
0110/00                379       itt3
016e/00                427       itt4
0000/03 ?  I           ---       kbbuff
01f9/00   E            524       keyint
0201/00                531       keylp
0215/00                540       kint1
0225/00                549       kint2
01fb/00                527       lokag
0040/--     s           99       mach_sect
0000/01 ?  I           ---       machsta
0000/05 ?  I           ---       machstb
0039/00                265       nfr1
0098/00                315       nfr2
00f6/00                363       nfr3
0154/00                411       nfr4
0240/00                574       nocar
006c/00                296       not1
00ca/00                344       not2
0128/00                392       not3
0186/00                440       not4
01ef/00                513       ntt2
0004/--     s          204       rsarg_sect
0246/00                581       screw
01ca/00                482       stuff
01f7/00                520       tesset
0009/00                245       tryag
005e/00                287       wsl1
00bd/00                337       wsl2
011b/00                385       wsl3
0179/00                433       wsl4
004d/00                278       yep1
00ac/00                328       yep2
010a/00                376       yep3
0168/00                424       yep4
0046/00                273       zer1
00a5/00                323       zer2
0103/00                371       zer3
0161/00                419       zer4

Nuvatec Z80 assembler   Release 1.92          Tue Dec 22 14:43:14 1981

clocktick.s

Addr/     Object   File    Ass'y
Section    Code    Line#   Line# + S t a t e m e n t
-------   ------   -----   -----   -------------------

                              1            list     "off"
0000/00              5      212            section  "ROM"
                     6      213
                     7      214    ;---------------------------------------------------;
                     8      215    ;
                     9      216    ; Name:         clocktick
                    10      217    ;
                    11      218    ; Function:     handles clock-tick interrupt
                    12      219    ;
                    13      220    ; Needs:
                    14      221    ;
                    15      222    ; Returns:
                    16      223    ;
                    17      224    ; Destroys:     nothing!
```

```
                          18      225    ;
                          19      226    ;  Other Comments:
                          20      227    ;
                          21      228    ;------------------------------------------------------------------;
                          22      229               import   machsta,sysclk
                          23      230               export   clocktick
                          24      231    ;
0004                      25      232    sytim:     equ      04h               ;count down for clock
                          26      233    ;
0000/00                   27      234    clocktick:
0000/00 FDE5E5D5          28      235               push     iy,hl,de,bc,af          ; save regs
        C5F5
0006/00 210000            29      236               ld       hl,sysclk               ; count down system clock first
0009/00 FD210000          30      237               ld       iy,machsta              ; update numeric display blink status
000d/00 114000            31      238               ld       de,sizeof(mach_sect)    ;        for each machine
0010/00 35                32      239               dec      (hl)
0011/00 2015              33      240               jr       nz,notouch
0013/00 FDE5              34      241               push     iy                      ;save IY reference
0015/00 3604              35      242               ld       (hl),sytim
0017/00 0604              36      243               ld       b,N_MACHINES            ;
0019/00                   37      244    ct_nextmach:                                ;
0019/00 FD7E23            38      245               ld       a,(iy+M_dstatus)        ; display status += disp. blink freq
001c/00 FD8624            39      246               add      a,(iy+M_dfreq)          ;
001f/00 FD7723            40      247               ld       (iy+M_dstatus),a        ; store updated status
0022/00 FD19              41      248               add      iy,de                   ; to next machine's RAM block
0024/00 10F3              42      249               djnz     ct_nextmach             ;
0026/00 FDE1              43      250               pop      iy                      ;restore IY
0028/00                   44      251    notouch:
0028/00 FD210000          45      252               ld       iy,machsta              ;reference hit timers
002c/00 0604              46      253               ld       b,4                     ;number of machines
002e/00                   47      254    hitbump:
002e/00 FD342D            48      255               inc      (iy+M_hitclk)
0031/00 201A              49      256               jr       nz,ntzer
0033/00 FDCB0056          50      257               bit      2,(iy+0)                ;timing set?
0037/00 2814              51      258               jr       z,ntzer
0039/00 FDCB004E          52      259               bit      1,(iy+0)                ;is it in test mode or production
003d/00 280A              53      260               jr       z,tmode
003f/00 FDCB0086          54      261               res      0,(iy+0)                ;stop machine
0043/00 FDCB008E          55      262               res      1,(iy+0)
0047/00 1804              56      263               jr       ntzer
0049/00                   57      264    tmode:
0049/00 FD361600          58      265               ld       (iy+22),0
004d/00                   59      266    ntzer:
004d/00 FD19              60      267               add      iy,de
004f/00 10DD              61      268               djnz     hitbump
0051/00 F1C1D1E1          62      269               pop      af,bc,de,hl,iy          ; restore regs
        FDE1
0057/00 C9                63      270               ret

No errors in this assembly

Symbol table entries used:     77/ 571
Symbol name characters used:  707/7500

Nuvatec Z80 assembler   Release 1.92          Tue Dec 22 14:43:14 1981

clocktick.s
Symbol Table / Cross-Reference Listing

value    type       defined       name of symbol

3001       e           22         AD_CONTROL
00d3       e           34         AD_CclrAll
00e0       e           43         AD_Cendint
0040       e           40         AD_CreadKEY
0090       e           31         AD_Cwrite
3000       e           21         AD_DATA
0003       e           11         BCD_NUMLEN
0010       e           13         CLOCKRATE
0008       e           58         DF_BLINK2
0020       e           57         DF_ERRBLINK
0000       e           55         DF_STEADY
0008       e           56         DS_BRKBLINK
0080       e           52         DS_ON
0005/--               184         H_acc16
0002/--               182         H_acc4
```

```
0008/--              186      H_acc64
000b/--              189      H_bbufp
000c/--              191      H_buf
0000/--              173      H_cflags
0004/--              183      H_cnt16
0001/--              181      H_cnt4
0007/--              185      H_cnt64
000a/--              188      H_fbufp
0015/--              193      H_hitclk
0016/--              194      H_hitclksv
0014/--              192      H_static
0018/--              196      H_trcnt
0017/--              195      H_trend
0008        e         66      KEY_BS
000a        e         65      KEY_ENTER
000d        e         67      KEY_NEXT
000b/--              131      M_bcnt
0024/--              159      M_dfreq
000e/--              133      M_dptr
0023/--              157      M_dstatus
0001/--              121      M_errflags
0025/--              163      M_fcdis
0000/--              102      M_flags
002d/--              164      M_hitclk
0008/--              130      M_setbcnt
0002/--              128      M_settcnt
0005/--              129      M_tcnt
0020/--              154      M_tcount
0010/--              137      M_tol1
0018/--              145      M_tol16
0014/--              141      M_tol4
001c/--              149      M_tol64
0022/--              155      M_tolfac
0010/--              136      M_tols
3801        e         25      ND_CONTROL
00df        e         35      ND_CclrAll
00c2        e         38      ND_CclrF
00e0        e         44      ND_Cendint
0040        e         41      ND_CreadHIT
0090        e         32      ND_Cwrite
3800        e         24      ND_DATA
0006        e         10      NUMLEN
0002        e          8      N_HITS
0004        e          7      N_MACHINES
0003/--              208      RS_fw
0002/--              207      RS_maxfw
0001/--              206      RS_pos
0000/--              205      RS_startpos
00ff        e         15      WATCHDOG
0000/00   E          234      clocktick
0058/00     s        212      clocktick.s
0019/00              244      ct_nextmach
0080/--     s        171      hit_sect
002e/00              254      hitbump
0040/--     s         99      mach_sect
0000/01 ? I          ---      machsta
0028/00              251      notouch
004d/00              266      ntzer
0004/--     s        204      rsarg_sect
0000/02 ? I          ---      sysclk

Nuvatec Z80 assembler   Release 1.92          Tue Dec 22 14:43:14 1981

clocktick.s
Symbol Table / Cross-Reference Listing

value     type       defined     name of symbol
-----     ----       -------     --------------

0004        e          232       sytim
0049/00                264       tmode

Nuvatec Z80 assembler   Release 1.9           Sun Nov  8 13:54:34 1981

ram.s
```

```
Addr/    Object  File    Ass'y
Section  Code    Line#   Line# + S t a t e m e n t
-------  ------  -----   ----- - ----------------------------------------------------------------
                          1            copy    "equates.h"
                  1#1     2    ;------------------------------------------------------------------
                  2#1     3    ; "Configuration" parameters
                  3#1     4    ;------------------------------------------------------------------
                  4#1     5
0004              5#1     6    N_MACHINES      equ     4               ; number of machines under control
0002              6#1     7    N_HITS          equ     2               ; number of different hits, per machine
                  7#1     8
0006              8#1     9    NUMLEN          equ     6               ; # of digits in each numeric "register"
0003              9#1    10    BCD_NUMLEN      equ     (NUMLEN+1)/2    ; # of bytes of BCD to contain above
                 10#1    11
0010             11#1    12    CLOCKRATE       equ     16              ; clock-tick interrupt rate (times/sec)
                 12#1    13
00ff             13#1    14    WATCHDOG        equ     0xff            ; I/O port # for watchdog timer reset
                 14#1    15
                 15#1    16    ;------------------------------------------------------------------
                 16#1    17    ; Definition of addresses of Data and Control ports for displays
                 17#1    18    ;------------------------------------------------------------------
                 18#1    19
3000             19#1    20    AD_DATA         equ     0x3000          ; Alphanumeric display data port
3001             20#1    21    AD_CONTROL      equ     AD_DATA+1       ; Alphanumeric display control port
                 21#1    22
3800             22#1    23    ND_DATA         equ     0x3800          ; Numeric display data port
3801             23#1    24    ND_CONTROL      equ     ND_DATA+1       ; Numeric display control port
                 24#1    25
                 25#1    26    ;------------------------------------------------------------------
                 26#1    27    ; Definition of values for Data and Control ports for displays
                 27#1    28    ;------------------------------------------------------------------
                 28#1    29
0090             29#1    30    AD_Cwrite       equ     10010000b       ; Control: write w/AutoIncrement setup
0090             30#1    31    ND_Cwrite       equ     10010000b       ; Control: write w/AutoIncrement setup
                 31#1    32
00d3             32#1    33    AD_CclrAll      equ     11010011b       ; Control: Clear & reset display
00df             33#1    34    ND_CclrAll      equ     11011111b       ; Control: Clear & reset display
                 34#1    35
                 35#1    36    ;;AD_CclrF       equ     11000010b       ; Control: Clear input FIFO status only
00c2             36#1    37    ND_CclrF        equ     11000010b       ; Control: Clear input FIFO status only
                 37#1    38
0040             38#1    39    AD_CreadKEY     equ     01000000b       ; Control: Read Keyboard
0040             39#1    40    ND_CreadHIT     equ     01000000b       ; Control: Read Hit Force
                 40#1    41
00e0             41#1    42    AD_Cendint      equ     11100000b       ; Control: Ack Keyboard interrupt
00e0             42#1    43    ND_Cendint      equ     11100000b       ; Control: Ack Hit-Force interrupt
                 43#1    44
                 44#1    45
                 45#1    46    ;------------------------------------------------------------------
                 46#1    47    ; Definition of values for Display status bytes
                 47#1    48    ;------------------------------------------------------------------
                 48#1    49
                 49#1    50                                            ; Display Status values
0080             50#1    51    DS_ON           equ     10000000b       ;       ON
                 51#1    52
                 52#1    53                                            ; Display-change Frequency values
0000             53#1    54    DF_STEADY       equ     0               ;       steady: no change
0008             54#1    55    DS_BRKBLINK     equ     DS_ON/(CLOCKRATE/1) ; blink rate for production break
0020             55#1    56    DF_ERRBLINK     equ     DS_ON/(CLOCKRATE/4) ; blink rate for error on machine
0008             56#1    57    DF_BLINK2       equ     DF_ERRBLINK/4   ; non-error blink rate
                 57#1    58
                 58#1    59
                 59#1    60    ;------------------------------------------------------------------
                 60#1    61    ; Definition of values for key codes returned by "keyred"/"keyred2"
                 61#1    62    ;------------------------------------------------------------------
                 62#1    63
000a             63#1    64    KEY_ENTER       equ     '\n'            ; code for Enter key
0008             64#1    65    KEY_BS          equ     '\b'            ; code for BackSpace key
000d             65#1    66    KEY_NEXT        equ     '\r'            ; code for Next key
                 66#1    67
                 67#1    68
                 68#1    69    ;------------------------------------------------------------------
                 69#1    70    ; Macro definitions
                 70#1    71    ;------------------------------------------------------------------
                 71#1    72
```

```
                        72#1    73  ASSUME  macro    ; boolean_expr
                        73#1    74          if       ! ( $1 )
Nuvatec Z80 assembler   Release 1.9                  Sun Nov  8 13:54:34 1981

ram.s

Addr/    Object  File    Ass'y
Section  Code    Line#   Line# + S t a t e m e n t
-------  ------  -----   -----   -------------------------------------------
                 74#1    75              then
                 75#1    76                      msg     "Assumption failed",'e'
                 76#1    77              endif
                 77#1    78              mend
                 78#1    79
                 79#1    80      RSARGS  macro   ; max_field_width, display_start_pos, buffer_address [,initial_string_le
                 80#1    81              import  rs_args
                 81#1    82              ld      iy,rs_args              ; iy -> argument block
                 82#1    83              ld      (iy+RS_startpos),$2     ; starting position for display
                 83#1    84              ld      (iy+RS_pos),$4+$2       ; current position for cursor
                 84#1    85              ld      (iy+RS_maxfw),$1        ; maximum allowed input field width
                 85#1    86              ld      (iy+RS_fw),$4+0         ; current input field width (# chars read)
                 86#1    87              ld      hl,$3                   ; address of buffer for input chars
                 87#1    88              mend
                 2       89              copy    "structs.h"
                 1#1     90      ; -----------------------------------------------------------
                 2#1     91      ; Definition of structures (dummy sections)
                 3#1     92      ; -----------------------------------------------------------
                 4#1     93
                 5#1     94      ; -----------------------------------------------------------
                 6#1     95      ; Data structure for each machine
                 7#1     96      ; -----------------------------------------------------------
                 8#1     97
0000/--          9#1     98      mach_sect:      section "DUMMY"         ; one for each machine
                 10#1    99                                              ;   (to go in battery backed up RAM)
                 11#1    100
0000/--          12#1    101     M_flags:        ds      1               ; Machine flags:
                 13#1    102                                             ;
                 14#1    103                                             ; bits  explaination
                 15#1    104                                             ; ----  ------------
                 16#1    105                                             ; 0-1   machine mode
                 17#1    106                                             ;       00:  stopped (either by
                 18#1    107                                             ;                 operator or box)
                 19#1    108                                             ;       01:  test mode
                 20#1    109                                             ;       10:  production mode
                 21#1    110                                             ;       11:  test, with box alteration
                 22#1    111                                             ;              to production
                 23#1    112                                             ; 2     current hit #
                 24#1    113                                             ;       0:  hit #2 last occured
                 25#1    114                                             ;       1:  hit #1 last occured
                 26#1    115                                             ;
                 27#1    116                                             ; 3     tolerances defined (if set)
                 28#1    117                                             ; 4     production values set
                 29#1    118                                             ; 5-7   (undefined)
                 30#1    119
0001/--          31#1    120     M_errflags:     ds      1               ; Machine error flags:
                 32#1    121                                             ;       (must immed. follow M_flags)
                 33#1    122                                             ; bits  explaination
                 34#1    123                                             ; ----  ------------
                 35#1    124                                             ; 0-7   1: certain error occured on machine
                 36#1    125
                 37#1    126
0002/--          38#1    127     M_settcnt:      ds      BCD_NUMLEN      ; Limit of parts to make
0005/--          39#1    128     M_tcnt:         ds      BCD_NUMLEN      ; Cumulative count of parts made
0008/--          40#1    129     M_setbcnt:      ds      BCD_NUMLEN      ; Limit of Breaks
000b/--          41#1    130     M_bcnt:         ds      BCD_NUMLEN      ; Cumulative count of Breaks so far
                 42#1    131
000e/--          43#1    132     M_dptr:         ds      2               ; ptr to current BCD # to display
                 44#1    133                                             ;     for this machine
                 45#1    134                                             ; Tolerance values
0010/--          46#1    135     M_tols:                                 ; 1--hit low  threshold value, hit #1
0010/--          47#1    136     M_toll:         ds      1               ; 1--hit high threshold value, hit #1
0011/--          48#1    137                     ds      1               ; 1--hit low  threshold value, hit #2
0012/--          49#1    138                     ds      1               ; 1--hit high threshold value, hit #2
0013/--          50#1    139                     ds      1
```

```
0014/--          51#1   140  M_tol4:      ds   1                     ; 4--hit low  threshold value, hit #1
0015/--          52#1   141               ds   1                     ; 4--hit high threshold value, hit #1
0016/--          53#1   142               ds   1                     ; 4--hit low  threshold value, hit #2
0017/--          54#1   143               ds   1                     ; 4--hit high threshold value, hit #2
0018/--          55#1   144  M_tol16:     ds   1                     ; 16-hit low  threshold value, hit #1
0019/--          56#1   145               ds   1                     ; 16-hit high threshold value, hit #1
001a/--          57#1   146               ds   1                     ; 16-hit low  threshold value, hit #2
001b/--          58#1   147               ds   1                     ; 16-hit high threshold value, hit #2
001c/--          59#1   148  M_tol64:     ds   1                     ; 64-hit low  threshold value, hit #1

Nuvatec Z80 assembler   Release 1.9       Sun Nov  8 13:54:34 1981                         page 3

ram.s


Addr/     Object  File    Ass'y
Section   Code    Line#   Line# + S t a t e m e n t
-------   ------  -----   ----- - ----------------------------------------------------------------
001d/--          60#1   149               ds   1                     ; 64-hit high threshold value, hit #1
001e/--          61#1   150               ds   1                     ; 64-hit low  threshold value, hit #2
001f/--          62#1   151               ds   1                     ; 64-hit high threshold value, hit #2
                 63#1   152
0020/--          64#1   153  M_tcount:    ds   2                     ; test counter
0022/--          65#1   154  M_tolfac:    ds   1                     ; threshold tolerance factor
                 66#1   155
0023/--          67#1   156  M_dstatus:   ds   1                     ; numeric display blink status
                 68#1   157                                          ;       (bit 7 = 1 when display is ON)
0024/--          69#1   158  M_dfreq:     ds   1                     ; numeric display blink frequency
                 70#1   159                                          ;       (added to M_dstatus at each
                 71#1   160                                          ;        clock tick)
                 72#1   161
0025/--          73#1   162  M_fcdis:     ds   8                     ;force conv. buffer
002d/--          74#1   163  M_hitclk:    ds   2                     ;hit counter clock
002f/--          75#1   164               ds   40h-($-M_flags)       ; fill out to 40h bytes
                 76#1   165
                 77#1   166  ;--------------------------------------------------------------------
                 78#1   167  ; Hit data structure
                 79#1   168  ;--------------------------------------------------------------------
                 80#1   169
0000/--          81#1   170  hit_sect:    section "DUMMY"            ; one for each hit, of each machine
                 82#1   171
0000/--          83#1   172  H_cflags:    ds   1                     ; Count flags
                 84#1   173                                          ; bits  explaination
                 85#1   174                                          ; ----  ------------
                 86#1   175                                          ; 0     adjustment occurred within
                 87#1   176                                          ;       last 64 count testing
                 88#1   177                                          ; 1-7   undefined
                 89#1   178
                 90#1   179                                          ; Accumulator and counters for forces
0001/--          91#1   180  H_cnt4:      ds   1                     ; 4--hit counter for accumulator
0002/--          92#1   181  H_acc4:      ds   2                     ; 4--hit accumulator
0004/--          93#1   182  H_cnt16:     ds   1                     ; 16-hit counter for accumulator
0005/--          94#1   183  H_acc16:     ds   2                     ; 16-hit accumulator
0007/--          95#1   184  H_cnt64:     ds   1                     ; 64-hit counter for accumulator
0008/--          96#1   185  H_acc64:     ds   2                     ; 64-hit accumulator
                 97#1   186
000a/--          98#1   187  H_fbufp:     ds   1                     ; front buffer pointer
000b/--          99#1   188  H_bbufp:     ds   1                     ; back buffer pointer
                100#1   189
000c/--         101#1   190  H_buf:       ds   8                     ; circular buffer of input hit forces
0014/--         102#1   191  H_static:    ds   1                     ;static force location hold
0015/--         103#1   192  H_hitclk:    ds   1                     ;hit timer clock
0016/--         104#1   193  H_hitclksv:  ds   1                     ;  "    "    save location
0017/--         105#1   194  H_trend:     ds   1                     ;static trend differance accumulator
0018/--         106#1   195  H_trcnt:     ds   1                     ;static trend try counter
                107#1   196
0019/--         108#1   197               ds   128-($-H_cflags)      ; fill out to 128 bytes
                109#1   198
                110#1   199  ;--------------------------------------------------------------------
                111#1   200  ; Data structure for arg block to "readstring"
                112#1   201  ;--------------------------------------------------------------------
                113#1   202
0000/--         114#1   203  rsarg_sect:  section "DUMMY"            ; arg block for readstring
0000/--         115#1   204  RS_startpos: ds   1                     ; starting position for display
0001/--         116#1   205  RS_pos:      ds   1                     ; current cursor position ("running count")
0002/--         117#1   206  RS_maxfw:    ds   1                     ; maximum allowed input field width
```

```
0003/--           118#1   207   RS_fw:          ds      1                 ; current input field width (# chars read)
                  119#1   208
0000/00           120#1   209                   section "ROM"
                      3   210           eject
Nuvatec Z80 assembler    Release 1.9            Sun Nov  8 13:54:34 1981

ram.s


Addr/    Object   File    Ass'y
Section   Code    Line#   Line# + S t a t e m e n t
-------  ------   -----   ----- - -----------------------------------------
                      4   211
                      5   212   ;----------------------------------------------------------
                      6   213   ;System memory area (2000-207fh):
                      7   214   ;----------------------------------------------------------
                      8   215                   export  rami_begin, valid, adisp_lock, ndbuffer, nd_zflags
                      9   216                   export  sysflg,sysclk
                     10   217
0000                 11   218                   aorg    2000h
2000                 12   219   rami_begin:
2000                 13   220   valid:          ds      2                 ; ram memory retention test bytes
                     14   221                   ;------------------------------
                     15   222                   ;       used in adisp.s and errchk.s
                     16   223                   ;------------------------------
2002                 17   224   adisp_lock:     ds      1                 ; non-0 locks alpha display from update
                     18   225                   ;------------------------------
                     19   226                   ;       used in ndisp.s
                     20   227                   ;------------------------------
2003                 21   228   ndbuffer:       ds      BCD_NUMLEN*N_MACHINES+4 ; numeric display buffer
2013                 22   229   nd_zflags:      ds      1                 ; flag for zero-suppression
                     23   230                                             ;   bits 0-3 corr. to machines 1-4 respectively
                     24   231                                             ;     1 = leading zero-suppression OFF
                     25   232                                             ;     0 = leading zero-suppression ON (normal)
                     26   233
2014                 27   234   sysflg:         ds      2                 ;SYSTEM flags
                     28   235                                             ;bit 0 - key lock on
2016                 29   236   sysclk:         ds      1                 ;count down for blink clock
                     30   237
                     31   238   ;----------------------------------------------------------
                     32   239   ; Computaion scratch (2080-20ffh):        math dedicated area
                     33   240   ;----------------------------------------------------------
2017                 34   241                   aorg    2080h
                     35   242
                     36   243
                     37   244   ;----------------------------------------------------------
                     38   245   ; Machine storage area A (2200-22ffh) (battery backed up)
                     39   246   ;       area for storage of machine variables that should be considered
                     40   247   ;       indestructable information
                     41   248   ;----------------------------------------------------------
                     42   249                   export  machsta
2080                 43   250                   aorg    2200h
2200                 44   251   machsta:        ds      N_MACHINES * sizeof(mach_sect)
                     45   252
                     46   253
                     47   254   ;----------------------------------------------------------
                     48   255   ; Conversation scratch area (2300-237fh)
                     49   256   ;       ram area for operation of conversations
                     50   257   ;==========================================================
                     51   258
                     52   259           export  funcod,conflg,nexent,spcent,fptr,bptr,kbbuff,rs_args
                     53   260           export  rtaddr1, scrch, machnum
                     54   261           export  kr_savebc, kr_savede, kr_savehl, kr_saveiy, kr_saveret
                     55   262           export  cpd_retn, rs_saveretn
                     56   263
2300                 57   264           aorg    2300h
2300                 58   265   funcod  ds      1                         ; code number of conversation in play
2301                 59   266   conflg  ds      1                         ; conversation operation flag byte
2302                 60   267   nexent  ds      2                         ; address to send conversation input to
2304                 61   268   spcent  ds      2                         ; address to send function key input to
2306                 62   269   fptr    ds      1                         ; front keyboard pointer
2307                 63   270   bptr    ds      1                         ; back keyboard pointer
2308                 64   271   kbbuff  ds      8                         ; 8 byte circular keyboard buffer
2310                 65   272   rs_args ds      sizeof(rsarg_sect)        ; argument area for "readstring" routine
2314                 66   273   machnum ds      1                         ; machine # returned by "inmachine"
```

```
2315                    67   274
2315                    68   275   kr_savebc:     ds    2           ; save area for registers for "keyred2"
2317                    69   276   kr_savede:     ds    2           ;
2319                    70   277   kr_savehl:     ds    2           ;
231b                    71   278   kr_saveiy:     ds    2           ;
231d                    72   279   kr_saveret:    ds    2           ; save area for ret addr for "keyred2"
231f                    73   280   rtaddr1:       ds    2           ; save area for ret addr for "inmachine"
2321                    74   281   cpd_retn:      ds    2           ; save area for ret addr for "conv_pick_d"
2323                    75   282   rs_saveretn:   ds    2           ; save area for ret addr for "readstring"
2325                    76   283   scrch    equ   $                 ; remaining area used as needed
2325                    77   284            ds    20h               ; (minimum scratch area of 20h bytes)

Nuvatec Z80 assembler   Release 1.9          Sun Nov  8 13:54:34 1981

ram.s


Addr/     Object   File    Ass'y
Section    Code    Line#   Line# + S t a t e m e n t
________  _______  _____   _____   ______________________________________________

                    78    285
                    79    286
                    80    287   ;---------------------------------------------------------
                    81    288   ; Stack space
                    82    289   ;---------------------------------------------------------
                    83    290                  export  stacktop
                    84    291
0000/01             85    292   stack_sect:    section "STACK"          ; to be loaded @ 2380h
0000/01             86    293           ds     128
0080/01             87    294   stacktop:
                    88    295
                    89    296
                    90    297   ;---------------------------------------------------------
                    91    298   ; Machine storage area B (2800-2bffh)
                    92    299   ;       128 byte to analyse each of the seperate hits
                    93    300   ;       (i.e. 256 bytes for each machine)
                    94    301   ;---------------------------------------------------------
                    95    302                  export  machstb
                    96    303
0080                97    304                  aorg    2800h
2800                98    305   machstb:       ds      N_MACHINES * N_HITS * sizeof(hit_sect)

No errors in this assembly

Symbol table entries used:      97/ 574
Symbol name characters used:   880/7500

Nuvatec Z80 assembler   Release 1.9          Sun Nov  8 13:54:34 1981

ram.s
Symbol Table / Cross-Reference Listing

value    type      defined      name of symbol
______   _______   _______      __________________

3001        e         21        AD_CONTROL
00d3        e         33        AD_CclrAll
00e0        e         42        AD_Cendint
0040        e         39        AD_CreadKEY
0090        e         30        AD_Cwrite
3000        e         20        AD_DATA
0003        e         10        BCD_NUMLEN
0010        e         12        CLOCKRATE
0008        e         57        DF_BLINK2
0020        e         56        DF_ERRBLINK
0000        e         54        DF_STEADY
0008        e         55        DS_BRKBLINK
0080        e         51        DS_ON
0005/--              183        H_acc16
0002/--              181        H_acc4
0008/--              185        H_acc64
000b/--              188        H_bbufp
000c/--              190        H_buf
0000/--              172        H_cflags
0004/--              182        H_cnt16
0001/--              180        H_cnt4
```

```
0007/--                 184       H_cnt64
000a/--                 187       H_fbufp
0015/--                 192       H_hitclk
0016/--                 193       H_hitclksv
0014/--                 191       H_static
0018/--                 195       H_trcnt
0017/--                 194       H_trend
0008          e          65       KEY_BS
000a          e          64       KEY_ENTER
000d          e          66       KEY_NEXT
0006/--                 130       M_bcnt
0024/--                 158       M_dfreq
000e/--                 132       M_dptr
0023/--                 156       M_dstatus
0001/--                 120       M_errflags
0025/--                 162       M_fcdis
0000/--                 101       M_flags
002d/--                 163       M_hitclk
0008/--                 129       M_setbcnt
0002/--                 127       M_settcnt
0005/--                 128       M_tcnt
0020/--                 153       M_tcount
0010/--                 136       M_tol1
0018/--                 144       M_tol16
0014/--                 140       M_tol4
001c/--                 148       M_tol64
0022/--                 154       M_tolfac
0010/--                 135       M_tols
3801          e          24       ND_CONTROL
00df          e          34       ND_CclrAll
00c2          e          37       ND_CclrF
00e0          e          43       ND_Cendint
0040          e          40       ND_CreadHIT
0090          e          31       ND_Cwrite
3800          e          23       ND_DATA
0006          e           9       NUMLEN
0002          e           7       N_HITS
0004          e           6       N_MACHINES
0003/--                 207       RS_fw
0002/--                 206       RS_maxfw
0001/--                 205       RS_pos
0000/--                 204       RS_startpos
00ff          e          14       WATCHDOG
2002         E          224       adisp_lock
2307         E          270       bptr
2301         E          266       conflg
2321         E          281       cpd_retn
2306         E          269       fptr
2300         E          265       funcod
0080/--       s         170       hit_sect
2308         E          271       kbbuff
2315         E          275       kr_savebc
2317         E          276       kr_savede
2319         E          277       kr_savehl

Nuvatec Z80 assembler   Release 1.9             Sun Nov  8 13:54:34 1981

ram.s
Symbol Table / Cross-Reference Listing

value   type      defined       name of symbol

231b         E          278       kr_saveiy
231d         E          279       kr_saveret
0040/--       s          98       mach_sect
2314         E          273       machnum
2200         E          251       machsta
2800         E          305       machstb
2013         E          229       nd_zflags
2003         E          228       ndbuffer
2302         E          267       nexent
0000/00       s         209       ram.s
2000         E          219       rami_begin
2310         E          272       rs_args
2323         E          282       rs_saveretn
```

```
5760   0004/--       s        203       rsarg_sect
5761   231f       E           280       rtaddr1
5762   2325       E  e        283       scrch
5763   2304       E           268       spcent
5764   0080/01       s        292       stack_sect
5765   0080/01    E           294       stacktop
5766   2016       E           236       sysclk
5767   2014       E           234       sysflg
5768   2000       E           220       valid
```

We claim:

1. A control apparatus for a material forming machine of the type which forms a plurality of workpieces through a sequence of respective forming operations, said control apparatus comprising:

means for generating a sequence of measured signals, each an analog of a measured parameter of a respective one of the forming operations;

means, responsive to the measured signals, for automatically and repeatedly generating a sequence of first summary signals, each of said first summary signals representative of an average of a set of n separate measured signals, where n is an integer greater than zero;

means, responsive to the measured signals, for automatically and repeatedly generating a sequence of second summary signals, each of said second summary signals representative of an average of a set of m separate measured signals, where m is an integer greater than n; and means for comparing the first and second summary signals with first and second ranges of values, respectively, and for generating an indicator signal when a first selected number of the first summary signals are outside the first range of values, or a second selected number of the second summary signals are outside the second range of values;

said second range of values being smaller than said first range of values.

2. The invention of claim 1 wherein n is equal to one and m is greater than or equal to 4.

3. The invention of claim 1 further comprising means for terminating the sequence of forming operations of the metal forming machine in response to the indicator signal.

4. The invention of claim 1 further comprising;

means, responsive to the measured signals, for automatically and repeatedly generating a sequence of third summary signals and a sequence of fourth summary signals, wherein each of said third summary signals is representative of an average of a set of k separate measured signals, where k is an integer greater than m, and each of said fourth summary signals is representative of an average of a set of i separate measured signals, where i is an integer greater than k; and means for comparing the third and fourth summary signals with third and fourth ranges of values, respectively, and for generating the indicator signal when a third selected number of the third or fourth summary signals are outside the third or fourth ranges, respectively;

said third range being smaller than said second range and said fourth range being smaller than said third range.

5. The invention of claim 4 wherein n equals one, m equals 4, k equals 16, and i equals 64.

6. The invention of claim 4 or 5 wherein the first range is about twice as large as the second range, the second range is about twice as large as the third range, the third range is about twice as large as the fourth range.

7. The invention of claim 1 wherein the metal forming machine comprises a cold heading machine having a first die for striking workpieces in a second die, and each of the measured signals has a value indicative of the total energy delivered by the first die to the second die in the respective forming operation.

8. The invention of claim 1 wherein each of the first and second ranges of values is centered about a target value and wherein the invention further comprises means, responsive to the measured signals, for automatically generating the target value as a function of a plurality of the measured signals during an initial period.

9. The invention of claim 8 wherein the means for generating the target value generates the target value as a function of an average of the plurality of the measured signals during the initial period.

10. The invention of claim 3 wherein each of the first and second ranges of values is centered about a target value and wherein the invention further comprises means for automatically and gradually adjusting the target value to track selected changes in the measured signals during a preliminary period.

11. The invention of claim 10 wherein the invention further comprises means for disabling the adjusting means at the end of the preliminary period in order to prevent further gradual adjustment of the target value.

12. The invention of claim 3 further comprising means for generating a warning signal when one of the first and second summary signals is inside but near a limit of the respective range of values, said warning signal indicative that the measured signals are nearing an out-of-tolerance condition.

13. The invention of claim 1 further comprising means for generating a warning signal when a third selected number of the second summary signals are outside a third range of values, included in the second range of values, but inside the second range of values, said warning signal indicative that the measured signals are nearing an out-of-tolerance condition.

14. A control apparatus for a material forming machine of the type which forms a plurality of workpieces through a sequence of respective forming operations, said control apparatus comprising:

means for generating a sequence of measured signals, each an analog of a measured parameter of a respective one of the forming operations;

first means, responsive to the measured signals, for signalling an out-of-tolerance condition by interrupting operation of the metal forming machine when the average value of the sequence of measured signals differs from a target value by more than a first amount over a first time period; and second means, responsive to the measured signals, for signalling an out-of-tolerance condition by interrupting operation of the metal forming machine when the average value of the sequence of measured signals differs from the target value by more than a second amount over a second time period;

said first amount being less than the second amount and said first time period being longer than said second time period.

15. The invention of claim 14 wherein the second time period encompasses only a single one of the measured signals and the first time period encompasses a plurality of the measured signals.

16. The invention of claim 15 wherein the first time period encompasses greater than about 10 measured signals.

17. The invention of claim 14 wherein the metal forming machine comprises a cold heading machine having a first die which strikes a workpiece in a second die, wherein each of the measured signals has a value indicative of the total energy delivered by the first die to the second die in the respective forming operation.

18. The invention of claim 14 wherein the invention further comprises means, responsive to the measured signals, for automatically generating the target value as a function of a plurality of the measured signals during an initial period.

19. The invention of claim 18 wherein the means for generating the target value generates the target value as a function of an average of the plurality of the measured signals during the initial period.

20. The invention of claim 14 wherein the invention further comprises means for automatically and gradually adjusting the target value to track selected changes in the measured signals during a preliminary period.

21. The invention of claim 20 wherein the invention further comprises means for disabling the adjusting means at the end of the preliminary period in order to prevent further gradual adjustment of the target value.

22. The invention of claim 14 further comprising means for generating a warning signal when the sequence of measured signals differs from the target value by more than a third amount over a third time period, wherein the third amount is less than the second amount, said warning signal indicative that the measured signals are nearing an out-of-tolerance condition.

23. The invention of claim 22 wherein the third time period is equal to the second time period.

24. A control apparatus for a cold heading forming machine of the type which forms a plurality of workpieces through a plurality of respective forming operations, said apparatus comprising:

means for generating a sequence of measured signals, each indicative of and proportional to a measured parameter of a respective one of the forming operations;

means for providing at least first and second ranges of acceptable values, said first range being larger than said second range;

means for generating at least first and second sequences of average values, each of said first average values indicative of an average of n measured signals and each of said second average values indicative of an average of m measured signals, n and m being positive integers where m is greater than n; and means for generating an out-of-tolerance signal either when a first selected number of first average values fall outside the first range or when a second selected number of the second average values fall outside the second range.

25. The invention of claim 24 wherein both the first and second ranges are centered about a common target value.

26. The invention of claim 24 further comprising means for interrupting operation of the machine in response to the out-of-tolerance signal.

27. The invention of claim 24 wherein the first selected number is one and the second selected number is one.

28. The invention of claim 24 wherein n is equal to one and m is greater than or equal to four.

29. The invention of claim 24 wherein the forming machine comprises a cold heading machine having a first die for striking workpieces in a second die, and each of the measured signals has a value indicative of the total energy delivered by the first die to the second die in the respective forming operation.

30. The invention of claim 24 wherein both the first and second ranges are centered on a target value and wherein the invention further comprises means, responsive to the measured signals, for automatically generating the target value as a function of a plurality of the measured signals during an initial period.

31. The invention of claim 30 wherein the means for generating the target value generates the target value as a function of an average of the plurality of the measured signals during the initial period.

32. The invention of claim 26 wherein each of the first and second ranges of acceptable values is centered about a target value and wherein the invention further comprises means for automatically and gradually adjusting the target value to track selected changes in the measured signals during a preliminary period.

33. The invention of claim 32 wherein the invention further comprises means for disabling the adjusting means at the end of the preliminary period in order to prevent further gradual adjustment of the target value.

34. The invention of claim 26 further comprising means for generating a warning signal when one of the first and second sequences of average values is inside but near a limit of the respective range of values, said warning signal indicative that the measured signals are nearing an out-of-tolerance condition.

35. The invention of claim 26 further comprising means for generating a warning signal when the second sequence of average values falls outside a third range of values, included in the second range of values, but inside the second range of values, said warning signal indicative that the measured signals are nearing an out-of-tolerance condition.

36. A control apparatus for a workpiece forming machine of the type which forms a plurality of workpieces through a plurality of respective forming operations, said apparatus comprising:

means for generating a sequence of measured signals, each indicative of a measured parameter of a respective one of the forming operations;

means, responsive to the measured signals, for automatically generating a target value as a function of an average of the measured signals during an initial period, said target value indicative of a desired value of the measured signals;

means for comparing the measured signals with the target value and for generating an out-of-tolerance signal when the measured signals depart from the target value by more than a first selected amount;

means, responsive to the out-of-tolerance signal, for interrupting operation of the forming machine;

means for automatically and gradually adjusting the target value to track selected changes in the measured signals during a preliminary period following the initial period; and means for disabling the adjusting means at the end of the preliminary period in order to prevent further gradual adjustment of the target value.

37. The invention of claim 36 wherein the comparing and generating means comprises:

means for providing at least first and second ranges of acceptable values, said first range being larger than said second range;

means for generating at least first and second sequences of average values, each of said first average values indicative of an average of n measured signals and each of said second average values indicative of an average of m measured signals, n and m being positive integers where m is greater than n; and means for generating the out-of-tolerance signal either when a first selected number of first average values fall outside the first range or when a second selected number of the second average values fall outside the second range.

* * * * *

UNITED STATES PATENT AND TRADEMARK OFFICE

CERTIFICATE OF CORRECTION

PATENT NO. : 4,481,589

DATED : November 6, 1984

INVENTOR(S) : Michael J. McGowan, William H. Slavik and Carson D. Cash, III

It is certified that error appears in the above-identified patent and that said Letters Patent is hereby corrected as shown below:

In column 9, line 18, please delete "accumulators" and substitute therefore --accumulations--;

In column 11, line 23, please delete "Bread" and substitute therefore --Break--.

Signed and Sealed this

*Fifteenth* Day of *July 1986*

[SEAL]

*Attest:*

DONALD J. QUIGG

*Attesting Officer* *Commissioner of Patents and Trademarks*

UNITED STATES PATENT AND TRADEMARK OFFICE
CERTIFICATE OF CORRECTION

PATENT NO. : 4,481,589

DATED : November 6, 1984

INVENTOR(S) : MCGowan, et al

It is certified that error appears in the above-identified patent and that said Letters Patent is hereby corrected as shown below:

Column 14, at Line 42, insert new paragraph, --A portion of the disclosure of this patent document contains material which is subject to copyright protection. The copyright owner has no objection to facsimile reproduction by anyone of the patent document as such appears in the Patent and Trademark Office patent file or records, but otherwise reserves all underlying pertinent copyright rights whatsoever. Accordingly, a program listing of the software program is attached hereto and hereby incorporated as part of this specification as the Appendix hereto (that is, the source code version) for use in the embodiment in the FIGS.

Column 15, Line 1, insert --Copyright 1982 Nuvatec, Inc.--.

Signed and Sealed this

Twenty-second Day of June, 1993

Attest:

Michael K. Kirk

MICHAEL K. KIRK

*Attesting Officer*

*Acting Commissioner of Patents and Trademarks*